(12) United States Patent
Dutta

(10) Patent No.: US 11,469,995 B2
(45) Date of Patent: Oct. 11, 2022

(54) FLOW-SPECIFIC FAST REROUTING OF SOURCE ROUTED PACKETS

(71) Applicant: Nokia Solutions and Networks Oy, Espoo (FI)

(72) Inventor: Pranjal Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/469,427

(22) PCT Filed: Jun. 14, 2018

(86) PCT No.: PCT/IB2018/000715
§ 371 (c)(1),
(2) Date: Jun. 13, 2019

(87) PCT Pub. No.: WO2019/239171
PCT Pub. Date: Dec. 19, 2019

(65) Prior Publication Data
US 2021/0306257 A1    Sep. 30, 2021

(51) Int. Cl.
*H04L 45/00* (2022.01)
*H04L 45/50* (2022.01)
(Continued)

(52) U.S. Cl.
CPC .............. *H04L 45/34* (2013.01); *H04L 45/20* (2013.01); *H04L 45/22* (2013.01); *H04L 45/50* (2013.01);
(Continued)

(58) Field of Classification Search
CPC ......... H04L 45/20; H04L 45/22; H04L 45/34; H04L 45/50; H04L 45/64; H04L 45/566; H04L 45/741
See application file for complete search history.

(56) References Cited

U.S. PATENT DOCUMENTS 9,485,150 B2   11/2016   Filsfils et al.
10,171,343 B2   1/2019   Abdallah
(Continued)

OTHER PUBLICATIONS

T. Cicic, A. F. Hansen and O. K. Apeland, "Redundant trees for fast IP recovery," 2007 Fourth International Conference on Broadband Communications, Networks and Systems (BROADNETS '07), 2007, pp. 152-159, doi: 10.1109/BROADNETS.2007.4550419. (Year: 2007).*
(Continued)

*Primary Examiner* — Brian P Cox
(74) *Attorney, Agent, or Firm* — Tong, Rea, Bentley & Kim, LLC

(57) ABSTRACT

Various example embodiments relate generally to supporting flow-specific fast rerouting of source routed packets in communication networks. Various example embodiments for supporting flow-specific fast rerouting of source routed packets may be configured to support flow-specific fast rerouting of source routed packets based on use of various source routing protocols which may be based on various underlying communication protocols. Various example embodiments for supporting flow-specific fast rerouting of source routed packets in communication networks may be configured to support flow-specific fast rerouting of source routed packets by supporting use of a source routed packet including a payload and a header where the header encodes a set of hops of a primary path for the source routed packet and where the header also encodes a set of hops of a protection path configured to protect one of the hops of the primary path for the source routed packet.

25 Claims, 12 Drawing Sheets

(51) Int. Cl.
  H04L 45/741 (2022.01)
  H04L 45/64 (2022.01)
(52) U.S. Cl.
  CPC ............ *H04L 45/566* (2013.01); *H04L 45/64* (2013.01); *H04L 45/741* (2013.01)

(56) References Cited

U.S. PATENT DOCUMENTS

| | | | |
|---|---|---|---|
| 2002/0091855 A1* | 7/2002 | Yemini | H04L 45/126 709/238 |
| 2004/0190517 A1 | 9/2004 | Gupta | |
| 2005/0281259 A1* | 12/2005 | Mitchell | H04L 45/502 370/389 |
| 2007/0115913 A1 | 5/2007 | Li et al. | |
| 2007/0274286 A1 | 11/2007 | Krishnan | |
| 2009/0245149 A1* | 10/2009 | Xia | H04L 45/50 370/310 |
| 2011/0116506 A1 | 5/2011 | Su et al. | |
| 2011/0128975 A1 | 6/2011 | Kang | |
| 2011/0216656 A1 | 9/2011 | Pratt, Jr. et al. | |
| 2012/0198064 A1 | 8/2012 | Boutros | |
| 2013/0301656 A1 | 11/2013 | Park et al. | |
| 2013/0336315 A1 | 12/2013 | Guichard et al. | |
| 2014/0169211 A1* | 6/2014 | Harper | H04L 41/12 370/254 |
| 2014/0269714 A1 | 9/2014 | Bryant et al. | |
| 2014/0280711 A1 | 9/2014 | Asati et al. | |
| 2015/0003458 A1 | 1/2015 | Li et al. | |
| 2015/0003463 A1 | 1/2015 | Li et al. | |
| 2015/0029837 A1* | 1/2015 | Ashwood-Smith | H04L 45/34 370/228 |
| 2015/0109904 A1* | 4/2015 | Filsfils | H04L 45/34 370/221 |
| 2015/0180771 A1 | 6/2015 | Ashwood-Smith | |
| 2015/0207736 A1 | 7/2015 | Roch et al. | |
| 2015/0372903 A1 | 12/2015 | Hui et al. | |
| 2016/0269298 A1 | 9/2016 | Li et al. | |
| 2017/0134268 A1 | 5/2017 | Easale et al. | |
| 2017/0353382 A1* | 12/2017 | Gupta | H04L 45/28 |
| 2018/0205642 A1 | 7/2018 | Li | |

OTHER PUBLICATIONS

Gredler, H. et al., "North-Bound Distribution of Link-State and Traffic Engineering (TE) Information Using BGP", Internet Engineering Task Force, RFC 7752, Mar. 2016, 48 pages.
Filsfils, C. et al., "Segment Routing Architecture," draft-ietf-spring-segment-routing-12, Network Working Group, Jun. 20, 2017, 28 pages.
Rosen, E. et al., "Multiprotocol Label Switching Architecture," Network Working Group, RFC 3031, Jan. 2001, 57 pages.
Iana, "Special-Purpose Multiprotocol Label Switching (MPLS) Label Values," https://www.iana.org/assignments/mpls-label-values/mpls-label-values.xhtml), printed on Nov. 26, 2018, 2 pages.
Iana, "IEEE 802 Numbers," https://www.iana.org/assignments/ieee-802-numbers/ieee-802-numbers.xhtm, printed on Nov. 26, 2018, 15 pages.
Previdi, S., et al., "IS-IS Extensions for Segment Routing," draft-ietf-isis-segment-routing-extensions-16, IS-IS for IP Internets, Apr. 19, 2018, 35 pages.
Psenak, P., et al., "OSPF Extensions for Segment Routing," draft-ietf-ospf-segment-routing-extensions-19, Open Shortest Path First IGP, Aug. 25, 2017, 28 pages.
Lindem, A., et al., "Extensions to OSPF for Advertising Optional Router Capabilities," Internet Engineering Rask Force, RFC 7770, Feb. 2016, 15 pages.
Psenak, P., et al., "OSPFv3 Extensions for Segment Routing," draft-ietf-ospf-ospfv3-segment-routing-extensions-10, Open Shortest Path First IGP, Sep. 5, 2017, 36 pages.
Lindem, A., et al., "Extensions to OSPF for Advertising Optional Router Capabilities," Network Working Group, RFC 4970, Jul. 2007, 13 pages.
Previdi, S., et al., "BGP Link-State Extensions for Segment Routing," draft-ietf-idr-bgo-ls-segment-routing-ext-03, Inter-Domain Routing, Jul. 26, 2017, 27 pages.
Iana, "Border Gateway Protocol—Link State (BGP-LS) Parameters," https://www.iana.org/assignments/bgp-ls-parameters/bgp-ls-parameters.xhtml, printed on Nov. 26, 2018, 6 pages.
Andersson, L. et al., "LDP Specification," Network Working Group, RFC 5036, Oct. 2007, 135 pages.
Thomas, B. et al., "LDP Capabilities," Network Working Group, RFC 5561, Jul. 2009, 12 pages.
Iana, "Label Distribution Protocol (LDP) Parameters," https://www.iana.org/assignments/ldp-namespaces/ldp-namespaces.xhtml, printed on Nov. 26, 2018, 13 pages.
Awduche, D., et al., "RSVP-TE: Extensions to RSVP for LSP Tunnels," Network Working Group, RFC 3209, Dec. 2001, 61 pages.
Rekhter, Y., et al., "Carrying Label Information in BGP-4," Network Working Group, RFC 3107, May 2001, 8 pages.
Iana, "Subsequent Address Family Identifiers (SAFI) Parameters," https://www.iana.org/assignments/safi-namespace/safi-namespace.xhtml, printed on Nov. 26, 2018, 2 pages.
Filsils, C. et al., "Segment Routing with MPLS Data Plane," draft-ietf-spring-segment-routing-mpls-10, Network Working Group, Jun. 22, 2017.
Filsfils, C. et al., "Segment Routing Policy for Traffic Engineering," draft-filsfils-spring-segment-routing-policy-01.txt, Network Working Group, Jul. 3, 2017, 31 pages.
Atlas, A. et al., "Basic Specification for IP Fast Reroute: Loop-Free Alternates," Network Working Group, RFC 5286, Sep. 2008, 32 pages.
Bryant, S., et al., "Remote Loop-Free Alternate (LFA) Fast Reroute (FRR)," Internet Engineering Task Force, RFC 7490, Apr. 2015, 30 pages.
Francois, P., et al., "Topology Independent Fast reroute using Segment Routing," draft-francois-segment-routing-ti-lfa-00, Network Working Group, Nov. 18, 2013, 11 pages.
Pan, P. et al., "Fast Reroute Extensions to RSVP-TE for LSP Tunnels," Network Working Group, RFC 4090, May 2005, 39 pages.
Deering, S., et al., "Internet Protocol, Version 6 (IPv6) Specification," Network Working Group, RFC 2460, Dec. 1998, 37 pages.
Previdi, S. et al., "IPv6 Segment Routing Header (SRH)," draft-ietf-6man-segment-routing-header-07, Network Working Group, Jul. 20, 2017, 34 pages.
Iana, "Internet Protocol Version 6 (IPv6) Parameters," https://www.iana.org/assignments/ipv6-parameters/ipv6-parameters.xhtml, printed on Jun. 10, 2019, 4 pages.
Ginsberg, L. et al., "IS-IS Extensions for advertising Router Information," Internet Engineering Rask Force, RFC 7981, Oct. 2016, 11 pages.
Information Sciences Institute, University of Southern California, "DARPA Internet Program Protocol Specification," Internet Protocol, RFC 791, Sep. 1981, 89 pages.
Iana, "Internet Protocol Version 4 (IPv4) Parameters," https://www.iana.org/assignments/ip-parameters/ip-parameters.xhtml, printed on Jun. 10, 2019, 3 pages.
Iana, "Protocol Numbers," https://www.iana.org/assignments/protocol-numbers/protocol-numbers.xhtml, printed on Jun. 10, 2019, 10 pages.
Katz, D., "IP Router Alert Option," Network Working Group, RFC 2113, Feb. 1997, 4 pages.
Iana, "IANA IPv4 Special-Purpose Address Registry," https://www.iana.org/assignments/iana-ipv4-special-registry/iana-ipv4-special-registry.xhtml, printed on Jun. 10, 2019, 2 pages.
Oran, D., "OSI IS-IS Intra-domain Routing Protocol," Network Working Group, RFC 1142, Feb. 1990, 205 pages.
Iana, "IS-IS TLV Codepoints," https://www.iana.org/assignments/isis-tlv-codepoints/isis-tlv-codepoints.xhtml, printed on Jun. 11, 2019, 14 pages.
Berger, L. et al., "The OSPF Opaque LSA Option," Network Working Group, RFC 5250, Jul. 2008, 18 pages.
Hinden, R. et al., "Unique Local IPv6 Unicast Addresses," Network Working Group, RFC 4193, Oct. 2005, 17 pages.

(56) References Cited

OTHER PUBLICATIONS

Iana, "IANA IPv6 Special-Purpose Address Registry," https://www.iana.org/assignments/iana-ipv6-special-registry/iana-ipv6-special-registry.xhtml, printed on Jun. 11, 2019, 2 pages.
Hinden R. et al., "IP Version 6 Addressing Architecture," Network Working Group, RFC 4291, Feb. 2006, 26 pages.
Coltun, R., et al., "OSPF for IPv6," Network Working Group, RFC 5340, Jul. 2008, 95 pages.
Filsfils, C. et al., "Segment Routing with MPLS Data Plane," draft-ietf-spring-segment-routing-mpls-11, Network Working Group, Oct. 2017, 19 pages.
Moy, J., "OSPF Version 2," Network Working Group, RFC 2328, Apr. 1998, 244 pages.
Psenak, P. et al., "OSPF Extensions for Segment Routing," draft-ietf-ospf-segment-routing-extensions-24, Open Shortest Path First IGP, Dec. 14, 2017, 30 pages.
Psenak, P. et al., "Multi-Topology (MT) Routing in OSPF," Network Working Group, RFC 4915, Jun. 2007, 21 pages.
Braden, R. et al., "Resource Reservation Protocol—Version 1 Functional Specification," Network Working Group, RFC 2205, Sep. 1997, 112 pages.
Reynolds, J. et al., "Assigned Numbers," Network Working Group, RFC 1700, Oct. 1994, 230 pages.
International Search Report and Written Opinion mailed in corresponding PCT/IB2018/000715 dated Feb. 4, 2019, 14 pages.

\* cited by examiner

FLOW-SPECIFIC FAST REROUTING OF SOURCE ROUTED PACKETS

CROSS-REFERENCE TO RELATED APPLICATIONS

This application is based on and claims the benefit of International Patent Application No. PCT/IB2018/000715, filed on Jun. 14, 2018, which is hereby incorporated herein by reference in its entirety.

TECHNICAL FIELD

Various example embodiments relate generally to communication networks and, more particularly but not exclusively, to supporting flow-specific fast rerouting of source routed packets in communication networks.

BACKGROUND

In many communication networks, various combinations of communications technologies may be employed to support end-to-end communication of data.

SUMMARY

Various example embodiments relate generally to supporting flow-specific fast rerouting of source routed packets in communication networks.

In at least some example embodiments, an apparatus is provided. The apparatus includes at least one processor. The apparatus includes at least one memory including computer program code. The at least one memory and the computer program code are configured to, with the at least one processor, cause the apparatus to at least handle a source routed packet associated with a source routing protocol, wherein the source routed packet includes a header and a payload, wherein the header includes an encoding of a set of hops of a primary path, wherein the header includes an encoding of a set of hops of a protection path configured to protect one of the hops of the primary path. In at least some example embodiments, the encoding of the set of hops of the primary path includes a set of hop identifiers identifying the respective hops of the primary path. In at least some example embodiments, the encoding of the set of hops of the protection path includes a set of hop identifiers identifying the respective hops of the protection path. In at least some example embodiments, the encoding of the hops of the primary path includes an indication that the one of the hops of the primary path is protected by the set of hops of the protection path. In at least some example embodiments, the encoding of the one of the hops of the protection path includes an indication of a quantity of hops in the set of hops of the protection path. In at least some example embodiments, the encoding of the one of the hops of the primary path includes an indication of a quantity of hops in the set of hops of the primary path to be skipped when the protection path is used for the source routed packet. In at least some example embodiments, the encoding of the set of hops of the protection path includes an indication of a quantity of hops in the set of hops of the protection path. In at least some example embodiments, the encoding of the set of hops of the protection path includes an indication of a quantity of hops in the set of hops of the primary path to be skipped when the protection path is used for the source routed packet. In at least some example embodiments, the source routing protocol includes a Multiprotocol Label Switching (MPLS) source routing protocol. In at least some example embodiments, each of the hops of the primary path is encoded using a respective MPLS label. In at least some example embodiments, the one of the hops of the primary path and the hops of the protection path are encoded using a set of MPLS labels. In at least some example embodiments, the set of MPLS labels includes an MPLS label configured to indicate the encoding of the hops of the protection path for the one of the hops of the primary path, an MPLS label encoding the one of the hops of the primary path, an MPLS label including an indication of a quantity of hops in the protection path and an indication of a quantity of hops in the set of hops of the primary path to be skipped when the protection path is used for the source routed packet, and a set of MPLS labels encoding the respective hops of the protection path. In at least some example embodiments, the source routing protocol includes an Internet Protocol (IP) source routing protocol. In at least some example embodiments, wherein the IP source routing protocol includes an IP version 4 (IPv4) source routing protocol or an IP version 6 (IPv6) source routing protocol. In at least some example embodiments, the IP source routing protocol includes an IP version 4 (IPv4) source routing protocol, wherein the hops of the primary path and the hops of the protection path are encoded using a set of fields of an IPv4 Options Header or a set of fields of an IPv4 Shim Header. In at least some example embodiments, the IP source routing protocol includes an IP version 6 (IPv6) source routing protocol, wherein the hops of the primary path and the hops of the protection path are encoded using a set of fields of an IPv6 Routing Header or a set of fields of an IPv6 Shim Header. In at least some example embodiments, the hops of the primary path and the hops of the protection path are encoded using a set of fields an IP Shim Header wherein the IP Shim Header is arranged between an IP Header and a header associated with a transport layer protocol. In at least some example embodiments, the hops of the primary path and the hops of the protection path are encoded using a set of explicit hop elements. In at least some example embodiments, the set of explicit hop elements includes, for the one of the hops of the primary path, a respective explicit hop element including a field identifying the one of the hops of the primary path and a field indicative of a quantity of explicit hop elements in the set of explicit hop elements encoding the hops of the protection path. In at least some example embodiments, the set of explicit hop elements includes, for a final hop in the protection path, a respective explicit hop element including a field identifying the final hop in the protection path and a field indicative of a quantity of the hops of the primary path to be skipped when the protection path is used for the source routed packet. In at least some example embodiments, to handle the source routed packet, the at least one memory and the computer program code are configured to, with the at least one processor, cause the apparatus to at least generate the header for the source routed packet, associate the header for the source routed packet with a payload for the source routed packet to form the source routed packet, and send the source routed packet toward a network element. In at least some example embodiments, to generate the header for the source routed packet, the at least one memory and the computer program code are configured to, with the at least one processor, cause the apparatus to at least determine the set of hops of the primary path and the set of hops of the protection path configured to protect the one of the hops of the primary path and encode the set of hops of the primary path and the set of hops of the protection path in the header of the source routed packet. In at least some example embodiments, to handle the source routed packet, the at least one memory and the computer program code are configured to, with the at least one processor, cause the apparatus to at least receive the source routed packet and send the source routed packet toward the one of the hops of the primary path based on a determination that the one of the hops of the primary path is reachable. In at least some example embodiments, to handle the source routed packet, the at least one memory and the computer program code are configured to, with the at least one processor, cause the apparatus to at least receive the source routed packet and send the source routed packet toward a first hop of the protection path, using a fast reroute operation based on the encoding of the set of hops of the protection path, based on a determination that the one of the hops of the primary path is not reachable. In at least some example embodiments, the at least one memory and the computer program code are configured to, with the at least one processor, cause the apparatus to at least support advertisement of control plane information configured to support use of the encoding of the set of hops of the protection path configured to protect one of the hops of the primary path. In at least some example embodiments, the control plane information includes at least one of a capability of the apparatus to support use of the encoding of the set of hops of the protection path configured to protect one of the hops of the primary path or protection path encoding information associated with use of the encoding of the set of hops of the protection path configured to protect one of the hops of the primary path. In at least some example embodiments, the control plane information is advertised using at least one of Intermediate System to Intermediate System (IS-IS), Open Shortest Path First (OSPF), OSPF version 3 (OSPFv3), or Border Gateway Protocol (BGP)-Link State (BGP-LS). In at least some example embodiments, to support advertisement of the control plane information configured to support use of the encoding of the set of hops of the protection path configured to protect one of the hops of the primary path, the at least one memory and the computer program code are configured to, with the at least one processor, cause the apparatus to at least generate the control plane information and send the control plane information toward at least one network element. In at least some example embodiments, to support advertisement of the control plane information configured to support use of the encoding of the set of hops of the protection path configured to protect one of the hops of the primary path, the at least one memory and the computer program code are configured to, with the at least one processor, cause the apparatus to at least receive the control plane information from at least one network element and update control information at the network element based on the control plane information.

In at least some example embodiments, a method is provided. The method includes handling a source routed packet associated with a source routing protocol, wherein the source routed packet includes a header and a payload, wherein the header includes an encoding of a set of hops of a primary path, wherein the header includes an encoding of a set of hops of a protection path configured to protect one of the hops of the primary path. In at least some example embodiments, the encoding of the set of hops of the primary path includes a set of hop identifiers identifying the respective hops of the primary path. In at least some example embodiments, the encoding of the set of hops of the protection path includes a set of hop identifiers identifying the respective hops of the protection path. In at least some example embodiments, the encoding of the hops of the primary path includes an indication that the one of the hops of the primary path is protected by the set of hops of the protection path. In at least some example embodiments, the encoding of the one of the hops of the protection path includes an indication of a quantity of hops in the set of hops of the protection path. In at least some example embodiments, the encoding of the one of the hops of the primary path includes an indication of a quantity of hops in the set of hops of the primary path to be skipped when the protection path is used for the source routed packet. In at least some example embodiments, the encoding of the set of hops of the protection path includes an indication of a quantity of hops in the set of hops of the protection path. In at least some example embodiments, the encoding of the set of hops of the protection path includes an indication of a quantity of hops in the set of hops of the primary path to be skipped when the protection path is used for the source routed packet. In at least some example embodiments, the source routing protocol includes a Multiprotocol Label Switching (MPLS) source routing protocol. In at least some example embodiments, each of the hops of the primary path is encoded using a respective MPLS label. In at least some example embodiments, the one of the hops of the primary path and the hops of the protection path are encoded using a set of MPLS labels. In at least some example embodiments, the set of MPLS labels includes an MPLS label configured to indicate the encoding of the hops of the protection path for the one of the hops of the primary path, an MPLS label encoding the one of the hops of the primary path, an MPLS label including an indication of a quantity of hops in the protection path and an indication of a quantity of hops in the set of hops of the primary path to be skipped when the protection path is used for the source routed packet, and a set of MPLS labels encoding the respective hops of the protection path. In at least some example embodiments, the source routing protocol includes an Internet Protocol (IP) source routing protocol. In at least some example embodiments, wherein the IP source routing protocol includes an IP version 4 (IPv4) source routing protocol or an IP version 6 (IPv6) source routing protocol. In at least some example embodiments, the IP source routing protocol includes an IP version 4 (IPv4) source routing protocol, wherein the hops of the primary path and the hops of the protection path are encoded using a set of fields of an IPv4 Options Header or a set of fields of an IPv4 Shim Header. In at least some example embodiments, the IP source routing protocol includes an IP version 6 (IPv6) source routing protocol, wherein the hops of the primary path and the hops of the protection path are encoded using a set of fields of an IPv6 Routing Header or a set of fields of an IPv6 Shim Header. In at least some example embodiments, the hops of the primary path and the hops of the protection path are encoded using a set of fields an IP Shim Header wherein the IP Shim Header is arranged between an IP Header and a header associated with a transport layer protocol. In at least some example embodiments, the hops of the primary path and the hops of the protection path are encoded using a set of explicit hop elements. In at least some example embodiments, the set of explicit hop elements includes, for the one of the hops of the primary path, a respective explicit hop element including a field identifying the one of the hops of the primary path and a field indicative of a quantity of explicit hop elements in the set of explicit hop elements encoding the hops of the protection path. In at least some example embodiments, the set of explicit hop elements includes, for a final hop in the protection path, a respective explicit hop element including a field identifying the final hop in the protection path and a field indicative of a quantity of the hops of the primary path to be skipped when the protection path is used for the source routed packet. In at least some example embodiments, handling the source routed packet includes generating the header for the source routed packet, associating the header for the source routed packet with a payload for the source routed packet to form the source routed packet, and sending the source routed packet toward a network element. In at least some example embodiments, generating the header for the source routed packet includes determining the set of hops of the primary path and the set of hops of the protection path configured to protect the one of the hops of the primary path and encoding the set of hops of the primary path and the set of hops of the protection path in the header of the source routed packet. In at least some example embodiments, handling the source routed packet includes receiving the source routed packet and sending the source routed packet toward the one of the hops of the primary path based on a determination that the one of the hops of the primary path is reachable. In at least some example embodiments, handling the source routed packet includes receiving the source routed packet and sending the source routed packet toward a first hop of the protection path, using a fast reroute operation based on the encoding of the set of hops of the protection path, based on a determination that the one of the hops of the primary path is not reachable. In at least some example embodiments, the method includes supporting advertisement of control plane information configured to support use of the encoding of the set of hops of the protection path configured to protect one of the hops of the primary path. In at least some example embodiments, the control plane information includes at least one of a capability of the apparatus to support use of the encoding of the set of hops of the protection path configured to protect one of the hops of the primary path or protection path encoding information associated with use of the encoding of the set of hops of the protection path configured to protect one of the hops of the primary path. In at least some example embodiments, the control plane information is advertised using at least one of Intermediate System to Intermediate System (IS-IS), Open Shortest Path First (OSPF), OSPF version 3 (OSPFv3), or Border Gateway Protocol (BGP)-Link State (BGP-LS). In at least some example embodiments, supporting advertisement of the control plane information configured to support use of the encoding of the set of hops of the protection path configured to protect one of the hops of the primary path includes generating the control plane information and sending the control plane information toward at least one network element. In at least some example embodiments, supporting advertisement of the control plane information configured to support use of the encoding of the set of hops of the protection path configured to protect one of the hops of the primary path includes receiving the control plane information from at least one network element and updating control information at the network element based on the control plane information.

In at least some example embodiments, a non-transitory computer readable medium is provided. The non-transitory computer-readable medium includes program instructions for causing an apparatus to at least handle a source routed packet associated with a source routing protocol, wherein the source routed packet includes a header and a payload, wherein the header includes an encoding of a set of hops of a primary path, wherein the header includes an encoding of a set of hops of a protection path configured to protect one of the hops of the primary path. In at least some example embodiments, the encoding of the set of hops of the primary path includes a set of hop identifiers identifying the respective hops of the primary path. In at least some example embodiments, the encoding of the set of hops of the protection path includes a set of hop identifiers identifying the respective hops of the protection path. In at least some example embodiments, the encoding of the hops of the primary path includes an indication that the one of the hops of the primary path is protected by the set of hops of the protection path. In at least some example embodiments, the encoding of the one of the hops of the protection path includes an indication of a quantity of hops in the set of hops of the protection path. In at least some example embodiments, the encoding of the one of the hops of the primary path includes an indication of a quantity of hops in the set of hops of the primary path to be skipped when the protection path is used for the source routed packet. In at least some example embodiments, the encoding of the set of hops of the protection path includes an indication of a quantity of hops in the set of hops of the protection path. In at least some example embodiments, the encoding of the set of hops of the protection path includes an indication of a quantity of hops in the set of hops of the primary path to be skipped when the protection path is used for the source routed packet. In at least some example embodiments, the source routing protocol includes a Multiprotocol Label Switching (MPLS) source routing protocol. In at least some example embodiments, each of the hops of the primary path is encoded using a respective MPLS label. In at least some example embodiments, the one of the hops of the primary path and the hops of the protection path are encoded using a set of MPLS labels. In at least some example embodiments, the set of MPLS labels includes an MPLS label configured to indicate the encoding of the hops of the protection path for the one of the hops of the primary path, an MPLS label encoding the one of the hops of the primary path, an MPLS label including an indication of a quantity of hops in the protection path and an indication of a quantity of hops in the set of hops of the primary path to be skipped when the protection path is used for the source routed packet, and a set of MPLS labels encoding the respective hops of the protection path. In at least some example embodiments, the source routing protocol includes an Internet Protocol (IP) source routing protocol. In at least some example embodiments, wherein the IP source routing protocol includes an IP version 4 (IPv4) source routing protocol or an IP version 6 (IPv6) source routing protocol. In at least some example embodiments, the IP source routing protocol includes an IP version 4 (IPv4) source routing protocol, wherein the hops of the primary path and the hops of the protection path are encoded using a set of fields of an IPv4 Options Header or a set of fields of an IPv4 Shim Header. In at least some example embodiments, the IP source routing protocol includes an IP version 6 (IPv6) source routing protocol, wherein the hops of the primary path and the hops of the protection path are encoded using a set of fields of an IPv6 Routing Header or a set of fields of an IPv6 Shim Header. In at least some example embodiments, the hops of the primary path and the hops of the protection path are encoded using a set of fields an IP Shim Header wherein the IP Shim Header is arranged between an IP Header and a header associated with a transport layer protocol. In at least some example embodiments, the hops of the primary path and the hops of the protection path are encoded using a set of explicit hop elements. In at least some example embodiments, the set of explicit hop elements includes, for the one of the hops of the primary path, a respective explicit hop element including a field identifying the one of the hops of the primary path and a field indicative of a quantity of explicit hop elements in the set of explicit hop elements encoding the hops of the protection path. In at least some example embodiments, the set of explicit hop elements includes, for a final hop in the protection path, a respective explicit hop element including a field identifying the final hop in the protection path and a field indicative of a quantity of the hops of the primary path to be skipped when the protection path is used for the source routed packet. In at least some example embodiments, to handle the source routed packet, the non-transitory computer-readable medium includes program instructions for causing the apparatus to at least generate the header for the source routed packet, associate the header for the source routed packet with a payload for the source routed packet to form the source routed packet, and send the source routed packet toward a network element. In at least some example embodiments, to generate the header for the source routed packet, the non-transitory computer-readable medium includes program instructions for causing the apparatus to at least determine the set of hops of the primary path and the set of hops of the protection path configured to protect the one of the hops of the primary path and encode the set of hops of the primary path and the set of hops of the protection path in the header of the source routed packet. In at least some example embodiments, to handle the source routed packet, the non-transitory computer-readable medium includes program instructions for causing the apparatus to at least receive the source routed packet and send the source routed packet toward the one of the hops of the primary path based on a determination that the one of the hops of the primary path is reachable. In at least some example embodiments, to handle the source routed packet, the non-transitory computer-readable medium includes program instructions for causing the apparatus to at least receive the source routed packet and send the source routed packet toward a first hop of the protection path, using a fast reroute operation based on the encoding of the set of hops of the protection path, based on a determination that the one of the hops of the primary path is not reachable. In at least some example embodiments, the non-transitory computer-readable medium includes program instructions for causing the apparatus to at least support advertisement of control plane information configured to support use of the encoding of the set of hops of the protection path configured to protect one of the hops of the primary path. In at least some example embodiments, the control plane information includes at least one of a capability of the apparatus to support use of the encoding of the set of hops of the protection path configured to protect one of the hops of the primary path or protection path encoding information associated with use of the encoding of the set of hops of the protection path configured to protect one of the hops of the primary path. In at least some example embodiments, the control plane information is advertised using at least one of Intermediate System to Intermediate System (IS-IS), Open Shortest Path First (OSPF), OSPF version 3 (OSPFv3), or Border Gateway Protocol (BGP)-Link State (BGP-LS). In at least some example embodiments, to support advertisement of the control plane information configured to support use of the encoding of the set of hops of the protection path configured to protect one of the hops of the primary path, the non-transitory computer-readable medium includes program instructions for causing the apparatus to at least generate the control plane information and send the control plane information toward at least one network element. In at least some example embodiments, to support advertisement of the control plane information configured to support use of the encoding of the set of hops of the protection path configured to protect one of the hops of the primary path, the non-transitory computer-readable medium includes program instructions for causing the apparatus to at least receive the control plane information from at least one network element and update control information at the network element based on the control plane information.

In at least some example embodiments, an apparatus is provided. The apparatus includes means for handling a source routed packet associated with a source routing protocol, wherein the source routed packet includes a header and a payload, wherein the header includes an encoding of a set of hops of a primary path, wherein the header includes an encoding of a set of hops of a protection path configured to protect one of the hops of the primary path. In at least some example embodiments, the encoding of the set of hops of the primary path includes a set of hop identifiers identifying the respective hops of the primary path. In at least some example embodiments, the encoding of the set of hops of the protection path includes a set of hop identifiers identifying the respective hops of the protection path. In at least some example embodiments, the encoding of the hops of the primary path includes an indication that the one of the hops of the primary path is protected by the set of hops of the protection path. In at least some example embodiments, the encoding of the one of the hops of the protection path includes an indication of a quantity of hops in the set of hops of the protection path. In at least some example embodiments, the encoding of the one of the hops of the primary path includes an indication of a quantity of hops in the set of hops of the primary path to be skipped when the protection path is used for the source routed packet. In at least some example embodiments, the encoding of the set of hops of the protection path includes an indication of a quantity of hops in the set of hops of the protection path. In at least some example embodiments, the encoding of the set of hops of the protection path includes an indication of a quantity of hops in the set of hops of the primary path to be skipped when the protection path is used for the source routed packet. In at least some example embodiments, the source routing protocol includes a Multiprotocol Label Switching (MPLS) source routing protocol. In at least some example embodiments, each of the hops of the primary path is encoded using a respective MPLS label. In at least some example embodiments, the one of the hops of the primary path and the hops of the protection path are encoded using a set of MPLS labels. In at least some example embodiments, the set of MPLS labels includes an MPLS label configured to indicate the encoding of the hops of the protection path for the one of the hops of the primary path, an MPLS label encoding the one of the hops of the primary path, an MPLS label including an indication of a quantity of hops in the protection path and an indication of a quantity of hops in the set of hops of the primary path to be skipped when the protection path is used for the source routed packet, and a set of MPLS labels encoding the respective hops of the protection path. In at least some example embodiments, the source routing protocol includes an Internet Protocol (IP) source routing protocol. In at least some example embodiments, wherein the IP source routing protocol includes an IP version 4 (IPv4) source routing protocol or an IP version 6 (IPv6) source routing protocol. In at least some example embodiments, the IP source routing protocol includes an IP version 4 (IPv4) source routing protocol, wherein the hops of the primary path and the hops of the protection path are encoded using a set of fields of an IPv4 Options Header or a set of fields of an IPv4 Shim Header. In at least some example embodiments, the IP source routing protocol includes an IP version 6 (IPv6) source routing protocol, wherein the hops of the primary path and the hops of the protection path are encoded using a set of fields of an IPv6 Routing Header or a set of fields of an IPv6 Shim Header. In at least some example embodiments, the hops of the primary path and the hops of the protection path are encoded using a set of fields an IP Shim Header wherein the IP Shim Header is arranged between an IP Header and a header associated with a transport layer protocol. In at least some example embodiments, the hops of the primary path and the hops of the protection path are encoded using a set of explicit hop elements. In at least some example embodiments, the set of explicit hop elements includes, for the one of the hops of the primary path, a respective explicit hop element including a field identifying the one of the hops of the primary path and a field indicative of a quantity of explicit hop elements in the set of explicit hop elements encoding the hops of the protection path. In at least some example embodiments, the set of explicit hop elements includes, for a final hop in the protection path, a respective explicit hop element including a field identifying the final hop in the protection path and a field indicative of a quantity of the hops of the primary path to be skipped when the protection path is used for the source routed packet. In at least some example embodiments, the means for handling the source routed packet includes means for generating the header for the source routed packet, means for associating the header for the source routed packet with a payload for the source routed packet to form the source routed packet, and means for sending the source routed packet toward a network element. In at least some example embodiments, the means for generating the header for the source routed packet includes means for determining the set of hops of the primary path and the set of hops of the protection path configured to protect the one of the hops of the primary path and means for encoding the set of hops of the primary path and the set of hops of the protection path in the header of the source routed packet. In at least some example embodiments, the means for handling the source routed packet includes means for receiving the source routed packet and means for sending the source routed packet toward the one of the hops of the primary path based on a determination that the one of the hops of the primary path is reachable. In at least some example embodiments, the means for handling the source routed packet includes means for receiving the source routed packet and means for sending the source routed packet toward a first hop of the protection path, using a fast reroute operation based on the encoding of the set of hops of the protection path, based on a determination that the one of the hops of the primary path is not reachable. In at least some example embodiments, the apparatus includes means for supporting advertisement of control plane information configured to support use of the encoding of the set of hops of the protection path configured to protect one of the hops of the primary path. In at least some example embodiments, the control plane information includes at least one of a capability of the apparatus to support use of the encoding of the set of hops of the protection path configured to protect one of the hops of the primary path or protection path encoding information associated with use of the encoding of the set of hops of the protection path configured to protect one of the hops of the primary path. In at least some example embodiments, the control plane information is advertised using at least one of Intermediate System to Intermediate System (IS-IS), Open Shortest Path First (OSPF), OSPF version 3 (OSPFv3), or Border Gateway Protocol (BGP)-Link State (BGP-LS). In at least some example embodiments, the means for supporting advertisement of the control plane information configured to support use of the encoding of the set of hops of the protection path configured to protect one of the hops of the primary path includes means for generating the control plane information and means for sending the control plane information toward at least one network element. In at least some example embodiments, the means for supporting advertisement of the control plane information configured to support use of the encoding of the set of hops of the protection path configured to protect one of the hops of the primary path includes means for receiving the control plane information from at least one network element and means for updating control information at the network element based on the control plane information.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Various example embodiments relate generally to supporting flow-specific fast rerouting of source routed packets in communication networks. Various example embodiments for supporting flow-specific fast rerouting of source routed packets may be configured to support flow-specific fast rerouting of source routed packets based on use of various source routing protocols which may be based on various underlying communication protocols, such as Multiprotocol Label Switching (MPLS), Internet Protocol (IP) version 4 (IPv4), IP version 6 (IPv6), or the like, as well as various combinations thereof. Various example embodiments for supporting flow-specific fast rerouting of source routed packets in communication networks may be configured to support flow-specific fast rerouting of source routed packets by supporting use of a source routed packet including a payload and a header where the header encodes a set of hops of a primary path for the source routed packet and where the header also encodes a set of hops of a protection path configured to protect one of the hops of the primary path for the source routed packet. The hops that are encoded within the header of the source routed packet, including hops of the primary path and hops of the protection path, may be encoded using Fast Reroutable Explicit Hop (FEH) elements, various characteristics of which may vary for different source routing protocols. It is noted that these and various other example embodiments and potential advantages related to supporting flow-specific fast rerouting of source routed packets in communication networks may be further understood by way of reference to the following description and the various figures which are discussed further below.

Figure 1:
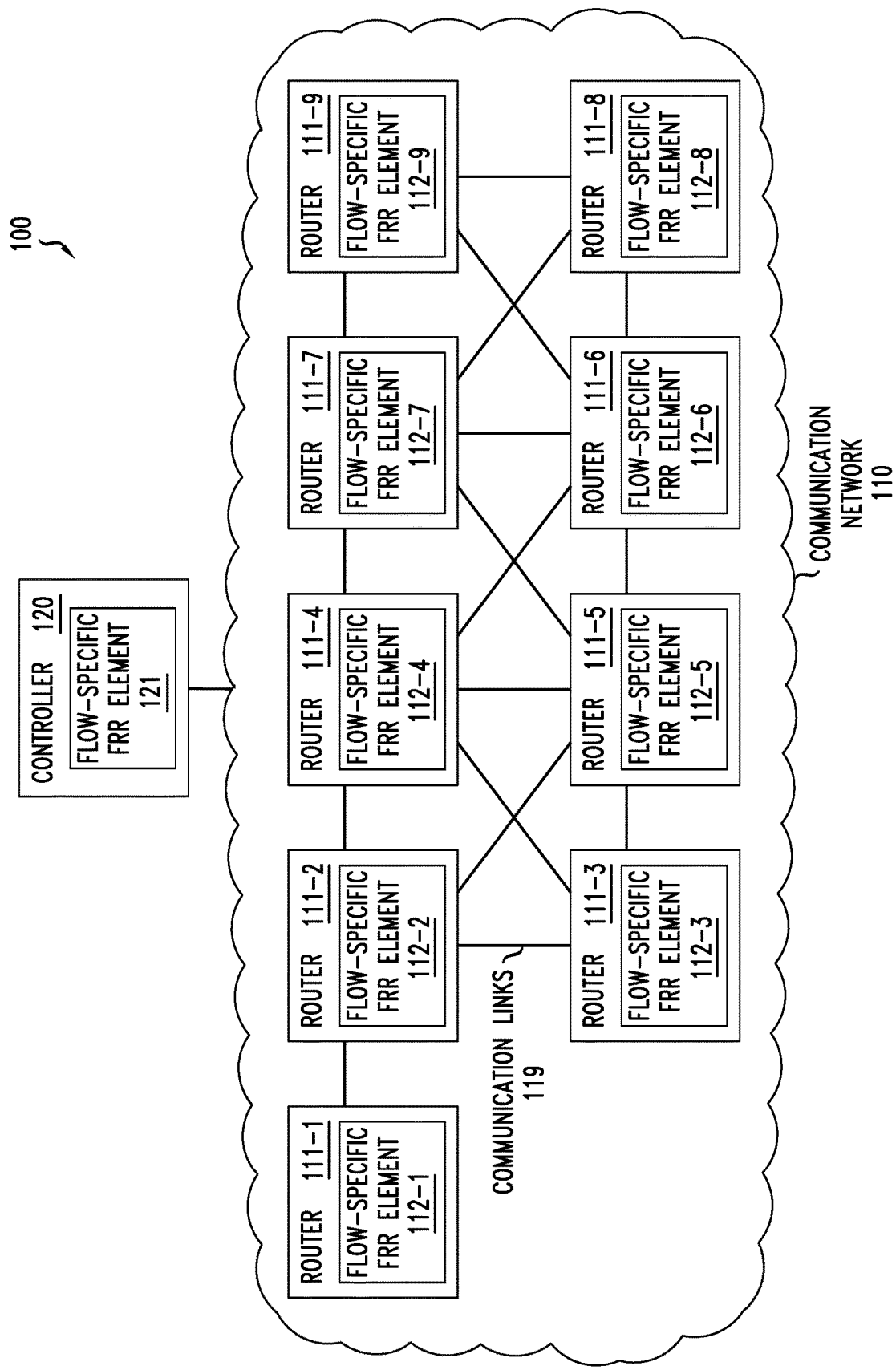
FIG. 1 depicts an example communication system configured to support flow-specific fast rerouting of source routed packets.

FIG. 1 depicts an example communication system configured to support flow-specific fast rerouting of source routed packets.

The communication system 100 includes a communication network 110 and a controller 120. The communication network 110 is a packet-switched network including a set of routers 111-1-111-9 (collectively, routers 111, which are also referred to herein using the notation Rx) and a set of communication links 119 via which the routers 111 are communicatively connected. The communication network 110 is configured to support various data plane functions and control plane functions for supporting communication of traffic based on source routing. The controller 120 is configured to provide control functions for the communication network 110 (e.g., computing and installing routes within communication network 110, performing monitoring and rerouting functions for communication network 110, or the like, as well as various combinations thereof). The communication system 100 is configured to support various embodiments for supporting flexible traffic routing within the communication network 110. Various embodiments for supporting flexible traffic routing within the communication network 110 may be further understood by first considering various aspects of communication networks.

In general, many packet-switched networks, such as communication network 110, are built on mesh topologies in which there are multiple paths available to reach a given destination. The links in the mesh topology are point-to-point links between routers (illustratively, communication links 119 between routers 111). In general, a path to a destination may go through any number of routers 111, and the path may change at any time due to various conditions (e.g., traffic problems, failed links, failed nodes, or the like). In this type of environment, there are generally at least two possible packet-routing methods available: hop-by-hop destination-based routing and source routing.

In hop-by-hop destination-based routing, a packet has a source address (SA) and a destination address (DA) and, at each router along the route, the router checks the DA and makes a routing decision as to how to forward the packet based on the DA. Thus, decisions are made on a hop-by-hop basis in the network until the packet reaches its destination. In other words, this scheme is similar to getting directions along the way.

In source routing, also called explicit path addressing, a head-end router may partially or completely specify the route that the packet takes through the network. The head-end router discovers an explicit path for a packet flow through the network (e.g., locally or based on interaction with a controller) in advance of sending packets of the packet flow. The explicit path is "encoded" into the packet and transit routers forward the packet based on that explicit path. In general, as discussed further below, source routing may use a loose source route, a strict source route, or a combination thereof.

In general, source routing, as compared with hop-by-hop destination-based routing, reduces the states needed in transit nodes in order for the transit nodes to forward a packet, since each transit node typically maintains forwarding information to next-hop nodes (rather than maintaining forwarding information to each possible packet destination, as in hop-by-hop destination-based routing). A generic method of source routing is explained below with respect to FIG. 1.

In FIG. 1, R1 (the head-end router) decides to send a packet along the path R1-R2-R4-R7-R9. In this example, assume that R1, R2, R3 . . . , R9 are loopback addresses assigned as node/router identifiers. For example, in the IPv4 addressing scheme, R9 may be something like 1.1.1.1. So R1 encodes the explicit path with node identifiers as {R4, R7, R9} into the packet and sends the packet to R2. When R2 receives the packet, it reads and pops the first hop in the explicit path, which is R4, and then forwards the packet to R4 with the explicit path in the packet as {R7, R9}. When R4 receives the packet, it reads and pops the first hop in the explicit path, which is R7, and forwards the packet to R7 with the explicit path {R9}. When R7 receives the packet, it reads and pops the first hop, which is R9, and forwards the packet to R9 without any explicit path. The packet may then be forwarded by destination based routing at R9 and onwards toward the ultimate destination for the packet.

As indicated above, source routing may use a loose source route, in which an intermediate router can choose among multiple paths to reach a specified next hop. For example, if R2 finds that the "optimal" path to R4 is via R2-R3-R4, instead of R3-R4 specified in the packet, then it will not pop R4 from the explicit path and would forward the packet to R3 with the explicit path {R4, R7, R8}. When R3 receives the packet and finds the first hop in the path as R4, it pops R4 since R4 is the immediate next-hop for the packet and sends the packet to R4 with the explicit path {R7, R8}. In other words, when an explicit path includes one or more node identifiers then it may be considered a loose source route since a transit router, for a given node, can choose one among the available paths to reach the specified node (which is a loopback address of the node).

As indicated above, source routing may use a strict source route, in which the head-end router specifies the exact set of links to be taken by the packet. For example, R1 encodes a set of next-hop identifiers such as {R2→R4, R4→R7, R7→R9} to specify the path to be taken by the packet. A next-hop identifier can be represented by the next-hop address on a link. For example, R2→R4 can be encoded as the IP address on R2-R4 link at the R4 end (conversely, R4→R2 means the IP address on R2-R4 link at the R2 end). Using the IPv4 addressing scheme, it is possible to encode something like R2→R4=10.10.10.2 and R4→R2=10.10.10.1, where the R2-R4 link is assigned the subnet 10.10.10.1/30. It is noted that use of a strict source route may be preferable when a packet belonging to a service or application needs to meet strict QoS requirements or SLAs and, thus, needs to follow a strict path with links satisfying the QoS requirements or SLAs.

It is noted that source routing may use a combination of strict source routes and loose source routes. For example, R1 can specify a mix of strict and loose hops such as {R2→R4, R9}. Here, the packet must traverse the R2→R4 next-hop to reach R4, but R4 may choose one of the available paths between R4 and R9.

Source routing techniques may be used in conjunction with various different communication protocols. For example, as discussed further below, source routing techniques may be used in conjunction with MPLS (MPLS-based source routing), IPv4 (IPv4 source routing), IPv6 (IPv6 source routing), or the like, as well as various combinations thereof.

MPLS-based source routing provides a generic/unified mechanism for routing various protocol families with minimal overhead. Source Routing in MPLS can be achieved by stacking a list of labels on the packet, where each label identifies a node or a next-hop along the explicit path. An MPLS label is 4 bytes in size and is encoded as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+  Label
|              Label Value              | Exp |S|      TTL      |  Stack
+-+-+-+-+-+-+-+-+-+-+-+-+-+-+-+-+-+-+-+-+-+-+-+-+-+-+-+-+-+-+-+-+  Entry
```

A variant of strict source routing with constraints is called constraint-based source routing (CBSR), which generally works as follows. The network includes network elements (e.g., nodes and links) that are arranged in a topology. Various Traffic Engineering (TE) parameters are assigned into the network elements. For example, the TE parameters of a network element may describe characteristics such as cost, delay, throughput, available bandwidth, packet loss, or the like, as well as various combinations thereof. The topology and TE parameters of the network elements are learned by a path computation element (PCE) and are maintained in a centralized traffic engineering (TE) database (TEDB) hosted by the PCE. For example, the PCE may be an external agent such as an SDN controller, a server, or the like. The PCE can learn the topology and TE parameters by listening to link-state advertisements (LSAs) from one or more Interior Gateway Protocols (IGPs) (e.g., Intermediate System to Intermediate System (IS-IS), Open Shortest Path First (OSPF), OSPF version 3 (OSPFv3), or the like) running among the routers, by using a Border Gateway Protocol (BGP) (e.g., BGP-Link State (BGP-LS), e.g., as defined in RFC 7752, or the like), by using a push/pull mechanism to gather such information from the routers, or the like, as well as various combinations thereof The head-end router classifies packets into flows based on an application or a service, where each flow may be associated with a specific QoS requirement or SLA. The head-end router sends a request to the PCE for the PCE to compute an explicit path (typically the optimal path) that meets specified QoS requirements or SLA. The PCE typically computes such a path by running a Constraint Shortest Path First (CSPF) process based on the TEDB. Once a path is allocated, the PCE updates the dynamic TE state (e.g., residual bandwidth) of the network elements along that path into the TEDB to reflect that TE resources allocated to the path have been reserved. The head-end router sends all packets belonging to a flow over the explicit path that meets the QoS requirement/SLA of the flow. The explicit path is encoded into the packet. Thus, it is possible that packets of different flows to the same destination follow diverse paths. It is noted that, since per flow states are maintained at the head-end router, and the transit routers are agnostic of a flow (including the associated QoS requirement/SLA of the flow), this results in significant reduction of cost and complexity at the transit routers.

The MPLS label, as indicated above, includes a Label Value field, an Experimental Use field (denoted as Exp), a Bottom of Stack field (denoted as S), and a Time to Live (TTL) field. The Label Value field includes a 20-bit label value. The Experimental Use field is a 3-bit field for experimental use. The Bottom of Stack field is a 1-bit field which indicates whether this label is the last (oldest) label in the label stack. The Time to Live field is an 8-bit field that indicates a TTL value for the packet. In other words, an MPLS label includes 4 bytes.

MPLS-based source routing, as noted above, provides a generic/unified mechanism for routing various protocols families with minimal overhead. For example, for an explicit path using IPv4 source routing based on RFC 791 (within SSR/LSR Option), 30 IPv4 hops will consume 143 bytes (which includes 20 bytes of IPv4 Header plus 123 bytes of IPv4 SSR/LSR Option (including 3 fixed header bytes and 30 four-byte IPv4 addresses)); however, if IPv4 packets are routed on the same path over MPLS, then the explicit path will consume just 30×4 bytes=120 bytes (which is approximately a 16.08% reduction). Similarly, for example, for an explicit path using IPv6 source routing based on RFC 2460 (with Routing Extension Header), 30 IPv6 hops will consume 528 bytes (which includes 40 bytes of IPv6 Header plus 488 bytes of Routing Extension Header (including 8 fixed header bytes and 30 sixteen-byte IPv6 addresses); however, if IPv6 packets are routed on the same path over MPLS, then the explicit path will consume just 30×4=120 bytes (which is about a 77.27% reduction). It is noted that, despite the significant potential reductions in overhead, some customers may still prefer native IPv6-based forwarding. It will be appreciated that MPLS may be used to route various other protocols.

MPLS-based source routing may be provided using Segment Routing (SR). SR as a method of source routing in MPLS is being developed in the IETF as "Segment Routing with MPLS Data Plane". In SR, an explicit hop is referred to as a "Segment"—which can be a Node Segment or an Adjacency (Next-Hop) Segment. A label is assigned to each segment. Each router in the SR domain initiates a Node Label that identifies one of its loopback addresses and a set of Adjacency Labels, where each Adjacency Label identifies a next-hop address on a link to an adjacent neighbor. Each router floods those label mappings across the SR domain as attributes to Link State Advertisements (LSA) using protocols such as IGPs (e.g., IS-IS, OSPF, OSPFv3, or the like), BGPs (e.g., BGP-LS or the like), or the like, as well as various combinations thereof. A Label Edge Router (LER), or the sender of a source routed MPLS packet, adds a stack of Node/Adjacency Labels on the packet as the explicit path to be traversed by the packet. A transit router looks up the first label in the stack (which identifies a next-hop node or a local adjacency), pops the first label, and forwards the packet to designated next-hop node or adjacency. This process continues at each transit router along the explicit path, until the label stack becomes empty.

MPLS-based source routing may be provided using CBSR. CBSR in MPLS, which also is referred to as SR-TE, is being developed in the IETF as "Segment Routing Policy for Traffic Engineering". SR-TE is expected to be the replacement of RSVP-TE, which is defined in RFC 3209. RSVP-TE is the state-full approach of explicit path routing, where an MPLS-TE LSP per flow is signaled across a path that meets its QoS requirement. Each transit router along the path maintains per flow/LSP states, both in the control plane and in the data plane. SR-TE is scalable over RSVP-TE under various conditions, such as (1) when head-ends needs to set-up application aware flows at much finer granularity (with the RSVP-TE approach, this will require a very large number of LSPs), (2) when the head-ends need to set-up, teardown, re-optimize flows at short calls and as demanded by applications (e.g., in Web-Scale Data Centers), which is not possible with a signaling based approach, and (3) when there is a need or desire to minimize complexity and states in transit routers.

IPv4 source routing is defined in the original specification of the IPv4 Protocol, RFC 791. Namely, IPv4 source routing is described in Section 3.1 of RFC 791. A node or adjacency identifier in the explicit path is encoded as IPV4 address. Thus, the explicit path is a list of IPV4 addresses. IPv4 source routing may be provided CBSR.

IPv6 source routing is defined in the original specification of the IPv6 Protocol, RFC 2460. Namely, IPv6 source routing is described in Section 4.4 of RFC 2460. IPv6 source routing may be provided using SR (e.g., based on the "Segment Routing in IPv6 Data Plane" defined by the IETF). A node or adjacency identifier in the explicit path is encoded as IPV6 address. Thus, the explicit path is a list of IPV6 addresses. IPv6 source routing may be provided CBSR.

It is noted that, source routing, in addition to being deployed in decentralized paradigms as discussed above (e.g., with distributed distribution of state information using IGPs), also may be deployed within various centralized paradigms. For example, source routing (e.g., in MPLS, IPv4, IPv6, or the like) also may be deployed by a Software Defined Networking (SDN) paradigm, which can eliminate IGPs in transit nodes. SDN is gaining popularity in datacenter networks where a centralized controller functions as an integrated control plane. The SDN controller is called upon to perform computations based on the network topology and current state of the connections within the network, including Traffic Engineering (TE) information. Each router reports its link/adjacency/TE status to the SDN controller. Such status exchange may be done using standard mechanisms like BGP-LS (as defined in RFC 7752) or through proprietary protocols. The SDN controller maintains the TEDB of the network. The SDN controller assigns node and adjacency labels for each node and adjacency in the network and, accordingly, programs the required node and adjacency labels in the nodes under its control. The head-end node (an LER or the sender of a source routed MPLS packet), generates a request to the controller to compute the optimal path to a destination that meets specified QoS of a flow. The SDN controller runs CSPF (or other related techniques) on the TE DB and responds to the head-end node with the explicit path containing the node/adjacency labels that meet the requested QoS. The head-end node then adds the explicit path label stack on top of the packet and sends the packet across the network. The transit routers along the explicit path handle forwarding of the packet based on the explicit path label stack.

In source routing, Fast Reroute (FRR) may be used to provide resiliency against various types of failures which may impact delivery of packets routed using source routing. In general, FRR is a mechanism for protecting traffic from link failures or node failures by locally repairing or rerouting traffic at a point of local repair (PLR), thereby allowing continuity of the impacted flows until the source node starts sending packets over the alternate path computed by the PCE. The use of FRR may be further understood by way of reference to an example based on FIG. 1. In FIG. 1, assume that R1 is sending packets for two flows as follows: flow A with the strict path {R2→R4, R4→R7, R7→R9} and flow B with the strict path {R2→R4, R4→R6, R6→R8, R8→R9}. If the R2→R4 link fails or the R4 node fails, then it could take several seconds to propagate the failure to the PCE, after which an alternate end-to-end path is re-computed by the PCE and R1 is notified of the alternate path so that R1 can begin sending packets over the alternate path. However, since a source routing paradigm is used to provide strict QoS requirement or SLA guarantees of an application or service (translated into flows), R2 should be able to "locally" re-route traffic of a flow around the failure (local repair), until the alternate path is re-computed by the PCE (global repair). As indicated above, this type of local rerouting may be provided using FRR.

In general, and as indicated above, FRR is a mechanism for protecting traffic from link failures or node failures by locally repairing or rerouting traffic at a PLR, thereby allowing continuity of the impacted flows until the source node starts sending packets over the alternate path computed by the PCE. In the example above, as indicated above, R2 would be the PLR which would apply FRR to protect the traffic from the failure (namely, when the R2→R4 link fails or the R4 node fails). It is noted that, in FRR, a PLR node typically is supposed to guarantee re-routing of traffic within 0-50 milliseconds (typically referred to as "sub-50 ms"), which is generally significantly faster than the time it takes for the PCE to re-compute an alternate path and to notify the head-end node of the alternate path. In general, FRR mechanisms are typically based on the principles of FRR computation, FRR programming, and FRR forwarding, each of which is discussed further below.

As indicated above, FRR is typically based on FRR computation. For each PLR, a protection path against a next-hop node or adjacency is precomputed for resiliency against failure of that next-hop or adjacency. A protection path is a detour, or bypass, around the failure. There are two types of protection paths: link protection and node protection.

A protection path configured for link protection is a path that bypasses a single link. In FIG. 1, for example, {R2→R3, R3→R4} is the link protection path that protects adjacency on link R2→R4. This protection path terminates at the node on the remote end of the protected link, which is R4. R4 is called the Merge Point (MP), as it is the node where the protection path merges with the primary path.

A protection path configured for node protection is a path that bypasses a next-hop node to protect against failure of that next-hop node. In FIG. 1, for example, {R2→R3, R3→R5, R5→R7} is one node protection path that can protect against failure of R4. It terminates at a node subsequent to the protected node, which is R7 (the MP). It is noted that a node protection path also provides protection from link failure (e.g., R2→R4 link failure in FIG. 1), which, in general, makes node protection a superior and preferred approach.

It is noted that FRR generally provides protection against single failure in the network, such that, if protection path also fails at the same time then traffic cannot be forwarded. The computation of a protection path is generally a complex procedure, and computation procedures generally build on proven IP-FRR concepts such as Loop Free Alternate (LFA) as defined in RFC 5286, Remote-LFA (RLFA) as defined in RFC 7490, Remote LFAs with Directed Forwarding (DLFA), Topology Independent LFA (TI-LFA), or the like, as well as various combinations thereof. These procedures generally try to compute a protection path that is "loop-free", meaning that it is guaranteed that a packet forwarded on the protection path will not be looped back towards the PLR.

As indicated above, FRR is typically based on FRR programming. The protection path is preprogramed in the data plane of a PLR. For example, assume that R2 decided to use the protection path {R2→R3, R3→R4} to protect against failure of the R2→R4 link. In this example, R2 could preprogram the protection path {R2→R3, R3→R4} in the data plane as a "backup" of {R2→R4} for use in fast rerouting of traffic as soon as R2→R4 fails. It is noted that preprogramming of protection path increases the data plane state in the PLR node.

As indicated above, FRR is typically based on FRR forwarding. When the R2→R4 link fails, flow A and flow B are diverted along the link protection path {R2→R3, R3→R4}. Upon receiving a packet, R2 pops the first hop {R2→R4} from the explicit path list and finds that corresponding next-hop has failed. So, it decides to re-route along the protection path. R2 pushes the protection path (list of hops along the protection path) on top of the packet and forwards the packet to the first next-hop in the protection path. The PLR encodes the protection path in a way such that it is consistent with the forwarding state in the MP. For example, R2 diverts flow A and flow B to R3 with the updated paths as {R3→R4, R4→R7, R7→R9} and {R3→R4, R4→R6, R6→R8, R8→R9}, respectively. It is noted that the first hop in the protection path, i.e., {R2→R3}, does not need to be pushed onto the packet by R2 as it is the immediate next-hop for R2 and, thus, R2 knows to send the packets to R3.

Various example embodiments may be configured to provide improved FRR within the context of source routing by supporting flow-specific fast rerouting of source routed packets.

Various example embodiments for supporting flow-specific fast rerouting of source routed packets may be configured to support flow-specific fast rerouting of source routed packets in a manner that enables QoS requirements and SLAs of individual flows to be satisfied even during fast reroutes. In FRR solutions, the flows experiencing a common link failure are fast rerouted via a common protection path which is programmed at the PLR without awareness of the flows (e.g., applications or services) traversing the failed next-hop, such that the common protection path may not meet the QoS requirements and SLAs of the individual flows. This may be seen by considering an example based on FIG. 1 where, if flows A and B experience a common link failure and are fast rerouted via a common protection path {R2→R3, R3→R4}, the common protection path {R2→R3, R3→R4} may not meet the QoS requirements or SLA for both of the flows (e.g., protection path {R2→R3, R3→R4} may satisfy QoS for flow A but not for flow B, whereas {R2→R3, R3→R5, R5→R4} is another link protection path that is available and that could have satisfied the QoS for flow B but is not used for fast-routing of flow B). Additionally, it is noted that, in the source routing paradigm, it is generally not possible to program flow-specific protection paths at the PLR since the PLR is stateless and is agnostic of flow specifications at head-end nodes.

Various example embodiments for supporting flow-specific fast rerouting of source routed packets may be configured to support flow-specific fast rerouting of source routed packets while tending to reduce or even minimize the complexity (e.g., computations, states, processing, or the like) at the transit nodes. Various example embodiments for supporting flow-specific fast rerouting of source routed packets, by encoding the protection paths within the source routed packets, obviate the need for the PLR to be preprogrammed with protection paths since the PLR is able to determine the protection paths from the source routed packets, thereby reducing or even minimizing the complexity (e.g., computations, states, processing, or the like) at the PLR (which may include any transit nodes along the path).

Various example embodiments for supporting flow-specific fast rerouting of source routed packets may be configured to support flow-specific fast rerouting of source routed packets in a manner that provides both link protection and node protection. The ability of various example embodiments for supporting flow-specific fast rerouting of source routed packets to provide node protection for source routed packets overcomes limitations of FRR methods (e.g., SR and SR-TE) that do not currently support node protection for source routed packets. This may be seen from the example of the failure of node R4. The problem here is that R2 is agnostic of the "next" next-hop (which decides the MP in case of a node failure) that a packet would take after traversing R4 (i.e., R4→R7 for flow A and R4→R6 for flow B). The semantics of the next-next-hop in the explicit path is meaningful to R4 alone. So, R2 is not aware that MP for flow A is R7 and MP for flow B is R6. This problem may be overcome by (1) programming a copy of the entire data plane state of R4 into R2, so that R2 is aware of each of the possible next-hops (candidates for MP) of R4 and (2) preprogramming into the data plane a node protection path to each candidate MP. In this case, the modified data plane at R2 would be: (1) Next-hop Entry R2→R4=>Neighbor R4 and (2) a data plane that includes: (a) [Next-hop Entry R4→R2=>Neighbor R2; Protection-path=None], (b) [Next-hop Entry R4→R3=>Neighbor R3; Protection-path={R2→R3}], (c) [Next-hop Entry R4→R5=>Neighbor R5; Protection-path={R2→R5}], (d) [Next-hop Entry R4→R6=>Neighbor R6; Protection-path={R2→R5, R5→R6}], and (e) [Next-hop Entry R4→R7=>Neighbor R7; Protection-path={R2→R5, R5→R7}]. In this example, assume that node R4 fails or the link R2→R4 fails, then for flow A: (1) R2 receives a packet for flow A with strict path {R2→R4, R4→R7, R7→R9}, (2) R2 pops R2→R4 and finds R2→R4 is down, (3) R2 looks up the next-next-hop R4→R7 in the copy of the data plane of R4, which returns the MP as R7 and the protection path {R2→R5, R5→R7}, and (4) the packet is fast re-routed to R5 with the updated explicit path on the packet as {R5→R7, R7→R9}. Similarly, in this example, assume that node R4 fails or the link R2→R4 fails, then for flow B: (1) R2 receives a packet for flow B with strict path {R2→R4, R4→R6, R6→R8, R8→R9}, (2) R2 pops R2→R4 and finds R2→R4 is down, (3) R2 looks up the next-next-hop R4→R6 in the copy of the data plane of R4, which returns the MP as R6 and protection path {R2→R5, R5→R6}, and (4) the packet is fast re-routed to R5 with the updated path as {R5→R6, R6→R8, R8→R9}. It is noted that use of such a solution requires a PLR node to keep a copy of the forwarding database of each neighbor router such that, if there are N neighbors and each neighbor has on an average of M adjacencies, then the node needs to keep N×M additional states in data plane, which goes against the stateless approach to source routing. It is further noted that this solution requires the PLR node needs to be reprogrammed for every change happening in the forwarding databases of each neighbor, which leads to a ripple effect. It is further noted, since the PLR is agnostic of individual flow specifications, the PLR cannot determine the optimal node protection path for a flow (there may be multiple node protection paths to the same MP), such that this sub-optimal solution fails to provide flow specific FRR.

Various example embodiments for supporting flow-specific fast rerouting of source routed packets may be configured to support flow-specific fast rerouting of source routed packets, for guaranteeing QoS/SLA per flow, in the event of a link failure or a node failure while still enabling the PLR to be agnostic of flow specifications and the associated QoS requirements/SLAs of those flows. Various example embodiments for supporting flow-specific fast rerouting of source routed packets may be configured to provide one-to-one protection of stateful flows in state-less source routing paradigms such as MPLS-based source routing, IPv4 source routing, IPv6 source routing, and so forth.

It is noted that the ability to use various types of source routing (e.g., MPLS-based source routing, IPv4 source routing, IPv6 source routing, or the like) in various deployment scenarios (e.g., decentralized deployment scenarios or centralized deployment scenarios as discussed above) may be generalized in various ways. The ability to use various types of source routing (e.g., MPLS-based source routing, IPv4 source routing, IPv6 source routing, or the like) in various deployment scenarios may be generalized by considering generalized availability of a PCE that is configured to compute source routed paths (e.g., where the PCE may be deployed on the source node of the path (e.g., in the case of a decentralized deployment), a centralized controller (e.g., in the case of a centralized deployment), or the like). The ability to use various types of source routing (e.g., MPLS-based source routing, IPv4 source routing, IPv6 source routing, or the like) in various deployment scenarios may be generalized by considering generalized availability of PLRs that are configured to perform flow-specific fast reroute operations on source routed paths. Various example embodiments for supporting flow-specific fast rerouting of source routed packets may be agnostic of whether explicit path computation is performed by the source node or by a centralized controller, since the source routed packets encode the protection paths which may be used at the PLRs for fast rerouting of source routed packets. Thus, in various example embodiments for supporting flow-specific fast rerouting of source routed packets, the term PCE may be used generically to refer to the entity that is responsible for explicit path computation and the term PLR may be used generically to refer to the entity that performs a fast reroute based on a protection path encoded within a source routed packet. The various elements of FIG. 1 may include various elements configured to provide various functions supporting flow-specific fast rerouting of source routed packets.

As depicted in FIG. 1, the communication system 100 is configured to support various example embodiments of flow-specific fast rerouting of source routed packets. The routers 111-1-111-9 include flow-specific FRR elements 112-1-112-9 (collectively, flow-specific FRR elements 112), respectively. The flow-specific FRR elements 112 of the routers 111 may be configure to provide various functions of various embodiments for supporting flow-specific fast rerouting of source routed packets as presented herein (e.g., source node functions including generation of source routed packets using flow-specific fast rerouting, transit node functions including handling of source routed packets using flow-specific fast rerouting, or the like, as well as various combinations thereof). The controller 120 includes a flow-specific FRR element 121. The flow-specific FRR element 121 of the controller 120 may be configure to provide various functions of various embodiments for supporting flow-specific fast rerouting as presented herein (e.g., source routing path computation, control plane functions, or the like, as well as various combinations thereof).

Various example embodiments for supporting flow-specific fast rerouting of source routed packets may be configured to support flow-specific FRR for various types of source routing (e.g., MPLS-based source routing, IPv4 source routing, IPv6 source routing, or the like, as well as various combinations thereof).

Various example embodiments for supporting flow-specific fast rerouting of source routed packets may be configured to support flow-specific fast rerouting of source routed packets based on configuration of source routed packets for flow-specific fast rerouting.

Various example embodiments for supporting flow-specific fast rerouting of source routed packets may be configured to support flow-specific fast rerouting of a source routed packet by supporting a source routed packet configured as follows. The source routed packet includes a payload and a header. The header of the source routed packet includes an explicit encoding of a primary path composed of a set of hops. The explicit encoding of the primary path may be an explicit encoding of the hops of the primary path. The header of the source routed packet includes, for each of one or more hops of the primary path, an explicit encoding of a protection path, composed of a set of hops, configured to protect that hop of the primary path. The explicit encoding of the protection path for a hop of the primary path may include an identification of the hop of the primary path being protected by the protection path. The explicit encoding of the protection path may include an explicit encoding of the hops of the protection path. The explicit encoding of the protection path may include an indication that the source routed packet includes an explicit encoding of a protection path, e.g., for enabling a receiving node to distinguish between the explicit encoding of the primary path and the explicit encoding of the protection path. The explicit encoding of the protection path may include an indication of the length of the encoding of the protection path (e.g., a quantity of hops encoded, a length of the encoding of the hops, or the like), e.g., for enabling a receiving node to distinguish between the explicit encoding of the primary path and the explicit encoding of the protection path. The hops that are encoded within the header of the source routed packet, including hops of the primary path and hops of the protection path, may be encoded using Fast-Reroutable Explicit Hop (FEH) elements, which may vary for different types of source routing. For example, in MPLS-based source routing, as discussed further below, the FEH elements may be labels in a label stack. For example, in IPv4 source routing, as discussed further below, the FEH elements may be fields within an IPv4 Header Option, fields within an IPv4 Shim Header, or the like. For example, in IPv6 source routing, as discussed further below, the FEH elements may be fields within an IPv6 Routing Header, fields within an IPv6 Shim Header, or the like. The source routed packet may be generated by a source node and processed by nodes along the source routed path (e.g., for routing along the primary path in the absence of failure conditions, for routing along the protection path(s) during failure conditions, and so forth). The handling of source routed packets in this manner may be further understood by considering various functions supported by the source node of the source routed path and various functions supported by transit nodes of the source routed path, as discussed further below.

Various example embodiments for supporting flow-specific fast rerouting of source routed packets may be configured to support flow-specific fast rerouting of source routed packets by processing a source routed packet and sending the source routed packet toward a network element. The processing of the source routed packet that is performed, as discussed further below, may depend on the node at which the source routed packet is being processed (e.g., a source node of the source routed path, a transit node of the source routed path, or the like).

Figure 2:
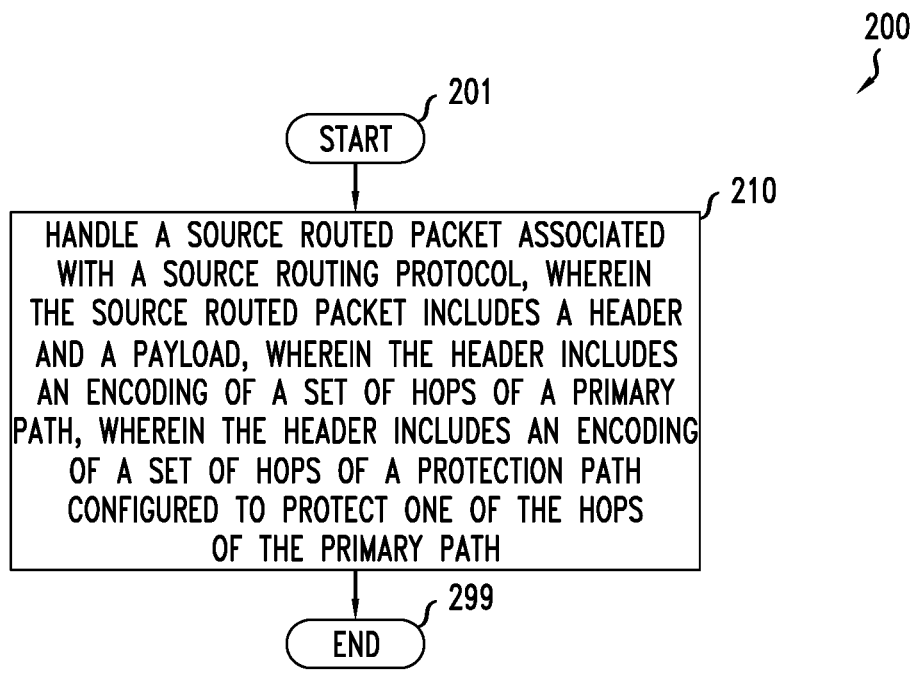
FIG. 2 depicts an example embodiment of a method for use by a network element to handle a source routed packet based on flow-specific fast rerouting.

FIG. 2 depicts an example embodiment of a method for use by a network element to handle a source routed packet based on flow-specific fast rerouting. It will be appreciated that the method 200 of FIG. 2 may be performed by a source node of the source routed path, a transit node of the source routed path, or a destination node of the source routed path. It will be appreciated that, although primarily presented herein as being performed serially, at least a portion of the functions of method 200 may be performed contemporaneously or in a different order than as presented in FIG. 2. At block 201, method 200 begins. At block 210, a source routed packet associated with a source routing protocol is handled. The source routed packet includes a header and a payload. The header includes an encoding of a set of hops of a primary path. The header includes an encoding of a set of hops of a protection path configured to protect one of the hops of the primary path. It will be appreciated that the handling of the source routed packet may depend on the role of the network element, such as whether the network element is operating as a source node for the source routed packet, a transit node for the source routed packet (and, for a transit node, whether the transit node is operating as a pass-through node on the primary path or the protection path, as a PLR for the primary path, or as an MP for the primary path), or a destination node for the source routed packet. For example, handling of the source routed packet when the network element is operating as a source node of the source routed packet may include generating the source routed packet (e.g., obtaining the path for the source routed packet, generating the header for the source routed packet including encoding the primary path and protection path within the header and associating the header with a payload to form the source routed packet) and sending the source routed packet toward a next hop node. For example, handling of the source routed packet when the network element is operating as a transit node of the source routed packet may include receiving the source routed packet, processing the source routed packet (e.g., determining handling of the source routed packet, modifying a header of the source routed packet, or the like, as well as various combinations thereof), and sending the source routed packet toward a next hop node (e.g., a next-hop node of the primary path where FRR is not used or a first hop node of the protection path where FRR is used). For example, handling of the source routed packet when the network element is operating as a destination node of the source routed packet may include receiving the source routed packet, processing the source routed packet (e.g., determining handling of the source routed packet, determining handling of the payload of the source routed packet, or the like, as well as various combinations thereof), and sending the payload of the source routed packet toward a downstream network element. At block 299, method 200 ends. It will be appreciated that, although primarily presented with respect to an embodiment in which the header of the source routed packet includes an encoding of a protection path for one of the hops of the primary path, the header of the source routed packet may include encodings of protection paths for multiple hops of the primary path or even for all of the hops of the primary path.

In at least some embodiments, as indicated above, the handling of the source routed packet at a node may depend on the role of the node at which the source routed packet is being handled or processed (e.g., a source node of the source routed path, a transit node of the source routed path, or a destination node of the source routed path).

In at least some embodiments for example, at the source node of the source routed path for the source routed packet, handling of the source routed packet may include generating the source routed packet and sending the source routed packet toward a network element. The source routed packet may be generated by generating the header for the source routed packet and associating the header with a payload to form the source routed packet. The header of the source routed packet may be generated by determining a set of hops of the primary path for the source routed packet, determining a set of hops of a protection path configured to protect one of the hops of the primary path, and encoding the hops of the primary path and the hops of the protection path within the packet header of the source routed packet. The header may include encodings of protection paths for one, some, or all of the hops of the primary path. The hops that are encoded within the header of the source routed packet, including hops of the primary path and hops of the protection path, may be encoded using FEH elements which, as indicated above and discussed further below, may vary for different types of source routing.

It will be appreciated that the source node of the source routed path for the source routed packet may be configured to perform various other functions for supporting flow-specific fast rerouting of the source routed packet.

Figure 3:
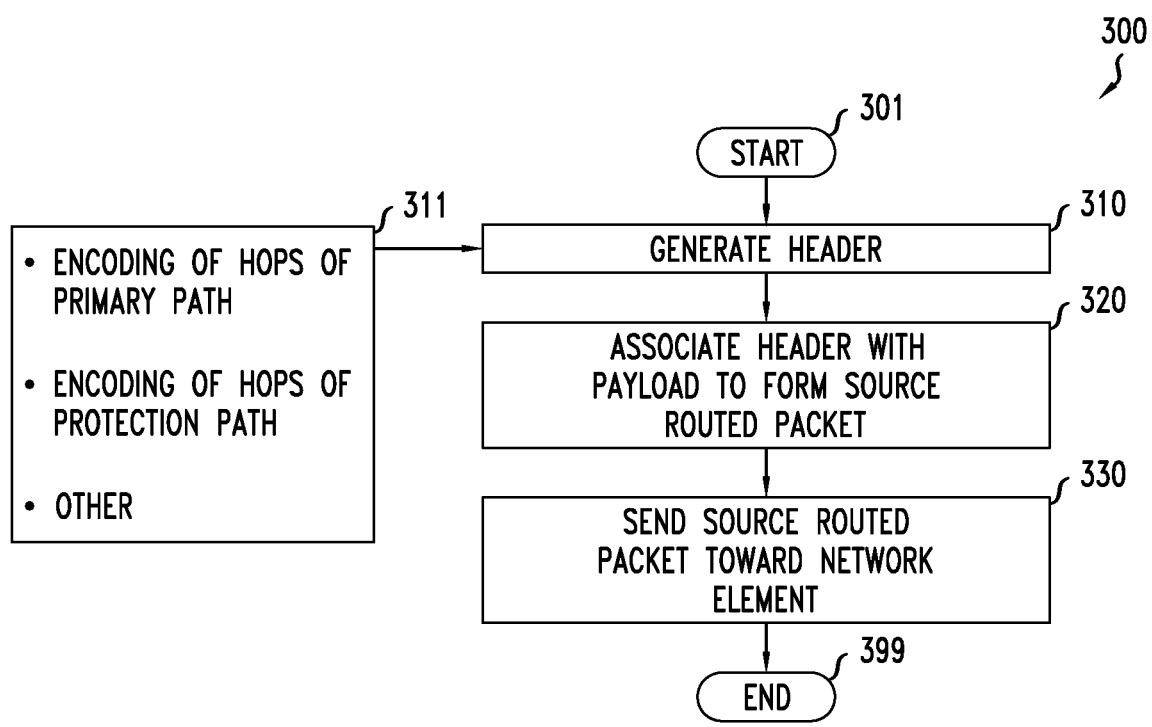
FIG. 3 depicts an example embodiment of a method for use by a source node to handle a source routed packet based on flow-specific fast rerouting.

FIG. 3 depicts an example embodiment of a method for use by a source node to handle a source routed packet based on flow-specific fast rerouting. It will be appreciated that, although primarily presented herein as being performed serially, at least a portion of the functions of method 300 may be performed contemporaneously or in a different order than as presented in FIG. 3. At block 301, method 300 begins. At block 310, a header is generated. As indicated by block 311, the header includes an encoding of a set of hops of a primary path and an encoding of a set of hops of a protection path configured to protect one of the hops of the primary path. The primary path and the protection path may be determined by the source node in various ways (e.g., local computation by a PCE at the source node, obtained by the source node from a remote PCE (e.g., controller or other element), or the like. The hops may be encoded within the header in various ways, which may vary for different source routing protocols. It will be appreciated that the header may include various other information. At block 320, the header is associated with a payload to form a source routed packet. At block 330, the source routed packet is sent toward a network element. At block 399, method 300 ends.

Figure 4:
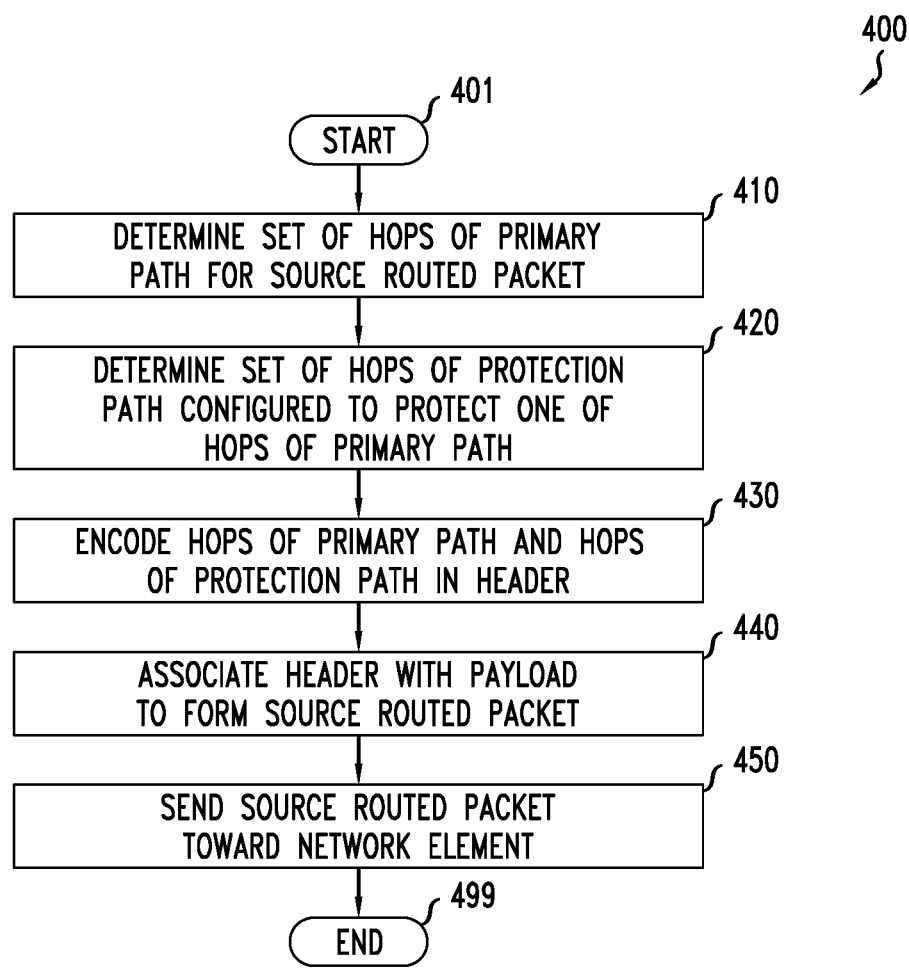
FIG. 4 depicts an example embodiment of a method for use by a source node to handle a source routed packet based on flow-specific fast rerouting.

FIG. 4 depicts an example embodiment of a method for use by a source node to handle a source routed packet based on flow-specific fast rerouting. It will be appreciated that, although primarily presented herein as being performed serially, at least a portion of the functions of method 400 may be performed contemporaneously or in a different order than as presented in FIG. 4. At block 401, method 400 begins. At block 410, a set of hops of a primary path, for a source routed packet, is determined. The source node may determine the set of hops of the primary path by computing the primary path (e.g., where the PCE is included on the source node), by obtaining the primary path from a remote PCE (e.g., a controller or other element), or the like. At block 420, a set of hops of a protection path, configured to protect one of the hops of the primary path for the source routed packet, is determined. The source node may determine the set of hops of the protection path by computing the protection path (e.g., where the PCE is included on the source node), by obtaining the protection path from a remote PCE (e.g., controller or other element), or the like. At block 430, the hops of the primary path and the hops of the protection path are encoded within a header. The encoding of the hops of the primary path and the hops of the protection path within the header may be performed using FEH elements within the header. The encoding of the hops of the primary path and the hops of the protection path within the header may be performed based on the source routing protocol of the source routed packet. At block 440, the header is associated with a payload to form the source routed packet. At block 450, the source routed packet is sent toward a network element. At block 499, method 400 ends.

It will be appreciated that various functions presented herein as being supported by a source node of a source routed path may be performed in various combinations for supporting various example embodiments of flow-specific fast rerouting of source routed packets.

In at least some embodiments, for example, at a transit node of the source routed path for the source routed packet, handling of the source routed packet may include receiving the source routed packet, processing the source routed packet, and sending the source routed packet toward a network element. The processing of the source routed packet may include determining a next hop for the source routed packet. The next hop for the source routed packet may be a hop on the primary path or a hop on the protection path. The processing of the source routed packet may include modifying a header of the source routed packet (e.g., removing one or more encodings of one or more hops of the source routed path, modifying one or more fields associated with one or more encodings of one or more hops of the source routed path, or the like, as well as various combinations thereof), The processing of the source routed packet may depend on whether the transit node is a transit node of the primary path (e.g., where the processing may depend on whether or not the next hop is protected by a protection path and, if protected, whether or not the protection path is used based on an FRR operation) or a transit node of a protection path protecting the primary path (e.g., where the processing may depend on whether or not the transit node is an MP back to the primary path for the source routed packet).

In at least some embodiments, for example, at a transit node of the primary path for the source routed packet, processing of the source routed packet may include determining forwarding of the source routed packet (e.g., determining whether the source routed packet is to be routed over the primary path or is to be directed onto a protection path associated with the primary path). The determining of the forwarding of the source routed packet may include determining, from the header of the source routed packet, a next hop of the primary path for the source routed packet, determining whether the next hop of the primary path is protected by a protection path, determining a status of the next hop of the primary path for the source routed packet, and determining forwarding of the source routed packet based on the status of the next hop of the primary path for the source routed packet.

The determining of the forwarding of the source routed packet may include determining that the source routed packet is to be forwarded via the primary path based on a determination that the next hop of the primary path is operational. The processing of the source routed packet, when the next hop of the primary path is protected by a protection path, may include modifying the header of the source routed packet to ensure that the protection path is not used for forwarding the source routed packet (e.g., remove the encoding of the hops of the protection path from the header). The source routed packet may then be forwarded toward the next hop of the primary path.

The determining of the forwarding of the source routed packet may include determining that the source routed packet is to be forwarded via the protection path based on a determination that the next hop of the primary path is not operational and that the next hop of the primary path is protected by the protection path. The determining of the forwarding of the source routed packet, when the source routed packet is forwarded via the protection path, may include determining a first hop in the protection path. The processing of the source routed packet, when the source routed packet is forwarded via the protection path, may include encoding remaining hops of the protection path (other than the first hop) as new hops in the primary path of the source routed packet. The processing of the source routed packet, when the source routed packet is forwarded via the protection path, may include updating one or more other fields in the header of the source routed packet (e.g., to indicate a number of protection hops left, to indicate that one or more hops of the primary path are to be ignored due to routing of the source routed packet via the protection path, or the like, as well as various combinations thereof). The source routed packet may then be forwarded toward the first hop in the protection path.

In at least some embodiments, for example, at a transit node of the protection path for the source routed packet, processing of the source routed packet may include determining handling of the source routed packet (e.g., determining whether the source routed packet is to be forwarded to an intermediate node of the protection path or is to be forwarded to a final hop of the protection path which is also a merge point back onto the primary path for the source routed packet). The determining of the handling of the source routed packet may include determining, from the header of the source routed packet, a hop of the protection path to be considered by the transit node in determining forwarding of the source routed packet. The processing of the source routed packet, based on a determination that the current hop in the protection path is not the final hop in the protection path (and, thus, that the source routed packet will continue along the protection path before re-converging with the primary path), may include updating one or more encodings of one or more other hops in the protection path. The processing of the source routed packet, based on a determination that the current hop in the protection path is the final hop in the protection path (and, thus, that the source routed packet will re-converge with the primary path at the next hop node), may include updating one or more encodings of one or more hops in the primary path (e.g., to indicate that one or more hops of the primary path are to be ignored due to routing along the protection path, to remove one or more hops of the primary path that are no longer needed due to routing along the protection path, or the like, as well as various combinations thereof). The forwarding of the source routed packet based on the hop of the protection path may include forwarding the source routed packet toward a next hop indicated by the hop of the protection path (which, again, may be a hop of the protection path or a hop that is an MP back into the primary path for the source routed packet).

It will be appreciated that transit nodes of the source routed path for the source routed packet may be configured to perform various other functions for supporting flow-specific fast rerouting of the source routed packet.

Figure 5:
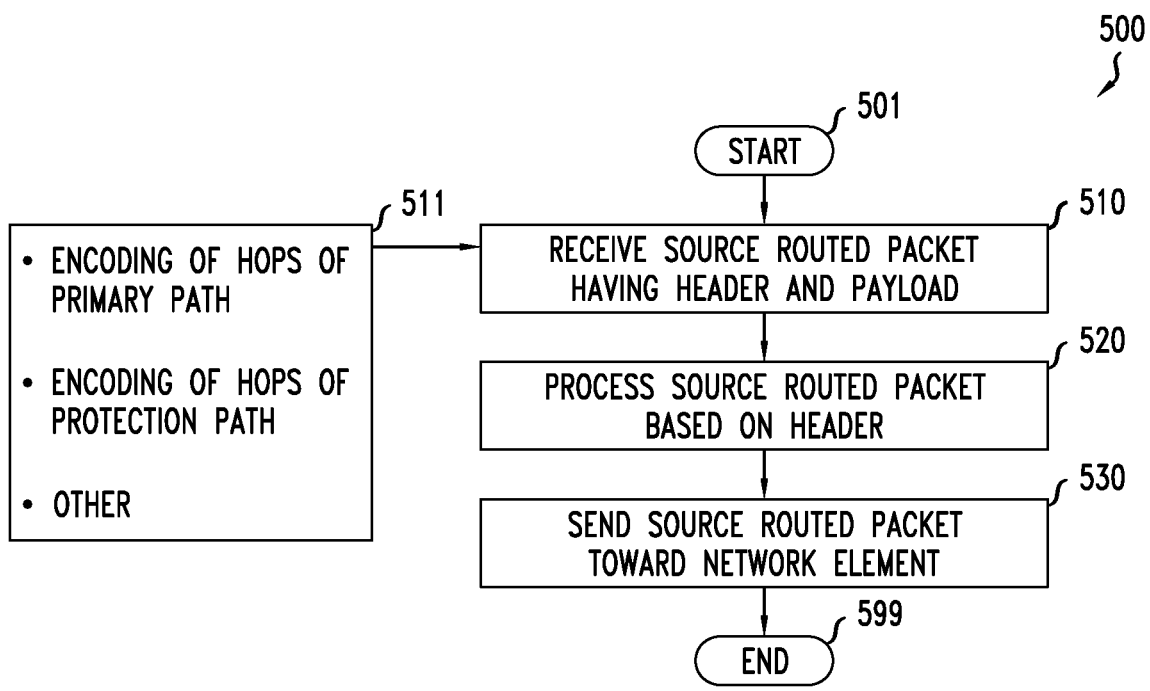
FIG. 5 depicts an example embodiment of a method for use by a transit node to handle a source routed packet based on flow-specific fast rerouting.

FIG. 5 depicts an example embodiment of a method for use by a transit node to handle a source routed packet based on flow-specific fast rerouting. It will be appreciated that, although primarily presented herein as being performed serially, at least a portion of the functions of method 500 may be performed contemporaneously or in a different order than as presented in FIG. 5. At block 501, method 500 begins. At block 510, a source routed packet is received. The source routed packet includes a header and a payload. As indicated by block 511, the header includes an encoding of a set of hops of a primary and an encoding of a set of hops of a protection path configured to protect one of the hops of the primary path (which is referred to as the protected hop). The hops may be encoded within the header in various ways, which may vary for different source routing protocols. It will be appreciated that the header may include various other types of information. At block 520, the source routed packet is processed based on the header. The processing of the source routed packet may include determining handling of the source routed packet based on the header. The determining of the handling of the source routed packet may include determining a next hop for the source routed packet based on the encodings of the hops within the header of the source routed packet. The processing of the source routed packet also may include modification of the header of the source routed packet (e.g., removing one or more encodings of one or more hops of the source routed path, modifying one or more fields associated with one or more encodings of one or more hops of the source routed path, or the like, as well as various combinations thereof). At block 530, the source routed packet is sent toward a network element. The network element may be a hop of the primary path or a hop of the protection path. At block 599, method 500 ends.

Figure 6:
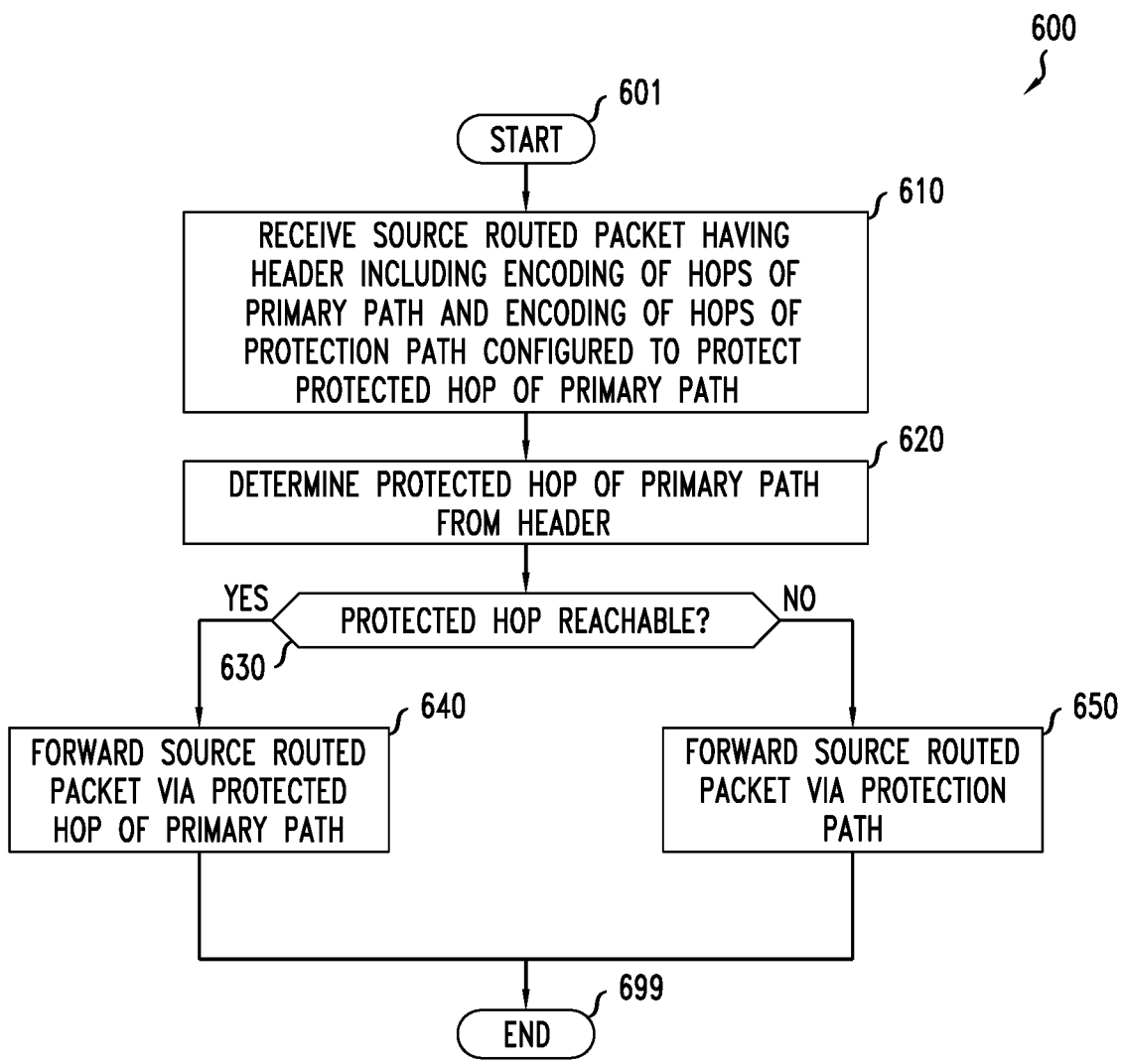
FIG. 6 depicts an example embodiment of a method for use by a transit node to handle a source routed packet based on flow-specific fast rerouting.

FIG. 6 depicts an example embodiment of a method for use by a transit node to handle a source routed packet based on flow-specific fast rerouting. It will be appreciated that, although primarily presented herein as being performed serially, at least a portion of the functions of method 600 may be performed contemporaneously or in a different order than as presented in FIG. 6. At block 601, method 600 begins. At block 610, a source routed packet is received. The source routed packet includes a header and a payload. The header includes an encoding of a set of hops of a primary path and an encoding of a set of hops of a protection path configured to protect one of the hops of the primary path (which is referred to as the protected hop). The hops may be encoded within the header in various ways, which may vary for different source routing protocols. It will be appreciated that the header may include various other types of information. It is assumed that the source routed packet is received by a transit node upstream of the protected hop that is protected by the protection path. At block 620, the protected hop is determined from the header of the source routed packet. At block 630, a determination is made as to whether the protected hop is reachable. This may include a determination as to whether the link from the transit node to the protection hop is operational, a determination as to whether the protected hop node is operational, or the like, as well as various combinations thereof. If the protected hop is reachable, method 600 proceeds to block 640, at which point the source routed packet is forwarded via the protected hop of the primary path. It will be appreciated that additional processing also may be performed by the transit node when the source routed packet is forwarded via the protected hop of the primary path (e.g., removing or popping the encoding of the protection path from the header of the source routed packet since the protection path is not needed or the like). If the protected hop is not reachable, method 600 proceeds to block 650, at which point, the source routed packet is forwarded via the protection path that protects the protected hop. It will be appreciated that additional processing also may be performed by the transit node when the source routed packet is forwarded via the protection path (e.g., determining the first hop of the protection path from the encoding of the protection path for use in forwarding the source routed packet, modifying encoding of hops within the header of the source routed packet such that any remaining hops of the protection path may be accessed and used by subsequent nodes along the protection path until the protection path remerges with the primary path, or the like, as well as various combinations thereof). From blocks 640 and 650, method 600 proceeds to block 699. At block 699, method 600 ends.

It will be appreciated that various functions presented herein as being supported by a transit node of a source routed path may be performed in various combinations for supporting various example embodiments of flow-specific fast rerouting of source routed packets.

In at least some embodiments, for example, at the destination node of the source routed path for the source routed packet, handling of the source routed packet may include receiving the source routed packet, processing the source routed packet based on the header of the source routed packet to form a packet, and sending the packet toward a network element. The source routed packet includes a common header portion and a source routing portion. The processing of the source routed packet may include determining the handling of the source routed packet. The handling of the source routed packet may be based on fields of the header of the source routed packet. The processing of the source routed packet may include removing the source routing portion of the header of the source routed packet, updating the common header portion of the source routed packet, or the like, as well as various combinations thereof. The processing of the source routed packet, as noted above, produces a packet (including at least the common header portion of the source routed packet and the payload of the source routed packet) for further forwarding toward a network element. The packet is then forwarded toward the network element.

It will be appreciated that the destination node of the source routed path for the source routed packet may be configured to perform various other functions for supporting flow-specific fast rerouting of the source routed packet.

Figure 7:
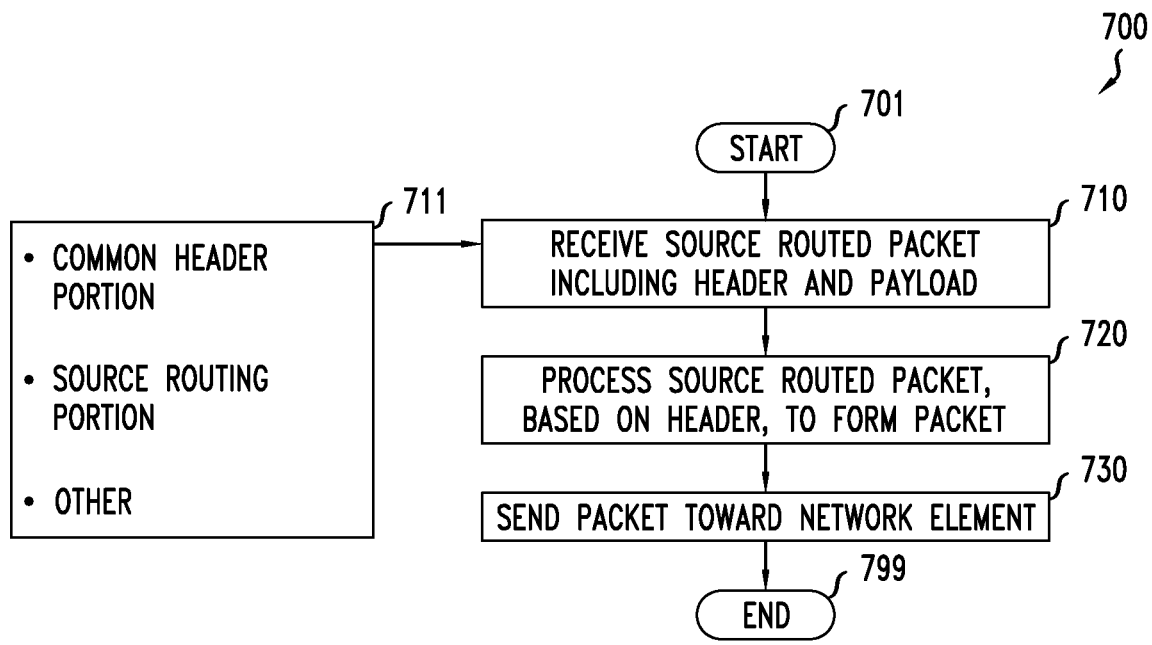
FIG. 7 depicts an example embodiment of a method for use by a destination node to handle a source routed packet based on flow-specific fast rerouting.

FIG. 7 depicts an example embodiment of a method for use by a destination node to handle a source routed packet based on flow-specific fast rerouting. It will be appreciated that, although primarily presented as being performed serially, at least a portion of the functions of method 700 may be performed contemporaneously or in a different order than as presented in FIG. 7. At block 701, method 700 begins. At block 710, a source routed packet including a header and a payload is received. As indicated at block 711, the header of the source routed packet includes a common header portion and a source routing portion (e.g., including encoding of hops of the source routed path). At block 720, the source routed packet is processed, based on the header of the source routed packet, to form a packet. The processing of the source routed packet may include determining handling of the source routed packet, removing the source routing portion of the header of the source routed packet, updating the common header portion of the source routed packet, or the like, as well as various combinations thereof. At block 730, the packet is sent toward a network element. At block 799, method 700 ends.

Figure 8:
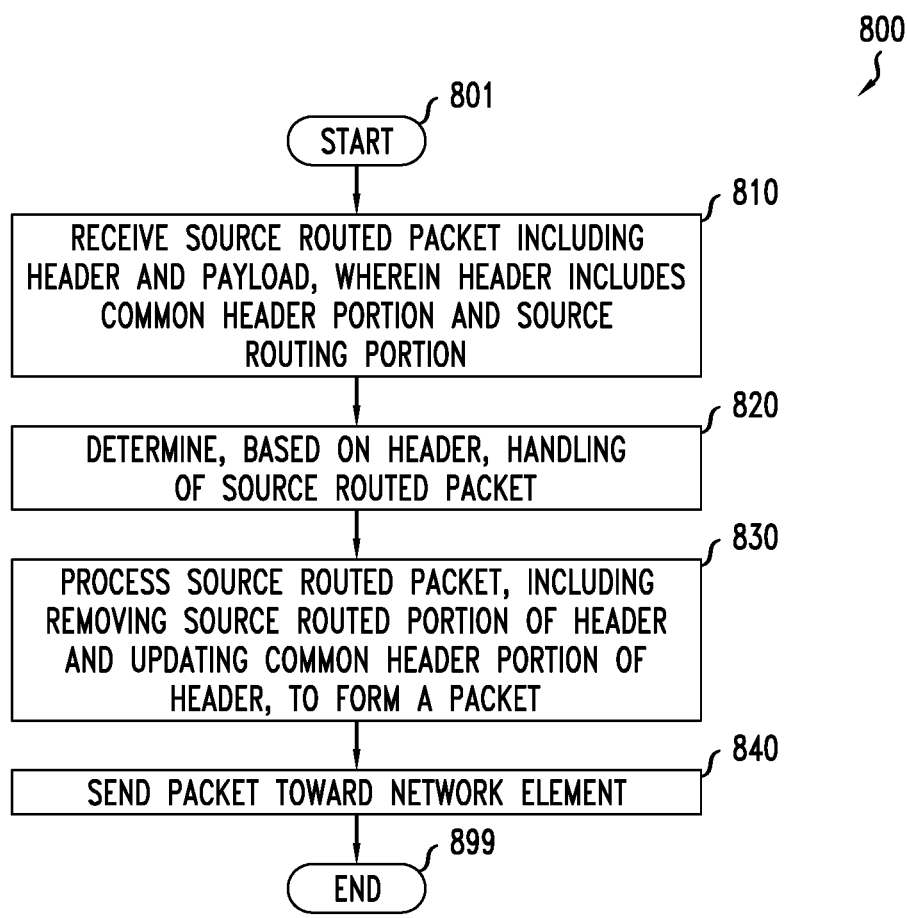
FIG. 8 depicts an example embodiment of a method for use by a destination node to handle a source routed packet based on flow-specific fast rerouting.

FIG. 8 depicts an example embodiment of a method for use by a destination node to handle a source routed packet based on flow-specific fast rerouting. It will be appreciated that, although primarily presented as being performed serially, at least a portion of the functions of method 800 may be performed contemporaneously or in a different order than as presented in FIG. 8. At block 801, method 800 begins. At block 810, a source routed packet including a header and a payload is received. The source routed packet includes a common header portion and a source routing portion (e.g., including encoding of hops of the source routed path). At block 820, the handling of the source routed packet is determined based on the header of the source routed packet. At block 830, the source routed packet is processed, including removing the source routing portion of the source routed packet and updating the common header portion of the source routed packet, to form a packet. At block 840, the packet is sent toward a network element. At block 899, method 800 ends.

It will be appreciated that various functions presented herein as being supported by a destination node of a source routed path may be performed in various combinations for supporting various example embodiments of flow-specific fast rerouting of source routed packets.

The source routed packet, as discussed herein, may be based on various source routing protocols (e.g., MPLS, IPv4, IPv6, or the like) and, as such, encoding of the hops of the primary path and the protection path(s) for the source routed packet also may be based on such source routing protocols (again, MPLS, IPv4, IPv6, or the like). Various example embodiments for using such protocols to support flow-specific fast rerouting of source routed packets are discussed further below.

Various example embodiments for supporting flow-specific fast rerouting of source routed packets may be configured to support flow-specific FRR of source routed packets in MPLS-based source routing.

Various example embodiments for supporting flow-specific FRR of source routed packets in MPLS-based source routing are configured to enable the PLR to perform fast reroute along flow-specific protection paths (i.e., one-to-one protection) while maintaining a flow-agnostic approach at the PLR, obviate the need for a PLR to preprogram protection paths into the data plane (thereby reducing data plane complexity and states in the PLR and transit nodes), support both link and node protection for source routed packets, provide extensions to MPLS source routing capabilities, or the like, as well as various combinations thereof.

Various example embodiments for supporting flow-specific fast rerouting for flow-specific FRR of source routed packets in MPLS-based source routing may be further understood by considering use of flow-specific fast rerouting to provide node protection in MPLS source routing (although it will be appreciated that the principles also may be applied for providing link protection in MPLS source routing). This may be further understood by way of reference to the example communication network of FIG. 9, which illustrates the routers 111 of the communication network 110 of FIG. 1.

Figure 9:
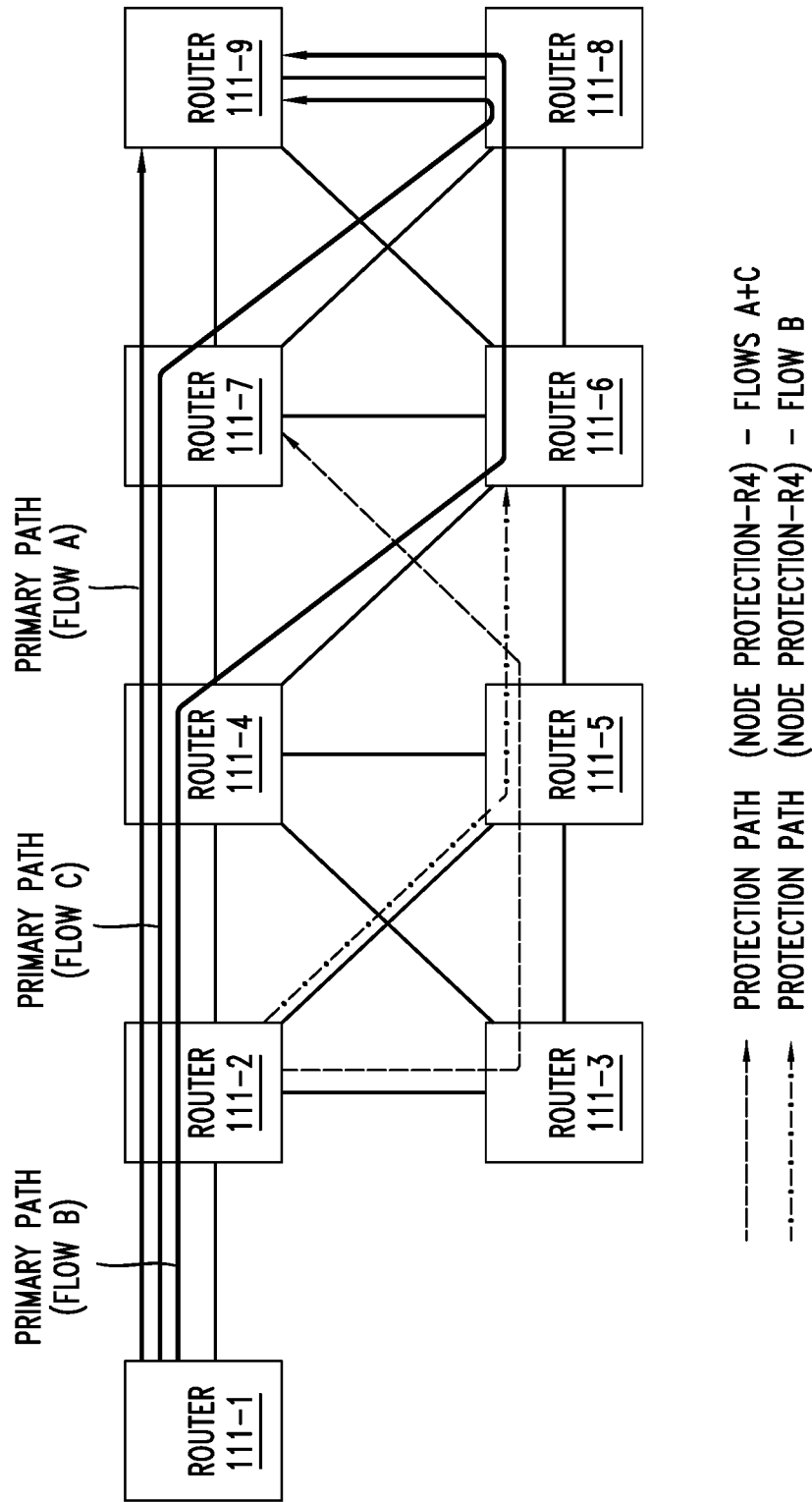
FIG. 9 depicts the communication network of the example communication system of FIG. 1 for illustrating primary paths and associated protection paths based on flow-specific fast rerouting of source routed packets.

The PCE computes the explicit path that meets the QoS requirement or SLA of a flow. This path is denoted as E(<flow-id>). In FIG. 9, the paths for flow A and flow B are computed as follows:

For flow A: E(A)={R1→R2, R2→R4, R4→R7, R7→R9}.

For flow B: E(B)={R1→R2, R2→R4, R4→R6, R6→R8, R8→R9}.

The PCE also computes a protection path for each hop listed in E, such that a protection path also meets the QoS requirement or SLA of the flow. The protection path is denoted as P(<flow-id>, <protected-hop>). For example, to protect against failure of node R4, P is computed as follows:

For flow A: P (A, R4)={R2→R3, R3→R5, R5→R7}.

For flow B: P (B, R4)={R2→R5, R5→R6}.

It is noted that, for simplicity, R4 is shown as the protected hop in E; however, it will be appreciated that the PCE may try to compute protection paths for other hops listed in E or even for every hop listed in E.

It will be appreciated that E or P may be computed using any suitable path computation mechanisms, such as local path computation at the source router by running CSPF on TEDB or by other computational techniques, local configuration at the source, global path computation at a central controller by running CSPF on TEDB or other computational techniques, or the like.

Various example embodiments for supporting flow-specific fast rerouting for flow-specific FRR of source routed packets in MPLS-based source routing may support a new hop type to be sent in the explicit path (in the header of the source routed packet). This new hop type for flow-specific FRR in MPLS source routing is referred to herein as an "MPLS Fast-Reroutable Explicit Hop" (MPLS-FEH). The MPLS-FEH includes the following tuple:

MPLS-FEH=[<protected-hop>, <protection-path>, <skip-count>]

The <protected-hop> parameter identifies the protected hop. It may indicate a node identifier or link identifier, in the primary path, for which protection is provided. For example, R2→R4 is the protected hop in both E(A) and E(B).

The <protection-path> parameter describes the protection path that protects the protected hop (i.e., that protects <protected hop>). The protection path may be described by specifying the list of hops of the protection path. For example, if R2→R4 is the protected-hop then respective protection paths for flow A and flow B are P(A,R4) and P(B,R4), respectively.

The <skip-count> parameter indicates the quantity of hops (of the primary path) subsequent to the <protected-hop> that are bypassed by the <protection-path>. For example, P(A) would skip R4→R7 after the protected hop R2→R4 and P(B) would skip R4→R6 after the protected hop R2→R4 and, thus, skip-count is 1 for both.

In FIG. 9, the encoding of the explicit paths sent by R1 for flow A and flow B would be as follows:

E(A)={R1→R2, [R2→R4, P (A, R4), 1], R4→R7, R7→R9}

E(B)={R1→R2, [R2→R4, P (B, R4), 1], R4→R6, R6→R8, R8→R9}

It is noted that, for clarity, R1→R2 is shown as the first hop in E(A) and E(B); however, since it is the immediate next hop of R1, R1 would strip it before sending the source routed packet to R2.

The operation of R2 upon receiving the source routed packet from R1 depends on whether the R2→R4 link is forwarding.

R2, upon receiving a packet from R1 when the R2→R4 link is forwarding (the R2→R4 link is active and R4 is active), takes the following actions.

If a packet arrives with E(A) when the R2→R4 link is forwarding, then R2 pops the first hop, which is MPLS-FEH=[R2→R4, P(A, R4), 1], and sends the source routed packet on the R2→R4 link with E(A)={R4→R7, R7→R9}.

If a packet arrives with E(B) when the R2→R4 link is forwarding, then R2 pops the first hop, which is MPLS-FEH=[R2→R4, P (B, R4), 1], and sends the source routed packet on R2→R4 with E(B)={R4→R6, R6→R8, R8→R9}.

R2, upon receiving a packet from R1 when the R2→R4 link is not forwarding (the R2→R4 link has failed or R4 has failed), takes the following actions.

If a packet arrives with E(A) when the R2→R4 link is not forwarding, then R2 takes the following actions: (1) R2 pops the first hop, which is MPLS-FEH=[R2→R4, P(A, R4), 1], (2) R2, since the R2→R4 link has failed, decides to fast-reroute the source routed packet along protection path P (A, R4), (3) R2, since the skip-count is "1", also pops R4→R7 from the explicit path, (4) R2 pops the first hop in P (A, R4), which is R2→R3, and, thus, decides to forward the source routed packet on the R2→R3 link, (5) R2 pushes the remaining hops in P (A, R4) into the explicit path such that the explicit path becomes E(A)={R3→R5, R5→R7, R7→R9}, and (6) sends the source routed packet out to R3.

If a packet arrives with E(B) when the R2→R4 link is not forwarding, then R2 takes the following actions: (1) R2 pops the first hop, which is MPLS-FEH=[R2→R4, P(B, R4), 1], (2) R2, since the R2→R4 link has failed, decides to fast-reroute the source routed packet along protection path P (B, R4), (3) R2, since the skip-count is "1", also pops R4→R6 from the explicit path, (4) R2 pops the first hop in P (B, R4), which is R2→R5, and, thus, decides to forward the source routed packet on the R2→R5 link, (5) R2 pushes the remaining hops in P (B, R4) into the explicit path such that the explicit path becomes E(B)={R5→R6, R6→R8, R7→R9}, and (6) sends the source routed packet out to R5.

It is noted that, from these examples, it may be seen that flow A and flow B are fast-rerouted along flow-specific protection paths upon failure of the common link R2→R4 or node R4. The PLR does not compute and program any protection-path against any of its next-hops; rather, the protection path is encoded in the source routed packet itself by the source node for use by the PLR.

Various example embodiments for supporting flow-specific fast rerouting of source routed packets for MPLS-based source routing may be configured to support one or more of a generic concept of one-to-one (flow specific) FRR for source routed packets using MPLS-FEH, capabilities for implementation of MPLS-FEH and flow specific FRR in MPLS source routed packets, capabilities for signaling MPLS-FEH processing capabilities by routers (e.g., in IS-IS, OSPF, OPSFv3, BGP-LS, or the like, as well as various combinations thereof), or the like, as well as various combinations thereof.

Various example embodiments for supporting flow-specific fast rerouting of source routed packets for MPLS-based source routing may be configured to support implementation of MPLS-FEH and flow-specific FRR in MPLS source routed packets.

Various example embodiments for supporting flow-specific fast rerouting of source routed packets for MPLS-based source routing may be described within the context of FIG. 9. In describing these embodiments, the following terminology is used: "LX" is used as the node Label for router "X" and "LXY" is used as the adjacency/next-hop label between "X→Y" (e.g., the node label for R1 is L1, and the Adjacency Label for R1→R2 is L12). It is noted that, in MPLS-based source routing, a hop identifier for encoding a hop of a source routed path (primary or protection) may be a node label, an adjacency label, or the like. In describing these embodiments, the explicit paths and protection paths introduced above for FIG. 9 are retained. Thus, the explicit path sent by ingress LER R1 on a packet is a stack of labels, which is as follows for flow A and flow B:

E(A)={L12, [L24, P (A, R4), 1], L47, L79} where P (A, R4) is the MPLS-FEH with label stack={L23, L35, L57}.

E(B)={L12, [L24, P (B, R4), 1], L46, L68, L89} where P (B, R4) is the MPLS-FEH with label stack={L25, L56}.

It is noted that, for clarity, L12 was shown as the first label in E(A) and E(B), but R1 would strip this label before sending the source routed packet to R2. Thus, R2 will receive the following Label stacks on respective flows A and B:

E(A)={[L24, P (A, R4), 1], L47, L79}.

E(B)={[L24, P (B, R4), 1], L46, L68, L89}.

Various example embodiments for supporting flow-specific fast rerouting of source routed packets for MPLS-based source routing may be configured to support an FEH Label Stack (FLS). The FLS is a stack of labels of which the MPLS-FEH is composed. The encoding of the FLS may be as follows:

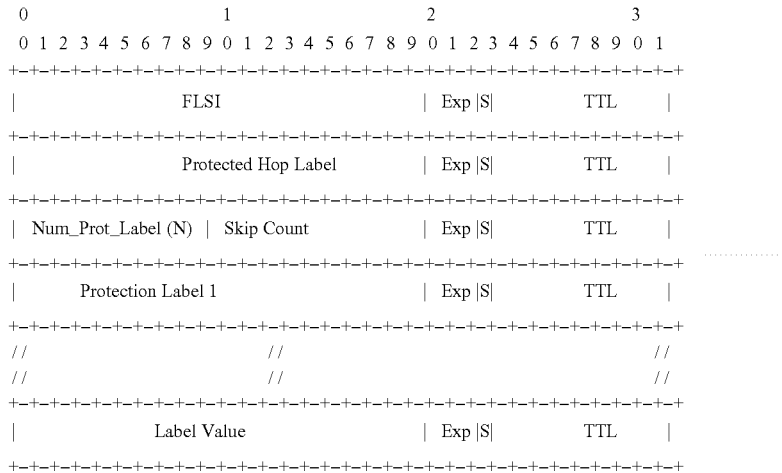

The FLS, as indicated above, is a stack of labels of which the MPLS-FEH is composed. The stack of labels of the FLS, as indicated above and discussed further below, includes an FLSI label, a <protected-hop> label, and a protection label stack descriptor.

The FLS includes an FLSI label (first row illustrated above). When R1 embeds the FLS within the MPLS label stack of the primary path, a receiving LSR needs to be able to distinguish unambiguously between the FLS and non-FEH labels. To accomplish this, the label immediately preceding a FLS may be an "FLS Indicator (FLSI)" label, where preceding means closer to the top of the label stack (farther from the bottom of the stack). The FLSI label is a special label that is not expected to be used for any other purposes. If standardized in IETF, then a value of FLSI can be reserved at the IANA registry as a special-purpose label. Additionally, it is noted that, within the FLSI label, the associated EXP and TTL fields in the FLSI label will be set to same values as in the protected-hop label, and the S bit in the FLSI label will be set to 0.

The FLS includes a protected hop label (second row illustrated above). The protected hop label immediately follows the FLSI label. The protected hop label identifies the next-hop adjacency label, on the primary path, which is being protected. For example, in MPLS-FEH [L24, P (A, R4), 1], the protected hop label is L24.

The FLS includes a protection label stack descriptor (third row illustrated above). This is a special label after the protected hop label. The protection label stack descriptor includes a Num_Prot_Label field, which is a 10-bit field that indicates the number of labels (hops) in the protection path. The protection label stack descriptor includes a Skip Count field, which is a 10-bit field which includes a value indicative of the number of labels after the FLS to be skipped if the source routed packet is forwarded on the protection path. The protection label stack descriptor includes an Exp field, which is expected to be unused and set to "0". The protection label stack descriptor includes an S field, which is expected to be set to "0". The protection label stack descriptor includes a TTL field, which is expected to be unused and set to "0".

The FLS includes a protection label stack. This is the stack of labels for the protection path, where each label identifies a hop in the protection path, respectively. For example, for flow A, the labels are P(A, R4)={L23, L35, L57}.

A sender inserts the FLS in order to indicate a MPLS-FEH in a source routed MPLS explicit path.

For example, the encoding of FLS for MPLS-FEH=[L24, P (A, R4), 1] follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            FLSI              |  Exp |S|       TTL           |
+-+-+-+-+-+-+-+-+-+-+-+-+-+-+-+-+-+-+-+-+-+-+-+-+-+-+-+-+-+-+-+-+
|            L24               |  Exp |S|       TTL           |
+-+-+-+-+-+-+-+-+-+-+-+-+-+-+-+-+-+-+-+-+-+-+-+-+-+-+-+-+-+-+-+-+
|       3           |     1    |  Exp |S|       TTL           |
+-+-+-+-+-+-+-+-+-+-+-+-+-+-+-+-+-+-+-+-+-+-+-+-+-+-+-+-+-+-+-+-+
|            L23               |  Exp |S|       TTL           |
+-+-+-+-+-+-+-+-+-+-+-+-+-+-+-+-+-+-+-+-+-+-+-+-+-+-+-+-+-+-+-+-+
|            L35               |  Exp |S|       TTL           |
+-+-+-+-+-+-+-+-+-+-+-+-+-+-+-+-+-+-+-+-+-+-+-+-+-+-+-+-+-+-+-+-+
|            L57               |  Exp |S|       TTL           |
+-+-+-+-+-+-+-+-+-+-+-+-+-+-+-+-+-+-+-+-+-+-+-+-+-+-+-+-+-+-+-+-+
```

For example, the explicit path label stack E(A) on a source routed packet sent by R1 for flow A would be:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            FLSI              |  Exp |S|       TTL           |
+-+-+-+-+-+-+-+-+-+-+-+-+-+-+-+-+-+-+-+-+-+-+-+-+-+-+-+-+-+-+-+-+
|            L24               |  Exp |S|       TTL           |
+-+-+-+-+-+-+-+-+-+-+-+-+-+-+-+-+-+-+-+-+-+-+-+-+-+-+-+-+-+-+-+-+
|       3           |     1    |  Exp |S|       TTL           |
+-+-+-+-+-+-+-+-+-+-+-+-+-+-+-+-+-+-+-+-+-+-+-+-+-+-+-+-+-+-+-+-+
|            L23               |  Exp |S|       TTL           |
+-+-+-+-+-+-+-+-+-+-+-+-+-+-+-+-+-+-+-+-+-+-+-+-+-+-+-+-+-+-+-+-+
|            L35               |  Exp |S|       TTL           |
+-+-+-+-+-+-+-+-+-+-+-+-+-+-+-+-+-+-+-+-+-+-+-+-+-+-+-+-+-+-+-+-+
|            L57               |  Exp |S|       TTL           |
+-+-+-+-+-+-+-+-+-+-+-+-+-+-+-+-+-+-+-+-+-+-+-+-+-+-+-+-+-+-+-+-+
|            L47               |  Exp |S|       TTL           |
+-+-+-+-+-+-+-+-+-+-+-+-+-+-+-+-+-+-+-+-+-+-+-+-+-+-+-+-+-+-+-+-+
|            L79               |  Exp |S|       TTL           |
+-+-+-+-+-+-+-+-+-+-+-+-+-+-+-+-+-+-+-+-+-+-+-+-+-+-+-+-+-+-+-+-+
```

For example, the explicit path label stack E(B) on a source routed packet sent by R1 for flow B would be:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            FLSI              |  Exp |S|       TTL           |
+-+-+-+-+-+-+-+-+-+-+-+-+-+-+-+-+-+-+-+-+-+-+-+-+-+-+-+-+-+-+-+-+
|            L24               |  Exp |S|       TTL           |
+-+-+-+-+-+-+-+-+-+-+-+-+-+-+-+-+-+-+-+-+-+-+-+-+-+-+-+-+-+-+-+-+
|       2           |     1    |  Exp |S|       TTL           |
+-+-+-+-+-+-+-+-+-+-+-+-+-+-+-+-+-+-+-+-+-+-+-+-+-+-+-+-+-+-+-+-+
|            L25               |  Exp |S|       TTL           |
+-+-+-+-+-+-+-+-+-+-+-+-+-+-+-+-+-+-+-+-+-+-+-+-+-+-+-+-+-+-+-+-+
|            L56               |  Exp |S|       TTL           |
+-+-+-+-+-+-+-+-+-+-+-+-+-+-+-+-+-+-+-+-+-+-+-+-+-+-+-+-+-+-+-+-+
|            L46               |  Exp |S|       TTL           |
+-+-+-+-+-+-+-+-+-+-+-+-+-+-+-+-+-+-+-+-+-+-+-+-+-+-+-+-+-+-+-+-+
|            L68               |  Exp |S|       TTL           |
+-+-+-+-+-+-+-+-+-+-+-+-+-+-+-+-+-+-+-+-+-+-+-+-+-+-+-+-+-+-+-+-+
|            L89               |  Exp |S|       TTL           |
+-+-+-+-+-+-+-+-+-+-+-+-+-+-+-+-+-+-+-+-+-+-+-+-+-+-+-+-+-+-+-+-+
```

A receiver that receives an MPLS label stack with an FLS that indicates an MPLS-FEH in a source routed MPLS explicit path processes the MPLS label stack as follows. If the first label of the MPLS label stack is not an FLSI label, then MPLS forwarding is performed as a result of a lookup of the first label in the Incoming Label Map (ILM). If the first label of the MPLS label stack is an FLSI label, then the FLSI label is popped from the stack (making the new top label the protected hop label), the protected hop label (now the top label) is looked up in the ILM to get the next-hop (NH) forwarding information of the protected hop, the protected hop label is popped (making the new top label the protection label stack descriptor), the Num_Prot_Label and Skip Count values are read from the protection label stack descriptor (now the top label), and the protection label stack descriptor is popped. A determination is made as to whether the NH of the protected hop is operational. If the NH of the protected hop is operational, the number of labels specified by the Skip Count value are popped (thereby removing the entire protection label stack) and the source routed packet is forwarded to the NH of the protected hop. If the NH of the protected hop is not operational, the top label (which is now the first label in the protection label stack) is popped from the stack, the first label in the protection label stack (now the top label) is looked up in the ILM to get its next-hop/forwarding information (denoted as NH2), the first label in the protection label stack is popped, and the packet is handled based on whether NH2 is operational (either the source routed packet is forwarded to NH2 as an FRR operation if NH2 is operational or the source routed packet is dropped if NH2 is not operational).

This processing may be further understood by considering the example presented in FIG. 9.

In continuation of the example of FIG. 9, assume that R2 receives a packet with label stack E(A) as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              FLSI                     | Exp |S|       TTL     |
+-+-+-+-+-+-+-+-+-+-+-+-+-+-+-+-+-+-+-+-+-+-+-+-+-+-+-+-+-+-+-+-+
|              L24                      | Exp |S|       TTL     |
+-+-+-+-+-+-+-+-+-+-+-+-+-+-+-+-+-+-+-+-+-+-+-+-+-+-+-+-+-+-+-+-+
|         3             |       1       | Exp |S|       TTL     |
+-+-+-+-+-+-+-+-+-+-+-+-+-+-+-+-+-+-+-+-+-+-+-+-+-+-+-+-+-+-+-+-+
|              L23                      | Exp |S|       TTL     |
+-+-+-+-+-+-+-+-+-+-+-+-+-+-+-+-+-+-+-+-+-+-+-+-+-+-+-+-+-+-+-+-+
|              L35                      | Exp |S|       TTL     |
+-+-+-+-+-+-+-+-+-+-+-+-+-+-+-+-+-+-+-+-+-+-+-+-+-+-+-+-+-+-+-+-+
|              L57                      | Exp |S|       TTL     |
+-+-+-+-+-+-+-+-+-+-+-+-+-+-+-+-+-+-+-+-+-+-+-+-+-+-+-+-+-+-+-+-+
|              L47                      | Exp |S|       TTL     |
+-+-+-+-+-+-+-+-+-+-+-+-+-+-+-+-+-+-+-+-+-+-+-+-+-+-+-+-+-+-+-+-+
|              L79                      | Exp |S|       TTL     |
+-+-+-+-+-+-+-+-+-+-+-+-+-+-+-+-+-+-+-+-+-+-+-+-+-+-+-+-+-+-+-+-+
```

When R2→R4 is operational, the source routed packet would be forwarded on R2→R4 with the following MPLS label stack.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              L47                      | Exp |S|       TTL     |
+-+-+-+-+-+-+-+-+-+-+-+-+-+-+-+-+-+-+-+-+-+-+-+-+-+-+-+-+-+-+-+-+
|              L79                      | Exp |S|       TTL     |
+-+-+-+-+-+-+-+-+-+-+-+-+-+-+-+-+-+-+-+-+-+-+-+-+-+-+-+-+-+-+-+-+
```

When R2→R4 has failed, the source routed packet would be forwarded on R2→R3 with following MPLS label stack.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              L35                      | Exp |S|       TTL     |
+-+-+-+-+-+-+-+-+-+-+-+-+-+-+-+-+-+-+-+-+-+-+-+-+-+-+-+-+-+-+-+-+
|              L57                      | Exp |S|       TTL     |
+-+-+-+-+-+-+-+-+-+-+-+-+-+-+-+-+-+-+-+-+-+-+-+-+-+-+-+-+-+-+-+-+
|              L79                      | Exp |S|       TTL     |
+-+-+-+-+-+-+-+-+-+-+-+-+-+-+-+-+-+-+-+-+-+-+-+-+-+-+-+-+-+-+-+-+
```

Various example embodiments for supporting flow-specific fast rerouting of source routed packets for MPLS-based source routing may be configured to support distribution of the MPLS-FEH forwarding capability of routers. As discussed further below, this may be performed using IS-IS, OSPF, OSPFv3, BGP-LS, or any other suitable protocol.

In an MPLS Source Routing domain, it is possible that some of the routers do not support (or have not implemented) MPLS-FEH based explicit path routing procedures defined herein. When the PCE computes a MPLS-FEH based explicit path, it needs to exclude the non-supporting routers from the path. When CSPF is used for computation of an explicit path, the MPLS-FEH capability can be imposed as an additional constraint into CSPF. Thus, MPLS-FEH processing capability of the routers needs to be available in the TEDB for use by the CSPF when computing explicit paths. When the TEDB is dynamically learned by participating in a routing protocol that floods TE/topology information from routers, then MPLS-FEH capabilities also may be distributed by that protocol. A description of mechanisms for supporting exchange of MPLS-FEH capability information in various routing protocols (e.g., IS-IS, OSPF, OSPFv3, and BGP-LS) follows.

Various example embodiments for supporting flow-specific fast rerouting of source routed packets for MPLS-based source routing may be configured to support distribution of the MPLS-FEH forwarding capability of routers using IS-IS.

The IS-IS control plane for SR may be used to distribute the label mappings as attributes to LSAs. It is noted that IS-IS extensions for segment routing are being standardized in the IETF in the "IS-IS Extensions for Segment Routing" draft (also denoted as SR-ISIS-DRAFT). SR-ISIS-DRAFT describes various SR Segment Identifiers (SID) distributed by the IS-IS protocol. An SID describes a label mapping assigned to specific segment in the network. SR-ISIS-DRAFT defines the encodings for the Prefix-SID, the Adjacency-SID, the LAN-Adjacency-SID, and the Binding-SID. Various example embodiments supporting flow-specific fast rerouting of source routed packets for MPLS-based source routing are configured to support a new MPLS-FEH capability, which aligns with the approach in SR-ISIS-DRAFT, to distribute MPLS-FEH forwarding capabilities of routers. It is noted that the procedures in SR-ISIS-DRAFT are applicable to the new MPLS-FEH capability as defined herein, unless specified otherwise herein.

In general, SR typically requires each router to advertise its SR data plane capability and the range of MPLS label values it uses for SR in the case where global SIDs (i.e., global indexes) are allocated. Section 3 in SR-ISIS-DRAFT describes an SR-Capabilities sub-TLV to be inserted into IS-IS Router Capabilities TLV-242. Section 3 in SR-ISIS-DRAFT describes the format for SR-Capabilities sub-TLV as follows:

The SR-Capabilities sub-TLV, as indicated above, includes a Type field, a Length field, and a Flags field, followed by one or more Segment Routing Global Block (SRGB) descriptor entries.

The Type field of the SR-Capabilities sub-TLV is a 1-octet field that indicates the type of the SR-Capabilities sub-TLV. The value of the Type field has yet to be determined (e.g., a value of 2 is suggested; however, it will be appreciated that other suitable values may be used).

The Length field of the SR-Capabilities sub-TLV is a 1-octet field that indicates the length of the remaining portions of the SR-Capabilities sub-TLV. The value of the Length field is variable.

The Flags field of the SR-Capabilities sub-TLV is a 1-octet field that includes a set of one-bit flags configured to indicate various capabilities. The Flags field of the SR-Capabilities sub-TLV has the following format:

```
 0 1 2 3 4 5 6 7
+-+-+-+-+-+-+-+-+
|I|V| |P|Q|     |
+-+-+-+-+-+-+-+-+
```

The Flags field of the SR-Capabilities sub-TLV, as indicated above, includes an I Flag, a V Flag, a P Flag, and a Q Flag. The I and V Flags use the encoding and rules as described in Section 3 of SR-ISIS-DRAFT. The I Flag is the MPLS IPv4 flag which is configured such that, if set (e.g., equal to "1"), then the router is capable of processing SR MPLS encapsulated IPv4 packets on all interfaces. The V Flag is the MPLS IPv6 flag which is configured such that, if set (e.g., equal to "1"), then the router is capable of processing SR MPLS encapsulated IPv6 packets on all interfaces. Various example embodiments supporting flow-specific fast rerouting of source routed packets for MPLS-based source routing introduce new MPLS-FEH capability flags as follows: (1) an MPLS-FEH IPv4 flag, denoted as the P Flag and emphasized in the Flags field format provided above, which is configured such that, if set (e.g., equal to "1"), then the router is capable of processing SR MPLS-FEH encapsulated IPv4 packets on all interfaces and (2) a MPLS-FEH IPv6 flag, denoted as the Q Flag and emphasized in the Flags field format provided above, which is configured such that, if set (e.g., equal to "1"), then the router is capable of processing SR MPLS-FEH encapsulated IPv6 packets on all interfaces.

Various example embodiments for supporting flow-specific fast rerouting of source routed packets for MPLS-based source routing may be configured to support distribution of the MPLS-FEH forwarding capability of routers using IS-IS in various other ways.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |     Flags     |
+-+-+-+-+-+-+-+-+-+-+-+-+-+-+-+-+-+-+-+-+-+-+-+-+-+-+-+-+-+-+-+-+

+-+-+-+-+-+-+-+-+-+-+-+-+-+-+-+-+-+-+-+-+-+-+-+-+-+-+-+-+-+-+-+-+
|                          Range                                |
+-+-+-+-+-+-+-+-+-+-+-+-+-+-+-+-+-+-+-+-+-+-+-+-+-+-+-+-+-+-+-+-+
//              SID/ Label  Sub-TLV (variable                 //
+-+-+-+-+-+-+-+-+-+-+-+-+-+-+-+-+-+-+-+-+-+-+-+-+-+-+-+-+-+-+-+-+
```

Various example embodiments for supporting flow-specific fast rerouting of source routed packets for MPLS-based source routing may be configured to support distribution of the MPLS-FEH forwarding capability of routers using OSPF.

The OSPF control plane for SR may be used to distribute the label mappings as attributes to LSAs. It is noted that OSPF extensions for segment routing are being standardized in the IETF in the "OSPF Extensions for Segment Routing" draft (also denoted as SR-OSPF-DRAFT). SR-OSPF-DRAFT describes various SR Segment Identifiers (SIDs) distributed by the OSPF Protocol. An SID describes a label mapping assigned to a specific segment in the network. SR-OSPF-DRAFT defines the encodings for the Prefix-SID, the Adjacency-SID, the LAN-Adjacency-SID and the Binding-SID. Also, SR-OSPF-DRAFT describes the procedures for advertising segment routing capabilities by a router node. Various example embodiments for supporting flow-specific fast rerouting of source routed packets for MPLS-based source routing are configured to support a new MPLS-FEH capability, which aligns with the approach in SR-OSPF-DRAFT, to distribute MPLS-FEH forwarding capabilities of routers. It is noted that the procedures in SR-OSPF-DRAFT are applicable to the new MPLS-FEH capability as defined herein, unless specified otherwise herein.

In general, SR typically requires each router to advertise its SR data plane capability and the range of MPLS label values it uses for SR in the case where global SIDs (i.e., global indexes) are allocated. Section 3 in SR-OSPF-DRAFT describes procedures for SR-Capabilities in OSPF. SR Capabilities in OSPF are advertised in the following TLVs within the Router Information Opaque LSA: (1) SR Algorithm TLV, (2) SID/Label Range TLV, (3) SR Local Block TLV, and (4) SRMS Preference TLV.

Section 3.5 in SR-OSPF-DRAFT defines that an OSPF router needs to advertise its SR data plane capabilities using the OSPF Router Informational Capabilities TLV (which is defined in Section 2.3 of RFC 4970). The format of the OSPF Router Informational Capabilities TLV follows:

Capability TLV as follows: Bit-8 (MPLS-FEH IPv4 flag), which, if set (e.g., using a value of "1"), indicates that the router is capable of processing SR MPLS-FEH encapsulated IPv4 packets on all interfaces.

It is noted that, for the MPLS-FEH forwarding capabilities propagation, area scope flooding is required.

Various example embodiments for supporting flow-specific fast rerouting of source routed packets for MPLS-based source routing may be configured to support distribution of the MPLS-FEH forwarding capability of routers using OSPF in various other ways.

Various example embodiments for supporting flow-specific fast rerouting of source routed packets for MPLS-based source routing may be configured to support distribution of the MPLS-FEH forwarding capability of routers using OSPFv3.

The OSPFv3 control plane for SR may be used to distribute the label mappings as attributes to LSAs. It is noted that OSPFv3 extensions for segment routing are being standardized in the IETF in the "OSPFv3 Extensions for Segment Routing" draft (also denoted as SR-OSPFv3-DRAFT). The SR-OSPFv3-DRAFT describes various SR Segment Identifiers (SIDs) distributed by the OSPFv3 Protocol. An SID describes a label mapping assigned to a specific segment in the network. The SR-OSPFv3-DRAFT defines the encodings for Prefix-SID, the Adjacency-SID, the LAN-Adjacency-SID and the Binding-SID. Also, the SR-OSPFv3-DRAFT describes the procedures for advertising segment routing capabilities by a router node. Various example embodiments for supporting flow-specific fast rerouting of source routed packets are configured to support a new MPLS-FEH capability, which aligns with the approach in SR-OSPFv3-DRAFT, to distribute MPLS-FEH forwarding capabilities of routers. It is noted that the procedures in SR-OSPFv3-DRAFT are applicable to the new MPLS-FEH capability as defined herein, unless specified otherwise herein.

In general, SR typically requires each router to advertise its SR data plane capability and the range of MPLS label values it uses for SR in the case where global SIDs (i.e.,

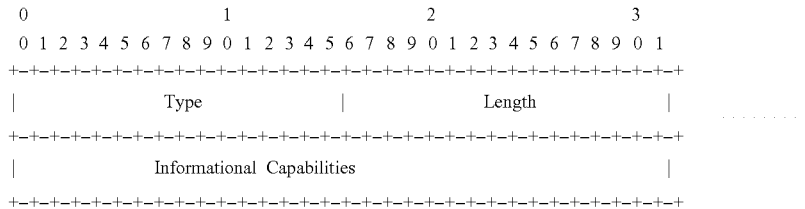

SR-OSPF-DRAFT allocates the following bits in the OSPF Router Informational Capability TLV: (1) Bit-6 (MPLS IPv6 flag), which, if set (e.g., using a value of "1"), indicates that the router is capable of processing SR MPLS encapsulated IPv6 packets on all interfaces and (2) Bit-7, which, if set (e.g., using a value of "1"), indicates that the router is capable of processing the IPv6 Segment Routing Header on all interfaces.

As noted above, various example embodiments for supporting flow-specific fast rerouting of source routed packets for MPLS-based source routing are configured to support distribution of the MPLS-FEH forwarding capability of routers. The MPLS-FEH forwarding capability may be advertised using a new bit in the OSPF Router Informational global indexes) are allocated. Section 3 in the SR-OSPFv3-DRAFT describes procedures for SR-Capabilities in OSPF. SR Capabilities in OSPFv3 are advertised in the following TLVs within the OSPFv3 Router Information LSA: (1) SR Algorithm TLV, (2) SID/Label Range TLV, (3) SR Local Block TLV, (4) SRMS Preference TLV, and (5) SR Forwarding Capabilities.

Section 3.5 in the SR-OSPFv3-DRAFT defines that an OSPFv3 router needs to advertise its SR data plane capabilities using the OSPF Router Informational Capabilities TLV (which is defined in Section 2.3 of RFC 4970). The format of the OSPF Router Informational Capabilities TLV follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|                   Informational Capabilities                  |
+-+-+-+-+-+-+-+-+-+-+-+-+-+-+-+-+-+-+-+-+-+-+-+-+-+-+-+-+-+-+-+-+
```

The SR-OSPFv3-DRAFT allocates the following bits in the OSPF Router Informational Capability TLV: (1) Bit-6 (MPLS IPv6 flag), which, if set (e.g., using a value of "1"), indicates that the router is capable of processing SR MPLS encapsulated IPv6 packets on all interfaces and (2) Bit-7, which, if set (e.g., using a value of "1"), indicates that the router is capable of processing the IPv6 Segment Routing Header on all interfaces.

As noted above, various example embodiments for supporting flow-specific fast rerouting of source routed packets are configured to support distribution of the MPLS-FEH forwarding capability of routers. The MPLS-FEH forwarding capability may be advertised using a new bit in the OSPF Router Informational Capability TLV as follows: Bit-9 (MPLS-FEH IPv6 flag), which, if set (e.g., using a value of "1"), indicates that the router is capable of processing SR MPLS-FEH encapsulated IPv6 packets on all interfaces.

Various example embodiments for supporting flow-specific fast rerouting of source routed packets for MPLS-based source routing may be configured to support distribution of the MPLS-FEH forwarding capability of routers using OSPFv3 in various other ways.

Various example embodiments for supporting flow-specific fast rerouting of source routed packets for MPLS-based source routing may be configured to support distribution of the MPLS-FEH forwarding capability of routers using BGP-LS.

The flooding scope for IGP-based methods of SR is IGP area-wide. As a result, the contents of an LSDB or a TEDB have the scope of an IGP area and, therefore, by using the IGP alone, it may not be enough to construct segments across multiple IGP areas or AS boundaries.

In order to address the need for applications that require topological visibility across IGP areas, or even across ASs, the BGP-LS address-family/sub-address-family have been defined to allow BGP to carry Link-State information. The BGP Network Layer Reachability Information (NLRI) encoding format for BGP-LS, and a new BGP Path Attribute called the BGP-LS attribute, are defined in RFC 7752. The BGP-LS specifications for SR are described in the "BGP Link-State extensions for Segment Routing" draft (also denoted as SR-BGP-LS-DRAFT).

Various example embodiments for supporting flow-specific fast rerouting of source routed packets are configured to support use of new BGP-LS attributes, aligned with the approach in SR-BGP-LS-DRAFT, to distribute MPLS-FEH forwarding capabilities of routers. It is noted that the procedures in SR-BGP-LS-DRAFT are applicable to the new BGP-LS attributes as defined herein, unless specified otherwise herein.

Section 2.1.2 in SR-BGP-LS-DRAFT describes the SR-Capabilities TLV. In general, SR requires each router to advertise its SR data plane capability and the range of MPLS label values it uses for SR in the case where global SIDs (i.e., global indexes) are allocated. Section 2.1.2 in the SR-BGP-LS-DRAFT describes the format for the SR-Capabilities TLV as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|     Flags     |   Reserved    |
+-+-+-+-+-+-+-+-+-+-+-+-+-+-+-+-+

+-+-+-+-+-+-+-+-+-+-+-+-+-+-+-+-+-+-+-+-+-+-+-+-+-+-+-+-+-+-+-+-+
|                          Range Size                           |
+-+-+-+-+-+-+-+-+-+-+-+-+-+-+-+-+-+-+-+-+-+-+-+-+-+-+-+-+-+-+-+-+
//                  SID/Label sub-TLV (variable)               //
+-+-+-+-+-+-+-+-+-+-+-+-+-+-+-+-+-+-+-+-+-+-+-+-+-+-+-+-+-+-+-+-+
```

The SR-Capabilities TLV, as indicated above, includes a Type field, a Length field, and a Flags field, followed by one or more Segment Routing Global Block (SRGB) descriptor entries.

The Type field of the SR-Capabilities sub-TLV is a 1-octet field that indicates the type of the SR-Capabilities TLV. The value of the Type field has yet to be determined (e.g., a TLV codepoint of 1034 is suggested; however, it will be appreciated that other suitable values may be used).

The Length field of the SR-Capabilities TLV is a 1-octet field that indicates the length of the remaining portions of the SR-Capabilities TLV. The value of the Length field is variable.

The Flags field of the SR-Capabilities TLV is a 1-octet field that includes a set of one-bit flags configured to indicate various capabilities. The Flags field of the SR-Capabilities TLV has the following format:

```
 0 1 2 3 4 5 6 7
+-+-+-+-+-+-+-+-+
|I|V| |P|Q|     |
+-+-+-+-+-+-+-+-+
```

The Flags field of the SR-Capabilities TLV, as indicated above, includes an I Flag, a V Flag, a P Flag, and a Q Flag. The I and V Flags use the encoding and rules as described in Section 2.1.2 in SR-BGP-LS-DRAFT. The I Flag is the MPLS IPv4 flag which is configured such that, if set (e.g., equal to "1"), then the router is capable of processing SR MPLS encapsulated IPv4 packets on all interfaces. The V Flag is the MPLS IPv6 flag which is configured such that, if set (e.g., equal to "1"), then the router is capable of processing SR MPLS encapsulated IPv6 packets on all interfaces. Various example embodiments supporting flow-specific fast rerouting of source routed packets for MPLS-based source routing introduce new MPLS-FEH capability flags as follows: (1) a MPLS-FEH IPv4 flag, denoted as the P Flag and emphasized in the Flags field format provided above, which is configured such that, if set (e.g., equal to "1"), then the router is capable of processing SR MPLS-FEH encapsulated IPv4 packets on all interfaces and (2) a MPLS-FEH IPv6 flag, denoted as the Q Flag and emphasized in the Flags field format provided above, which is configured such that, if set (e.g., equal to "1"), then the router is capable of processing SR MPLS-FEH encapsulated IPv6 packets on all interfaces.

Various example embodiments for supporting flow-specific fast rerouting of source routed packets for MPLS-based source routing may be configured to support distribution of the MPLS-FEH forwarding capability of routers using BGP-LS in various other ways.

Various example embodiments for supporting flow-specific fast rerouting of source routed packets may be configured to support flow-specific FRR of source routed packets in IPv4 source routing.

Various example embodiments for supporting flow-specific fast rerouting of source routed packets for flow-specific FRR in IPv4-based source routing are configured to enable the PLR to perform fast reroute along flow-specific protection paths (i.e., one-to-one protection) while maintaining a flow-agnostic approach at the PLR, obviate the need for a PLR to preprogram protection paths into the data plane (thereby reducing data plane complexity and states in the PLR and transit nodes), support both link and node protection for source routed packets, provide extensions to IPv4 source routing capabilities, or the like, as well as various combinations thereof.

Various example embodiments for supporting flow-specific fast rerouting of source routed packets for flow-specific FRR in IPv4-based source routing may be further understood by considering use of various example embodiments for supporting flow-specific fast rerouting of source routed packets to provide node protection in IPv4 source routing (although it will be appreciated that the principles also may be applied for providing link protection in IPv4 source routing). This may be further understood by way of reference to the example network of FIG. 9, which illustrates the routers 111 of the communication network 110 of FIG. 1.

The PCE computes the explicit path that meets the QoS requirement or SLA of a flow. This path is denoted as E(<flow-id>). The PCE updates the dynamic TE state (e.g., residual bandwidth) of the network elements along that path into the TEDB, to reflect that TE resources allocated to the path have been reserved. In FIG. 9, the paths for flow A, flow B, and flow C are computed as follows:

For flow A: E(A)={R1→R2, R2→R4, R4→R7, R7→R9}.
For flow B: E(B)={R1→R2, R2→R4, R4→R6, R6→R8, R8→R9}.
For flow C: E(C)={R1→R2, R2→R4, R4→R7, R7→R8, R8→R9}.

The PCE also computes a protection path for each hop listed in E, such that a protection path also meets the QoS requirement or SLA of the flow. The protection path is denoted as P(<flow-id>, <protected-hop>). The PCE updates the dynamic TE state (e.g., residual bandwidth) of the network elements along the protection path into the TEDB, to reflect that TE resources allocated to the protection path have been reserved. For example, to protect against failure of node R4, P is computed as follows:

For flow A: P (A, R4)={R2→R3, R3→R5, R5→R7}.
For flow B: P (B, R4)={R2→R5, R5→R6}.
For flow C: P (C, R4)={R2→R3, R3→R5, R5→R7}.

It is noted that, for simplicity, R4 is shown as the protected hop in E; however, it will be appreciated that the PCE may try to compute protection paths for other hops listed in E or even for every hop listed in E.

It is noted that protection paths for P (A, R4)=P (C, R4), because the protection path satisfies QoS constraints of both of the flows. For example, assume that flow B was set-up before flow C. So, TE resources along the protection path P (A, R4) had been reserved as per the requirements of flow B. Later, when flow C has been set-up, the residual TE resources along the same protection path satisfy the QoS of flow C.

It will be appreciated that E or P may be computed using any suitable path computation mechanisms, such as local path computation at the source router by running CSPF on TEDB or by other computational techniques, local configuration at the source, global path computation at a central controller by running CSPF on TEDB or other computational techniques, or the like.

Various example embodiments for supporting flow-specific fast rerouting of source routed packets for flow-specific FRR in IPv4-based source routing may support a new hop type to be sent in the explicit path (in the header of the source routed packet). This new hop type for flow-specific FRR in IPv4 source routing is referred to herein as a "IPv4 Fast-Reroutable Explicit Hop" (IPV4-FEH). The IPV4-FEH includes the following tuple:

IPV4-FEH=[<protected-hop>, <protection-path>, <skip-count>]

The <protected-hop> parameter identifies the protected hop. It may indicate a node identifier or link identifier, in the primary path, for which protection is provided. For example, R2→R4 is the protected hop in both E(A) and E(B).

The <protection-path> parameter describes the protection path that protects the protected hop (i.e., that protects <protected hop>). The protection path may be described by specifying the list of hops of the protection path. For example, if R2→R4 is the protected-hop then respective protection paths for flow A and flow B are P(A,R4) and P(B,R4), respectively.

The <skip-count> parameter indicates the quantity of hops (of the primary path) subsequent to the <protected-hop> that are bypassed by the <protection-path>. For example, P(A) would skip R4→R7 after the protected hop R2→R4 and P(B) would skip R4→R6 after the protected hop R2→R4 and, thus, skip-count is 1 for both.

In FIG. 9, the encoding of the explicit paths sent by R1 for flow A and flow B would be as follows:

E(A)={R1→R2, [R2→R4, P (A, R4), 1], R4→R7, R7→R9}.

E(B)={R1→R2, [R2→R4, P (B, R4), 1], R4→R6, R6→R8, R8→R9}.

It is noted that, for clarity, R1→R2 is shown as the first hop in E(A) and E(B); however, since it is the immediate next hop of R1, R1 would strip it before sending the source routed packet to R2.

The operation of R2 upon receiving the source routed packet from R1 depends on whether the R2→R4 link is forwarding.

R2, upon receiving a packet from R1 when the R2→R4 link is forwarding (the R2→R4 link is active and R4 is active), takes the following actions.

If a packet arrives with E(A) when the R2→R4 link is forwarding, then R2 pops the first hop, which is IPV4-FEH=[R2→R4, P(A, R4), 1], and sends the source routed packet on the R2→R4 link with E(A)={R4→R7, R7→R9}.

If a packet arrives with E(B) when the R2→R4 link is forwarding, then R2 pops the first hop, which is IPV4-FEH=[R2→R4, P (B, R4), 1], and sends the source routed packet on R2→R4 with E(B)={R4→R6, R6→R8, R8→R9}.

R2, upon receiving a packet from R1 when the R2→R4 link is not forwarding (the R2→R4 link has failed or R4 has failed), takes the following actions.

If a packet arrives with E(A) when the R2→R4 link is not forwarding, then R2 takes the following actions: (1) R2 pops the first hop, which is IPV4-FEH=[R2→R4, P(A, R4), 1], (2) R2, since the R2→R4 link has failed, decides to fast-reroute the source routed packet along protection path P (A, R4), (3) R2, since the skip-count is "1", also pops R4→R7 from the explicit path, (4) R2 pops the first hop in P (A, R4), which is R2→R3, and, thus, decides to forward the source routed packet on the R2→R3 link, (5) R2 pushes the remaining hops in P (A, R4) into the explicit path such that the explicit path becomes E(A)={R3→R5, R5→R7, R7→R9}, and (6) sends the source routed packet out to R3.

If a packet arrives with E(B) when the R2→R4 link is not forwarding, then R2 takes the following actions: (1) R2 pops the first hop, which is IPV4-FEH=[R2→R4, P(B, R4), 1], (2) R2, since the R2→R4 link has failed, decides to fast-reroute the source routed packet along protection path P (B, R4), (3) R2, since the skip-count is "1", also pops R4→R6 from the explicit path, (4) R2 pops the first hop in P (B, R4), which is R2→R5, and, thus, decides to forward the source routed packet on the R2→R5 link, (5) R2 pushes the remaining hops in P (B, R4) into the explicit path such that the explicit path becomes E(B)={R5→R6, R6→R8, R7→R9}, and (6) sends the source routed packet out to R5.

It is noted that, from these examples, it may be seen that flow A and flow B are fast-rerouted along flow-specific protection paths upon failure of the common link R2→R4 or node R4. The PLR does not compute and program any protection-path against any of its next-hops; rather, the protection path is encoded in the source routed packet itself by the source node for use by the PLR.

Various example embodiments for supporting flow-specific fast rerouting of source routed packets for IPv4-based source routing may be configured to support one or more of a generic concept of one-to-one (flow specific) FRR for source routed IPv4 packets using IPV4-FEH, capabilities for implementation of IPV4-FEH encoded explicit path and flow specific FRR in IPv4 source routed packets, capabilities for signaling IPV4-FEH processing capabilities by routers (e.g., in IS-IS, OSPF, BGP-LS, or the like, as well as various combinations thereof), or the like, as well as various combinations thereof.

Various example embodiments for supporting flow-specific fast rerouting of source routed packets for IPv4-based source routing may be configured to support implementation of IPV4-FEH and flow-specific FRR in IPv4 source routed packets.

Various example embodiments for supporting flow-specific fast rerouting of source routed packets for IPv4-based source routing may be described within the context of FIG. 9. In describing these embodiments, the following terminology is used: "IP-X" is used as the loopback IP address in router "X", "IP-XY" is used as the IPv4 address at the Y end of link X→Y, and "IP-YX" is used as the IPv4 address at the X end of link Y→X. For example, the loopback address for R1 is IP-1, the address at the R2 end of R1→R2 is IP-12, and the address at the R1 end of R1→R2 is IP-21. It is noted that, in IPv4 source routing, a hop identifier for encoding a hop of a source routed path (primary or protection) may be an IPv4 address, a node identifier, or the like. In describing these embodiments, the explicit paths and protection paths introduced above for FIG. 9 are retained. Thus, the explicit path sent by router R1 on a packet is a list of IPv4 addresses, which is as follows for flow A and flow B:

E(A)={IP-12, [IP-24, P (A, R4), 1], IP-47, IP-79}, where P (A, R4) is the protection path={IP-23, IP-35, IP-57}.

E(B)={IP-12, [IP-24, P (B, R4), 1], IP-46, IP-68, IP-89}, where P (B, R4) is the protection path={IP-25, IP-56}.

It is noted that, for clarity, IP-12 was shown as the first hop in E(A) and E(B), but R1 would strip this hop before sending the source routed packet to R2. Thus, R2 will receive the following explicit path on respective flows A and B:

E(A)={[IP-24, P (A, R4), 1], IP-47, IP-79}.

E(B)={[IP-24, P (B, R4), 1], IP-46, IP-68, IP-89}.

Various example embodiments for supporting flow-specific fast rerouting of source routed packets for IPv4-based source routing may be configured to support encoding of the IPV4-FEH for use in supporting flow-specific FRR for source routed IPv4 packets. In at least some embodiments, as discussed further below, encoding of the IPV4-FEH may be performed using a new IPv4 Header Options, as an IP-Shim Layer Protocol, or the like, as well as various combinations thereof. It will be appreciated that such embodiments may be further understood by first considering various aspects of IPv4 source routing. The use of such mechanisms to support encoding of the IPV4-FEH for use in supporting flow-specific FRR for source routed IPv4 packets may be further understood by first considering various aspects of IPv4 source routing.

In general, IPv4 source routing is defined in RFC 791. RFC 791 describes several Options that can be appended to the IPv4 Header, as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Version|  IHL  |Type of Service|          Total Length         |
+-+-+-+-+-+-+-+-+-+-+-+-+-+-+-+-+-+-+-+-+-+-+-+-+-+-+-+-+-+-+-+-+
|         Identification        |Flags|      Fragment Offset    |
+-+-+-+-+-+-+-+-+-+-+-+-+-+-+-+-+-+-+-+-+-+-+-+-+-+-+-+-+-+-+-+-+
|  Time to Live |    Protocol   |         Header Checksum       |
+-+-+-+-+-+-+-+-+-+-+-+-+-+-+-+-+-+-+-+-+-+-+-+-+-+-+-+-+-+-+-+-+
|                         Source Address                        |
+-+-+-+-+-+-+-+-+-+-+-+-+-+-+-+-+-+-+-+-+-+-+-+-+-+-+-+-+-+-+-+-+
|                       Destination Address                     |
+-+-+-+-+-+-+-+-+-+-+-+-+-+-+-+-+-+-+-+-+-+-+-+-+-+-+-+-+-+-+-+-+
|                    Options                   |    Padding     |
+-+-+-+-+-+-+-+-+-+-+-+-+-+-+-+-+-+-+-+-+-+-+-+-+-+-+-+-+-+-+-+-+
```

The IPv4 Options provide for control functions that are needed or useful in some situations, but which may be unnecessary for most common communications. For example, the IPv4 Options include provisions for timestamps, security, special routing, and so forth. The IPv4 Options start with a 1-octet Type field followed by type-specific encoding that is based on the Type field. IPv4 Options are of variable length. Thus, the minimum size of an IPv4 Option is 1-octet (e.g., a 1-octet Type field) if it does not have any type specific data. By contrast, the maximum size of an IPv4 Option is limited by the maximum permissible value of the IHL field in the IPv4 Header. The 1-octet Type is viewed as having 3 fields as follows: (1) a 1-bit Copy Flag field which is copied into all fragments on fragmentation (i.e., "0"=not copied and "1"=copied), (2) a 2-bit Class field configured to support four options classes (e.g., 0=control, 1=reserved for future use, 2=debugging and measurement, and 3=reserved for future use), and (3) a 5-bit Number field that includes the value of the option. RFC 791 defines the following two IPv4 Options to be used for Source Routing, which are as follows.

| COPY | CLASS | NUMBER | LENGTH | DESCRIPTION |
|------|-------|--------|--------|-------------|
| 1 | 0 | 3 | var. | Loose Source Routing (LSR). Used to route the internet datagram based on information supplied by the source. |
| 1 | 0 | 9 | var. | Strict Source Routing (SSR). Used to route the internet datagram based on information supplied by the source. |

It is noted that both the LSR and SSR Options enable the source of an IPv4 source routed packet to supply routing information to be used by the intermediate routers in forwarding the IPv4 source routed packet to the destination, and to record the route information. The encoding of the LSR and SSR Options follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |    Pointer    |               |
+-+-+-+-+-+-+-+-+-+-+-+-+-+-+-+-+-+-+-+-+-+-+-+-+               +
|                                                               |
+                          Route Data                           +
~                                                               ~
~                                                               ~
|                                                               |
+-+-+-+-+-+-+-+-+-+-+-+-+-+-+-+-+-+-+-+-+-+-+-+-+-+-+-+-+-+-+-+-+
```

The LSR and SSR Options, as indicated above, each include a Type field, a Length field, a Pointer field, and a Route Data field.

The Type field of an LSR or SSR Option is a 1-octet field that indicates LSR or SSR type option in tuples of COPY, CLASS and NUMBER.

The Length field of an LSR or SSR Option is a 1-octet field that indicates the length of the LSR or SSR Option (including the Type field, the Length field, the Pointer field, and the Route Data field).

The Pointer field of an LSR or SSR Option is a 1-octet field that indicates the octet in Route Data which begins the next SA to be processed by the receiving router. The pointer is relative to this option, and the smallest legal value for the pointer is 4, which points to the first IPv4 SA in the Route Data field.

The Route Data field of an LSR or SSR Option is composed of a series of IPv4 addresses, where each address is 32 bits (or 4 octets) as shown below (illustrating an LSR or SSR Option with IPV4 addresses in the Route Data field):

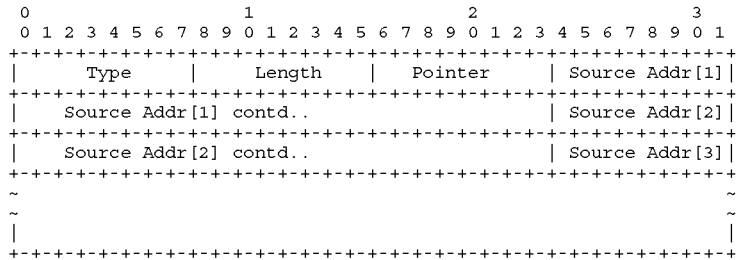

The LSR or SSR Option, as indicated above, support source routing of an IPv4 packet. If the Pointer is greater than the Length, the source route is considered as empty (and the recorded route is full) and the routing is to be based on the DA field in IPv4 Header. If the address in DA field has been reached and the Pointer is not greater than the Length, the next address in the source route replaces the address in the DA field, the recorded route address replaces the SA just used (i.e., the previous DA is the recorded address), and the Pointer is increased by four. Thus, the source routed packet gets forwarded along each hop specified in the Route Data field of the LSR or SSR Option.

The use of the LSR and SSR Options may be further understood by way of an example. In FIG. 9, assume that R1 wants to send a packet with SA=S and DA=D along the path {IP-12, IP-24, IP-47, IP-79}. In this case, R1 sends the source routed packet on R1→R2 as: SA=S, DA=IP-12, Option Type=SSR, Length=19, Pointer=4, Route-Data={IP-24, IP-47, IP-79, D}. When R2 receives the source routed packet, it finds that DA=IP-12 is local (and, thus, reached). Since the source routed packet carries the SSR option and Pointer <Length, R2 swaps DA with the next address IP-24 in the Route-Data. The Pointer is increased by 4 to point to the next address (IP-47) in the Route Data. R2 sends the source routed packet on R2→R4 as: SA=S, DA=IP-24, Option Type=SSR, Length=19, Pointer=8, Route-Data={IP-12, IP-47, IP-79, D}. Similarly, R4 forwards the source routed packet on R4→R7 as: SA=S, DA=IP-47, Option Type=SSR, Length=19, Pointer=12, Route-Data={IP-12, IP-24, IP-79, D}. Similarly, R7 forwards the source routed packet to R7→R9 as: SA=S, DA=IP-79, Option Type=SSR, Length=19, Pointer=16, Route-Data={IP-12, IP-24, IP-47, D}. Similarly, R9 forwards the source routed packet to D as: SA=S, DA=D, Option Type=SSR, Length=19, Pointer=20, Route-Data={IP-12, IP-24, IP-47, IP-79}. When the source routed packet leaves R9, it may be seen that Route-Data contains the explicit path traversed by the source routed packet (Recorded-Route). The subsequent nodes would find that Pointer>Length, so packet forwarding would continue based on DA=D alone.

Various example embodiments for supporting flow-specific fast rerouting of source routed packets for IPv4-based source routing may be configured to support encoding of the IPV4-FEH using new IPv4 Header Options.

In at least some embodiments, the IPv4 Header Options for encoding of the IPV4-FEH may be defined as follows:

| CLASS | NUMBER | LENGTH | DESCRIPTION |
|---|---|---|---|
| 0 | 22 | var. | FEH Loose Source Routing (FEH-LSR). Used to reoute the internet datagram based on FEH information supplied by the source. |
| 0 | 31 | var. | FEH Strict Source Routing (FEH-SSR). Used to route the internet datagram based on FEH information supplied by the source. |

It will be appreciated that the new IPv4 Header Options, although primarily indicated as having specific numbers, may use any other suitable numbers (e.g., any suitable numbers assigned from the unallocated values in IANA registry).

In at least some embodiments, the IPv4 Header Options for encoding of the IPV4-FEH may formatted as follows:

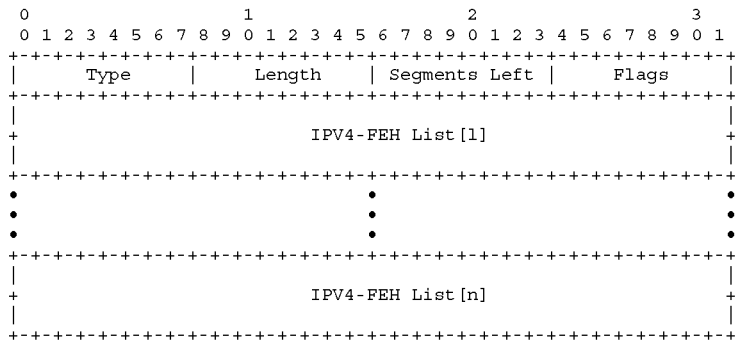

The IPv4 Header Options or encoding of the IPV4-FEH, as indicated above, includes a Type field, a Length field, a Segments Left field, a Flags field, and an IPV4-FEH List (from IPV4-FEH List[1] to IPV4-FEH List[n]).

The Type field of the IPv4 Header Options is a 1-octet field that indicates FEH-LSR or FEH-SSR type option in tuples of COPY, CLASS and NUMBER.

The Length field of the IPv4 Header Options is a 1-octet field that indicates length of this option (including the Type octet, the Length octet, the Segments Left octet, the Flags octet, and all octets of the IPV4-FEH-List.

The Segments Left field of the IPv4 Header Options is a 1-octet field that includes the index, in the IPV4-FEH List, of the next hop to inspect. The Segments Left value is decremented at each IPV4-FEH. If the Segments Left field in the Option is 0, the source route is considered as empty (and the recorded route is full) and the routing is to be based on the DA field in IPv4 Header. If the address in DA field has been reached and the Segments Left is not 0, the next IPV4-FEH indexed by the Segments Left field is processed and the forwarding decision is made based on that IPV4-FEH.

The Flags field of the IPv4 Header Options is a 1-octet field that includes a set of one-bit flags configured to indicate various capabilities. The Flags field of the IPv4 Header Options has the following format:

```
 0 1 2 3 4 5 6 7
+-+-+-+-+-+-+-+-+
|O|      U      |
+-+-+-+-+-+-+-+-+
```

The Flags field of the IPv4 Header Options, as indicated above, includes an O Flag and a U Flag. The O Flag is the operations and management (OAM) flag which is configured such that, if set (e.g., equal to "1"), then it indicates that this packet is an OAM packet. The U Flag is unused and for future use and, thus, should be unset on transmission and ignored on receipt.

The IPV4-FEH List is a list of n IPV4-FEHs (denoted as IPV4-FEH List[1] to IPV4-FEH List[n]). In the list, IPV4-FEH List[n] is the IPV4-FEH that represents n-th element in the IPV4-FEH list. The IPV4-FEH list is encoded starting from the last hop of the path (i.e., the first element of the IPV4-FEH List (IPV4-FEH List[1]) includes the last hop of the path while the last hop of the IPV4-FEH List (IPV4-FEH List[n]) includes the first hop of the path). The index in the "Segments Left" field identifies the current hop. An IPV4-FEH is 8-octets in size and is defined as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Num Prot Hops |  Skip Count   |     Flags     |    RESERVED   |
+-+-+-+-+-+-+-+-+-+-+-+-+-+-+-+-+-+-+-+-+-+-+-+-+-+-+-+-+-+-+-+-+
|                           IPV4 Adress                         |
+-+-+-+-+-+-+-+-+-+-+-+-+-+-+-+-+-+-+-+-+-+-+-+-+-+-+-+-+-+-+-+-+
```

The IPV4-FEH, as indicated above, includes a Number of Protection Hops (Num Prot Hops) field, a Skip Count field, a Flags field, a RESERVED field, and an IPv4 Address field.

The Number of Protection Hops field of the IPV4-FEH is a 1-octet field that indicates the number of subsequent IPV4-FEHs that are protecting this IPV4-FEH. If the value of the Number of Protection Hops field is set to a value P, then it means that the P subsequent IPV4-FEHs immediately following that IPV4-FEH constitute the protection path of that IPV4-FEH. If the value of the Number of Protection Hops field is set to 0, then it means that there is no protection path for that IPV4-FEH. Additionally, if the IPV4-FEH belongs to a protection path then the value of the Number of Protection Hops field will be set to 0 (since the protection path itself is not protected).

The Skip Count field of the IPV4-FEH is a 1-octet field that indicates the number of subsequent IPV4-FEHs to be skipped after processing this IPV4-FEH. This is set to 0 for all IPV4-FEHs, except for the IPV4-FEH which is the last IPV4-FEH in a protection path.

The Flags field of the IPV4-FEH is a 1-octet field that includes a set of one-bit flags configured to indicate various capabilities. The Flags field of the IPV4-FEH has the following format:

```
 0 1 2 3 4 5 6 7
+-+-+-+-+-+-+-+-+
|R|P|     U     |
+-+-+-+-+-+-+-+-+
```

The Flags field of the IPV4-FEH, as indicated above, includes an R Flag, a P Flag, and a U Flag. The R Flag is a Recorded Route bit that indicates that this IPV4-FEH has been traversed by the source routed packet (and is set to 0 by the originator of this IPV4-FEH). The P Flag is a protected flag that indicates that this hop is part of a protection path. The U Flag is unused and for future use and, thus, unset on transmission and ignored on receipt.

The RESERVED field of the IPV4-FEH is unused and is reserved for future use. This should be unset on transmission and ignored on receipt.

The IPv4 Address field of the IPV4-FEH includes the 32-bit IPV4 address representing a hop in the primary path or the protection path and should not be a multicast address.

It is noted that the encoding and processing rules may be same for FEH-LSR and FEH-SSR; however, for purposes of clarity, various example embodiments for supporting flow-specific fast rerouting of source routed packets for flow-specific FRR in IPv4-based source routing are primarily presented herein in terms of FEH-SSR.

Various example embodiments for supporting flow-specific fast rerouting of source routed packets for flow-specific FRR in IPv4-based source routing are configured to support appending of FEH-LSR and FEH-SSR to the IPv4 Header by the head-end router.

The head-end router may be configured to perform the following operations while appending FEH-SSR to the IPv4 Header.

The DA in IPv4 Header is set with the IPv4 address of the first primary hop in the explicit path. The original DA in IPv4 Header is preserved in IPV4-FEH[1] (as discussed further below).

The Length field in FEH-SSR is set to the total number of octets in Type, Length, Segments Left, Flags and IPV4-FEH-List.

The Segments Left field is set to n, where n is the number of elements in the IPV4-FEH List.

The IPV4-FEH List is encoded in the reverse order of the path. Let n be the number of IPV4-FEH entries. The IPV4-FEH[1] is the last hop in primary path (the final DA of the source routed packet) and the IPV4-FEH[n] is the first hop. The entries in the list are ordered in units of sub-groups, where each subgroup contains an IPV4-FEH for a primary-hop followed by a list of IPV4-FEH entries for its protection path. This is further explained as follows.

When encoding the IPV4-FEH List, if IPV4-FEH List[x] is an unprotected primary hop, then IPV4-FEH List[x] is encoded with Num_Prot_Hops=0, Skip_Count=0, and Flags=0 to indicate that no protection path follows this entry and, thus, that IPV4-FEH List[x-1] is the subsequent primary hop.

When encoding the IPV4-FEH List, if IPV4-FEH List[x] is a protected primary hop, then the hops of the protection path also are encoded. Let p be the quantity of hops in the protection path. IPV4-FEH List[x] is encoded with Num_Protection_Hops=p, Skip_Count=0, and Flags=0, which means that IPV4-FEH List[x-1] to IPV4-FEH List[x-p-1] is composed of the hops in the protection path and that the subsequent primary hops start at IPV4-FEH List[x-p-2]. Each of the entries in IPV4-FEH List[x-1] through IPV4-FEH List[x-p-1] is encoded with Num_Protection_Hops=0, because hops in the protection path are not protected. The P flag is set to 1. Each of the entries in IPV4-FEH List[x-1] through IPV4-FEH List[x-p] is encoded with Skip_Count=0. The last entry in the protection path, i.e., IPV4-FEH List[x-p-1], is encoded with Skip_Count=C, where C is the number of subsequent primary hops to be skipped (i.e., from IPV4-FEH List[x-p-2] through IPV4-FEH List[x-p-c-1]) if the source routed packet is being forwarded on a node protection path.

It is noted that this encoding rule is iterated over each sub-group of the IPV4-FEH List.

The head-end router then sends the source routed packet toward the DA indicated in the source routed packet.

The appending of the FEH-SSR to the IPv4 Header may be further understood by way of reference to the following example. For example, consider the path for flow A in FIG. 9, as follows: E(A)={IP-12, [IP-24, P (A, R4), 1], IP-47, IP-79} where P (A, R4) is the protection path={IP-35, IP-57}. In this example, the path is encoded on a packet from source S to destination D as follows:

IPv4 Header
DA=IP-12
FEH-SSR Option
Type: FEH-SSR, Length=60, Segments Left=7, Flags=0
IPV4-FEH List[1]=Num_Protection_Hops=0, Skip_Count=0, R=0, P=0, D
IPV4-FEH List[2]=Num_Protection_Hops=0, Skip_Count=0, R=0, P=0, IP-79
IPV4-FEH List[3]=Num_Protection_Hops=0, Skip_Count=0, R=0, P=0, IP-47
IPV4-FEH List[4]=Num_Protection_Hops=0, Skip_Count=1, R=0, P=1, IP-57
IPV4-FEH List[5]=Num_Protection_Hops=0, Skip_Count=0, R=0, P=1, IP-35
IPV4-FEH List[6]=Num_Protection_Hops=0, Skip_Count=0, R=0, P=1, IP-23
IPV4-FEH List[7]=Num_Protection_Hops=3, Skip_Count=0, R=0, P=0, IP-24

In the example above, it is noted that the total size (Length=60) is based on a combination of the size of the common part of the FEH-SSR that includes the Type, Length, Segments Left, and Flags fields (4 bytes) and the size of the set of IPV4-FEHs (7×8 bytes per IPV4-FEH=56 bytes).

Various example embodiments for supporting flow-specific fast rerouting of source routed packets for flow-specific FRR in IPv4-based source routing are configured to support processing of FEH-LSR and FEH-SSR of the IPv4 Header by the transit router.

The transit router may be configured to perform the following operations while processing the FEH-SSR of the IPv4 Header.

It is noted that the node that is supposed to inspect the FEH-SSR Option is the node corresponding to DA of the source routed packet. The other transit nodes should not inspect these options and should forward the source routed packet toward the DA according to the IPV4 Routing Table.

The transit router corresponding to the DA, upon receiving the FEH-SSR Option of the IPv4 Header, may process the FEH-SSR Option of the IPv4 Header as follows.

If Segments Left=0, the next layer in the source routed packet, whose type is identified by the Protocol Field in the IPv4 Header, is processed.

If Segments Left≠0, then i is set equal to the index of the next IPV4-FEH to be visited in the IPV4-FEH list (=Segments Left). The Segments Left value is decremented by 1. From this point on, the Segments Left value points to IPV4-FEH[i-1]. The IPV4-FEH[i] is processed as discussed further below.

If the address of IPV4-FEH[i] is a multicast address, then the source routed packet is discarded.

If the address of IPV4-FEH[i] is a not multicast address, then IPV4-FEH[i] is further processed as follows: (1) if the TTL in the IPv4 Header is less than or equal to 1, swap the IPv4 DA and the IPv4 address of IPV4-FEH[i], set the R Flag in IPV4-FEH[i]=1 to indicate that it has been traversed by the source routed packet, send an ICMP Time Exceeded-TTL Exceeded in Transit message to the SA and discard the source routed packet or (2) if the TTL in the IPv4 Header is not less than or equal to 1, then IPV4-FEH[i] is further processed by checking the reachability of the address of IPV4-FEH[i].

If the address of IPV4-FEH[i] is reachable, swap the IPv4 DA and the IPv4 address of IPV4-FEH[i] and set the R Flag in IPV4-FEH[i]=1 to indicate that this hop has been traversed by the source routed packet. The following processing is performed: (1) if Num_Protection_Hops in IPV4-FEH[i]>0, decrement Segments Left by Num_Protection_Hops in IPV4-FEH[i] (this means that the hops in protection path have been skipped, since the source routed packet is not being forwarded along the protection path) or (2) if Skip_Count in IPV4-FEH[i]>0, decrement Segments Left by Skip_Count in IPV4-FEH[i] (this means that the hops in the primary path have been skipped, i.e., bypassed by the protection path). The source routed packet is then resubmitted to the IPv4 module for transmission to the new destination.

If the address of IPV4-FEH[i] is not reachable and if the Num_Protection_Hops in IPV4-FEH[i]=0 (this means that the hop is neither operational nor protected and, thus, that the source routed packet is to be dropped), the IPv4 DA address and the IPv4 address of IPV4-FEH[i] are swapped, the R Flag in IPV4-FEH[i] is set equal to 1 to indicate that this hop has been traversed by the source routed packet, an ICMP Unreachable message is sent to the SA, and the source routed packet is discarded.

If the address of IPV4-FEH[i] is not reachable and if Num_Protection_Hops in IPV4-FEH[i] !=0 (this means that the hop is unreachable, but is protected, so the source routed packet is to be fast-rerouted via the protection path), the Segments Left value is decremented by 1 (such that it now points to IPV4-FEH[i−2]), the DA address and the IPv4 address of IPV4-FEH[i] (i.e., the first entry in the protection path) are swapped, the R Flag in IPV4-FEH[i] is set equal to 1 to indicate that this hop has been traversed by the source routed packet, and the source routed packet is then resubmitted to the IPv4 module for transmission to the new destination.

It is noted that the encoding and processing rules may be same for FEH-LSR Option and FEH-SSR Option; however, for purposes of clarity, various example embodiments for supporting flow-specific fast rerouting of source routed packets for flow-specific FRR in IPv4-based source routing are primarily presented herein in terms of FEH-SSR Option.

Various example embodiments for supporting flow-specific fast rerouting of source routed packets for flow-specific FRR in IPv4-based source routing, based on use of IPv4 Options, may be further understood by considering an example in which source router R1 sends a packet from source S to destination D with explicit path E(A).

When R2→R4 is operational, the source routed packet travels along the path R1→R2, R2→R4, R4→R, R7→R9, R9→D, each of which is discussed below.

As the source routed packet travels from R1 to R2, the IPv4 Header and the FEH-SSR Option elements may be encoded as follows:
 IPv4 Header
 Source Address=S
 Destination Address=IP-12
 FEH-SSR Option
 Type: FEH-SSR, Length=60, Segments Left=7, Flags=0,
 IPV4-FEH List[1]=Num_Protection_Hops=0, Skip_Count=0, R=0, P=0, D
 IPV4-FEH List[2]=Num_Protection_Hops=0, Skip_Count=0, R=0, P=0, IP-79
 IPV4-FEH List[3]=Num_Protection_Hops=0, Skip_Count=0, R=0, P=0, IP-47
 IPV4-FEH List[4]=Num_Protection_Hops=0, Skip_Count=1, R=0, P=1, IP-57
 IPV4-FEH List[5]=Num_Protection_Hops=0, Skip_Count=0, R=0, P=1, IP-35
 IPV4-FEH List[6]=Num_Protection_Hops=0, Skip_Count=0, R=0, P=1, IP-23
 IPV4-FEH List[7]=Num_Protection_Hops=3, Skip_Count=0, R=0, P=0, IP-24

As indicated above, the source routed packet arrived in R2 with Segments Left=7. So, R2 processed IPV4-FEH List[7], which is a reachable next-hop. R2 swapped DA (IP-12) with the address in IPV4-FEH List[7] and marked it as part of the recorded-route (R=1). The IPV4-FEH List[7] has 3 protection hops, so IPV4-FEH List[6 . . . 4] need to be skipped, as the source routed packet is not traversing the protection path. So, Segments Left is set to 3 (=7-1-3).

As the source routed packet travels from R2 to R4, the IPv4 Header and the FEH-SSR Option elements may be encoded as follows (updated fields highlighted with underlining):
 IPv4 Header
 Source Address=S
 Destination Address=IP-24
 FEH-SSR Option
 Type: FEH-SSR, Length=60, Segments Left=3, Flags=0,
 IPV4-FEH List[1]=Num_Protection_Hops=0, Skip_Count=0, R=0, P=0, D
 IPV4-FEH List[2]=Num_Protection_Hops=0, Skip_Count=0, R=0, P=0, IP-79
 IPV4-FEH List[3]=Num_Protection_Hops=0, Skip_Count=0, R=0, P=0, IP-47
 IPV4-FEH List[4]=Num_Protection_Hops=0, Skip_Count=1, R=0, P=1, IP-57
 IPV4-FEH List[5]=Num_Protection_Hops=0, Skip_Count=0, R=0, P=1, IP-35
 IPV4-FEH List[6]=Num_Protection_Hops=0, Skip_Count=0, R=0, P=1, IP-23
 IPV4-FEH List[7]=Num_Protection_Hops=3, Skip_Count=0, R=1, P=0, IP-12

As the source routed packet travels from R4 to R7, the IPv4 Header and the FEH-SSR Option elements may be encoded as follows (updated fields highlighted with underlining):
 IPv4 Header
 Source Address=S
 Destination Address=IP-47
 FEH-SSR Option
 Type: FEH-SSR, Length=60, Segments Left=2, Flags=0,
 IPV4-FEH List[1]=Num_Protection_Hops=0, Skip_Count=0, R=0, P=0, D
 IPV4-FEH List[2]=Num_Protection_Hops=0, Skip_Count=0, R=0, P=0, IP-79
 IPV4-FEH List[3]=Num_Protection_Hops=0, Skip_Count=0, R=1, P=0, IP-24
 IPV4-FEH List[4]=Num_Protection_Hops=0, Skip_Count=1, R=0, P=1, IP-57
 IPV4-FEH List[5]=Num_Protection_Hops=0, Skip_Count=0, R=0, P=1, IP-35
 IPV4-FEH List[6]=Num_Protection_Hops=0, Skip_Count=0, R=0, P=1, IP-23
 IPV4-FEH List[7]=Num_Protection_Hops=3, Skip_Count=0, R=1, P=0, IP-12

As the source routed packet travels from R7 to R9, the IPv4 Header and the FEH-SSR Option elements may be encoded as follows (updated fields highlighted with underlining):
 IPv4 Header
 Source Address=S
 Destination Address=IP-79
 FEH-SSR Option
 Type: FEH-SSR, Length=60, Segments Left=1, Flags=0,
 IPV4-FEH List[1]=Num_Protection_Hops=0, Skip_Count=0, R=0, P=0, D
 IPV4-FEH List[2]=Num_Protection_Hops=0, Skip_Count=0, R=1, P=0, IP-47
 IPV4-FEH List[3]=Num_Protection_Hops=0, Skip_Count=0, R=1, P=0, IP-24
 IPV4-FEH List[4]=Num_Protection_Hops=0, Skip_Count=1, R=0, P=1, IP-57
 IPV4-FEH List[5]=Num_Protection_Hops=0, Skip_Count=0, R=0, P=1, IP-35
 IPV4-FEH List[6]=Num_Protection_Hops=0, Skip_Count=0, R=0, P=1, IP-23

IPV4-FEH List[7]=Num_Protection_Hops=3, Skip_Count=0, R=1, P=0, IP-12

As the source routed packet travels from R9 to D, the IPv4 Header and the FEH-SSR Option elements may be encoded as follows (updated fields highlighted with underlining):

IPv4 Header
Source Address=S
Destination Address=D
FEH-SSR Option
Type: FEH-SSR, Length=60, Segments Left=0, Flags=0,
IPV4-FEH List[1]=Num_Protection_Hops=0, Skip_Count=0, R=1, P=0, IP-79
IPV4-FEH List[2]=Num_Protection_Hops=0, Skip_Count=0, R=1, P=0, IP-47
IPV4-FEH List[3]=Num_Protection_Hops=0, Skip_Count=0, R=1, P=0, IP-24
IPV4-FEH List[4]=Num_Protection_Hops=0, Skip_Count=1, R=0, P=1, IP-57
IPV4-FEH List[5]=Num_Protection_Hops=0, Skip_Count=0, R=0, P=1, IP-35
IPV4-FEH List[6]=Num_Protection_Hops=0, Skip_Count=0, R=0, P=1, IP-23
IPV4-FEH List[7]=Num_Protection_Hops=3, Skip_Count=0, R=1, P=0, IP-12

It may be seen that, when the source routed packet leaves R9 towards D, the R Flag gets set to 1 on the IPV4-FEH entries that have been traversed by the source routed packet. That subset of IPV4-FEH entries is the recorded-route list.

When the R2→R4 link has failed or the R4 node as failed, the source routed packet travels along the path R1→R2, R2→R3, R3→R5, R5→R7, R7→R9, R9→D, each of which is discussed below.

As the source routed packet travels from R1 to R2, the IPv4 Header and the FEH-SSR Option elements may be encoded as follows:

IPv4 Header
Source Address=S
Destination Address=IP-12
FEH-SSR Option
Type: FEH-SSR, Length=60, Segments Left=7, Flags=0,
IPV4-FEH List[1]=Num_Protection_Hops=0, Skip_Count=0, R=0, P=0, D
IPV4-FEH List[2]=Num_Protection_Hops=0, Skip_Count=0, R=0, P=0, IP-79
IPV4-FEH List[3]=Num_Protection_Hops=0, Skip_Count=0, R=0, P=0, IP-47
IPV4-FEH List[4]=Num_Protection_Hops=0, Skip_Count=1, R=0, P=1, IP-57
IPV4-FEH List[5]=Num_Protection_Hops=0, Skip_Count=0, R=0, P=1, IP-35
IPV4-FEH List[6]=Num_Protection_Hops=0, Skip_Count=0, R=0, P=1, IP-23
IPV4-FEH List[7]=Num_Protection_Hops=3, Skip_Count=0, R=0, P=0, IP-24

As indicated above, the source routed packet arrived in R2 with Segments Left=7. So, R2 processed IPV4-FEH List[7], but it is not reachable. Since IPV4-FEH List[7] has a protection path (i.e., the 3 subsequent hops IPV4-FEH List[4 . . . 6]), the source routed packet is forwarded along the protection path. The DA (=IP-12) is swapped with first hop in the protection path, i.e., IPV4-FEH List[6]. The DA is traversed, so recorded-route is set (R=1). Segments Left points to IPV4-FEH List[5].

As the source routed packet travels from R2 to R3, the IPv4 Header and the FEH-SSR Option elements may be encoded as follows (updated fields highlighted with underlining):

IPv4 Header
Source Address=S
Destination Address=IP-23
FEH-SSR Option
Type: FEH-SSR, Length=60, Segments Left=5, Flags: 0
IPV4-FEH List[1]=Num_Protection_Hops=0, Skip_Count=0, R=0, P=0, D
IPV4-FEH List[2]=Num_Protection_Hops=0, Skip_Count=0, R=0, P=0, IP-79
IPV4-FEH List[3]=Num_Protection_Hops=0, Skip_Count=0, R=0, P=0, IP-47
IPV4-FEH List[4]=Num_Protection_Hops=0, Skip_Count=1, R=0, P=1, IP-57
IPV4-FEH List[5]=Num_Protection_Hops=0, Skip_Count=0, R=0, P=1, IP-35
IPV4-FEH List[6]=Num_Protection_Hops=0, Skip_Count=0, R=1, P=1, IP-12
IPV4-FEH List[7]=Num_Protection_Hops=3, Skip_Count=0, R=0, P=0, IP-24

As the source routed packet travels from R3 to R5, the IPv4 Header and the FEH-SSR Option elements may be encoded as follows (updated fields highlighted with underlining):

IPv4 Header
Source Address=S
Destination Address=IP-35
FEH-SSR Option
Type: FEH-SSR, Length=60, Segments Left=4, Flags: 0
IPV4-FEH List[1]=Num_Protection_Hops=0, Skip_Count=0, R=0, P=0, D
IPV4-FEH List[2]=Num_Protection_Hops=0, Skip_Count=0, R=0, P=0, IP-79
IPV4-FEH List[3]=Num_Protection_Hops=0, Skip_Count=0, R=0, P=0, IP-47
IPV4-FEH List[4]=Num_Protection_Hops=0, Skip_Count=1, R=0, P=1, IP-57
IPV4-FEH List[5]=Num_Protection_Hops=0, Skip_Count=0, R=1, P=1, IP-23
IPV4-FEH List[6]=Num_Protection_Hops=0, Skip_Count=0, R=1, P=1, IP-12
IPV4-FEH List[7]=Num_Protection_Hops=3, Skip_Count=0, R=0, P=0, IP-24

As indicated above, the source routed packet arrived in R5 with Segments Left=4, so R5 processes IPV4-FEH List[4]. It has a Skip_Count=1, so IPV4-FEH List[5] needs to be skipped. The non-zero Skip Count means that this protection path offered node protection and IPV4-FEH List[5] (which is a hop in primary path) has been bypassed.

As the source routed packet travels from R5 to R7, the IPv4 Header and the FEH-SSR Option elements may be encoded as follows (updated fields highlighted with underlining):

IPv4 Header
Source Address=S
Destination Address=IP-57
FEH-SSR Option
Type: FEH-SSR, Length=60, Segments Left=2, Flags=0,
IPV4-FEH List[1]=Num_Protection_Hops=0, Skip_Count=0, R=0, P=0, D
IPV4-FEH List[2]=Num_Protection_Hops=0, Skip_Count=0, R=0, P=0, IP-79
IPV4-FEH List[3]=Num_Protection_Hops=0, Skip_Count=0, R=0, P=0, IP-47
IPV4-FEH List[4]=Num_Protection_Hops=0, Skip_Count=1, R=1, P=1, IP-35
IPV4-FEH List[5]=Num_Protection_Hops=0, Skip_Count=0, R=1, P=1, IP-23

IPV4-FEH List[6]=Num_Protection_Hops=0, Skip_Count=0, R=1, P=1, IP-12
IPV4-FEH List[7]=Num_Protection_Hops=3, Skip_Count=0, R=0, P=0, IP-24

As the source routed packet travels from R7 to R9, the IPv4 Header and the FEH-SSR Option elements may be encoded as follows (updated fields highlighted with underlining):

IPv4 Header
Source Address=S
Destination Address=IP-79
FEH-SSR Option
Type: FEH-SSR, Length=60, Segments Left=1, Flags=0,
IPV4-FEH List[1]=Num_Protection_Hops=0, Skip_Count=0, R=0, P=0, D
IPV4-FEH List[2]=Num_Protection_Hops=0, Skip_Count=0, R=1, P=0, IP-57
IPV4-FEH List[3]=Num_Protection_Hops=0, Skip_Count=0, R=0, P=0, IP-47
IPV4-FEH List[4]=Num_Protection_Hops=0, Skip_Count=1, R=1, P=1, IP-35
IPV4-FEH List[5]=Num_Protection_Hops=0, Skip_Count=0, R=1, P=1, IP-23
IPV4-FEH List[6]=Num_Protection_Hops=0, Skip_Count=0, R=1, P=1, IP-12
IPV4-FEH List[7]=Num_Protection_Hops=3, Skip_Count=0, R=0, P=0, IP-24

As the source routed packet travels from R9 to D, the IPv4 Header and the FEH-SSR Option elements may be encoded as follows (updated fields highlighted with underlining):

IPv4 Header
Source Address=S
Destination Address=D
FEH-SSR Option
Type: FEH-SSR, Length=60, Segments Left=0, Flags=0,
IPV4-FEH List[1]=Num_Protection_Hops=0, Skip_Count=0, R=1, P=0, IP-79
IPV4-FEH List[2]=Num_Protection_Hops=0, Skip_Count=0, R=1, P=0, IP-57
IPV4-FEH List[3]=Num_Protection_Hops=0, Skip_Count=0, R=0, P=0, IP-47
IPV4-FEH List[4]=Num_Protection_Hops=0, Skip_Count=1, R=1, P=1, IP-35
IPV4-FEH List[5]=Num_Protection_Hops=0, Skip_Count=0, R=1, P=1, IP-23
IPV4-FEH List[6]=Num_Protection_Hops=0, Skip_Count=0, R=1, P=1, IP-12
IPV4-FEH List[7]=Num_Protection_Hops=3, Skip_Count=0, R=0, P=0, IP-24

As indicated above, when the source routed packet leaves R9 towards D, the R flag gets set to 1 on the IPV4-FEH entries that have been traversed by the source routed packet (not on the IPV4-FEH entries that have not been traversed by the source routed packet).

It will be appreciated that, although the foregoing example used an FEH-SSR Option that has a length of 60 bytes (a length which is not expected to be supported in practice, since the maximum size of an IPv4 Option typically is 40 bytes), this example illustrates various example embodiments of the manner in which an IPv4 Option may be used to encode a protection path within a source routed packet.

Various example embodiments for supporting flow-specific fast rerouting of source routed packets for IPv4-based source routing, as indicated above, may be configured to support encoding of the IPV4-FEH using new IPv4 Header Options in various other ways.

Various example embodiments for supporting flow-specific fast rerouting of source routed packets for IPv4-based source routing may be configured to support encoding of the IPV4-FEH using an IP-Shim Layer Protocol.

The Internet Header Length (IHL) field in the IPv4 Header has 4 bits, which represent the number of 32-bit words on the IPv4 Header, including the variable number of IPv4 options. As a 4-bit field, the maximum value is 15 words (15×32 bits, or 480 bits=60 bytes). The minimum value of IHL is 5 which indicates a length of 5×32=160 bits=20 bytes, i.e., the fixed size of the IPv4 Header excluding the IPv4 options. This means that the maximum size of the IPv4 options can be 60−20=40 bytes, which limits the number of IPV4-FEHs that can be included within FEH-LSR and FEH-SSR options. It is noted that this limitation may be seen from the example above, in which the length of the FEH-SSR Option is 60 bytes (which is not supported in practice). In at least some embodiments, the limits imposed by the IHL field of the IPv4 Header on the number of IPV4-FEHs that can be carried as Options may be removed by using a generic IP-Shim Layer.

The generic IP-Shim Layer, as indicated above, may be configured to support encoding of IPV4-FEHs in support of flow-specific fast rerouting of source routed packets for IPv4-based source routing. The generic IP-Shim Layer may be inserted between the IPv4 Header and the transport/upper layer protocol header (e.g., TCP, UDP, ICMP, or the like). The IP-Shim Layer may be carried using a new IP Protocol number in the IPv4 Header, which can be reserved from the registry maintained by IANA (e.g., a value of 145, which may be allocated from the IANA registry, is suggested; however, it will be appreciated that any suitable value may be used). The IP-Shim Layer is defined as generic in that it can carry any "enhancement" related to the IP layer. It is expected that the node that is allowed to inspect the IP-Shim Header is the node corresponding to the DA of the source routed packet (or if the Router Alert Option is set in the IPv4 Header as defined in RFC 2113). The IP-Shim Layer may use the following IPV4-FEH-Shim Header:

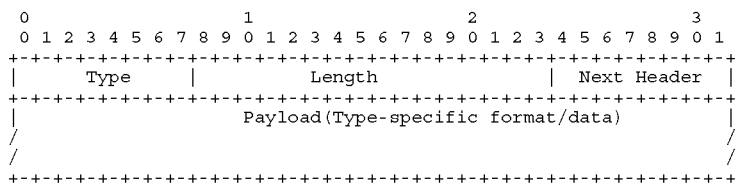

The IPV4-FEH-Shim Header for use at the IP-Shim Layer, as indicated above, includes a Type field, a Length field, a Next Header field, and a Payload field.

The Type field of the IPV4-FEH-Shim Header is an 8-bit field that indicates the type of the IP-Shim header. As indicated above, the IP-Shim Protocol is defined as generic and, thus, may support multiple types. For transport of IPV4-FEHs, a IPV4-FEH type is defined (e.g., Type=1, or using any other suitable value). Herein, references to the IPV4-FEH-Shim Header will be understood to mean the IP-Shim Header having a type indicative that the IP-Shim Header is for IPV4-FEH (e.g., Type=1, or using any other suitable value).

The Length field of the IPV4-FEH-Shim Header is a 16-bit field that indicates the length of the Payload field of the IPV4-FEH-Shim Header in octets. It is noted that the octets of the Type field, the Length field, and the Next Header field of the IPV4-FEH-Shim Header are excluded.

The Next Header field of the IPV4-FEH-Shim Header is an 8-bit field that indicates the IP protocol type of the header next to the IPV4-FEH-Shim Header (e.g., TCP, UDP, ICMP, or the like).

The Payload field of the IPV4-FEH-Shim Header is a variable-length field that includes the payload in a type-specific format. The format of the Payload field of the IPV4-FEH-Shim Header is as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Segments Left     |     Flags     |    RESERVED           |
+-+-+-+-+-+-+-+-+-+-+-+-+-+-+-+-+-+-+-+-+-+-+-+-+-+-+-+-+-+-+-+-+
|                                                               |
+                       IPV4-FEH List[1]                        +
|                                                               |
+-+-+-+-+-+-+-+-+-+-+-+-+-+-+-+-+-+-+-+-+-+-+-+-+-+-+-+-+-+-+-+-+
   •                       •                           •
   •                       •                           •
   •                       •                           •
+-+-+-+-+-+-+-+-+-+-+-+-+-+-+-+-+-+-+-+-+-+-+-+-+-+-+-+-+-+-+-+-+
|                                                               |
+                       IPV4-FEH List[n]                        +
|                                                               |
+-+-+-+-+-+-+-+-+-+-+-+-+-+-+-+-+-+-+-+-+-+-+-+-+-+-+-+-+-+-+-+-+
```

The Payload field of the IPV4-FEH-Shim Header, as indicated above, includes a Segments Left field, a Flags field, a RESERVED field, and an IPV4-FEH List (from IPV4-FEH List[1] to IPV4-FEH List[n]).

The Segments Left field of the Payload field of the IPV4-FEH-Shim Header is a 16-bit field that includes the index, in the IPV4-FEH List, of the next hop to inspect. The Segments Left value is decremented at each IPV4-FEH.

The Flags field of the Payload field of the IPV4-FEH-Shim Header is a 1-octet field that includes a set of one-bit flags configured to indicate various capabilities. The Flags field of the Payload field of the IPV4-FEH-Shim Header has the following format:

```
 0 1 2 3 4 5 6 7
+-+-+-+-+-+-+-+-+
|O|C|     U     |
+-+-+-+-+-+-+-+-+
```

The Flags field of the Payload field of the IPV4-FEH-Shim Header, as indicated above, includes an O Flag, a C Flag, and a U Flag. The O Flag is the operations and management (OAM) flag which is configured such that, if set (e.g., equal to "1"), then it indicates that this packet is an OAM packet. The C Flag is the Carry flag which is configured such that: (1) when not set (e.g., equal to "0"), this means that the IPV4-FEH-Shim Header is removed when Segments Left becomes 0 and (2) when set (e.g., equal to "1"), this means that IPV4-FEH-Shim Header is carried forward in the source routed packet. The U Flag is unused and for future use and, thus, should be unset on transmission and ignored on receipt.

The IPV4-FEH List is a list of n IPV4-FEHs (denoted as IPV4-FEH List[1] to IPV4-FEH List[n]). In the list, IPV4-FEH List[n] is the IPV4-FEH that represents n-th element in the IPV4-FEH list. The IPV4-FEH list is encoded starting from the last hop of the path (i.e., the first element of the IPV4-FEH List (IPV4-FEH List[1]) includes the last hop of the path while the last element of the IPV4-FEH List (IPV4-FEH List[n]) includes the first hop of the path). The index in the "Segments Left" field identifies the current hop. An IPV4-FEH is 8-octets in size and is defined as follows:

```
 0                   1                   2                   3
+-+-+-+-+-+-+-+-+-+-+-+-+-+-+-+-+-+-+-+-+-+-+-+-+-+-+-+-+-+-+-+-+

| Num Prot Hops |  Skip Count   |     Flags     |   RESERVED    |

+-+-+-+-+-+-+-+-+-+-+-+-+-+-+-+-+-+-+-+-+-+-+-+-+-+-+-+-+-+-+-+-+

|                        IPV4 Address                           |

+-+-+-+-+-+-+-+-+-+-+-+-+-+-+-+-+-+-+-+-+-+-+-+-+-+-+-+-+-+-+-+-+
```

The IPV4-FEH, as indicated above, includes a Number of Protection Hops (Num_Prot_Hops) field, a Skip Count field, a Flags field, a RESERVED field, and an IPv4 Address field.

The Number of Protection Hops field of the IPV4-FEH is a 1-octet field that indicates the number of subsequent IPV4-FEHs that are protecting this IPV4-FEH. If the value of the Number of Protection Hops field is set to a value P, then it means that the P subsequent IPV4-FEHs immediately following that IPV4-FEH constitute the protection path of that IPV4-FEH. If the value of the Number of Protection Hops field is set to 0, then it means that there is no protection path for that IPV4-FEH. Additionally, if the IPV4-FEH belongs to a protection path then the value of the Number of Protection Hops field will be set to 0 (since the protection path itself is not protected).

The Skip Count field of the IPV4-FEH is a 1-octet field that indicates the number of subsequent IPV4-FEHs to be skipped after processing this IPV4-FEH. This is set to 0 for all IPV4-FEHs, except for the IPV4-FEH which is the last IPV4-FEH in a protection path.

The Flags field of the IPV4-FEH is a 1-octet field that includes a set of one-bit flags configured to indicate various capabilities. The Flags field of the IPV4-FEH has the following format:

```
 0 1 2 3 4 5 6 7
+-+-+-+-+-+-+-+-+
|R|P|    U      |
+-+-+-+-+-+-+-+-+
```

The Flags field of the IPV4-FEH, as indicated above, includes an R Flag, a P Flag, and a U Flag. The R Flag is a Recorded Route bit that indicates that this IPV4-FEH has been traversed by the source routed packet (and is set to 0 by the originator of this IPV4-FEH). The P Flag is a protected flag that indicates that this hop is part of a protection path. The U Flag is unused and for future use and, thus, unset on transmission and ignored on receipt.

The RESERVED field of the IPV4-FEH is unused and is reserved for future use. This should be unset on transmission and ignored on receipt.

The IPv4 Address field of the IPV4-FEH includes the 32-bit IPV4 address representing a hop in the primary path or the protection path and should not be a multicast address.

It is noted that the encoding and processing rules may be same for FEH-LSR and FEH-SSR; however, for purposes of clarity, various example embodiments for supporting flow-specific fast rerouting of source routed packets for flow-specific FRR in IPv4-based source routing are primarily presented herein in terms of FEH-SSR.

Various example embodiments for supporting flow-specific fast rerouting of source routed packets for flow-specific FRR in IPv4-based source routing are configured to support insertion of an IPV4-FEH-Shim Header between the IPv4 Header and the upper layer(s) by the head-end router.

The head-end router may be configured to perform the following operations while inserting an IPV4-FEH-Shim Header between the IPv4 Header and the upper layer(s).

The DA in IPv4 Header is set with the IPV4 address of the first primary hop in the explicit path. The original DA in IPv4 Header is preserved in IPV4-FEH[1] (as discussed further below).

The Type field in the IPV4-FEH-Shim Header is set to 1.

The Length field in the IPV4-FEH-Shim Header is set to the total number of octets in the Segments Left, Flags, RESERVED, and IPV4-FEH-List fields of the IPV4-FEH-Shim Header.

The Next Header field in the IPV4-FEH-Shim Header is set to the value in Protocol field in the IPv4 Header. The Protocol field in the IPv4 Header is set to a value (e.g., 145, or another suitable value) that indicates that the IP-Shim Protocol as the upper layer protocol (from the perspective of the IP layer).

The Segments Left field in the Payload field of the IPV4-FEH-Shim Header is set to n, where n is the number of elements in the IPV4-FEH List.

The C Flag in Flags field in the Payload field of the IPV4-FEH-Shim Header is set to a value (e.g., 0) that indicates that the last hop in the explicit hop is to remove the IPV4-FEH-Shim Header prior to further forwarding of the source routed packet.

The IPV4-FEH List in the Payload field of the IPV4-FEH-Shim Header is encoded in the reverse order of the path. Let n be the number of IPV4-FEH entries. The IPV4-FEH[1] is the last hop in primary path (the final DA of the source routed packet) and the IPV4-FEH[n] is the first hop. The entries in the list are ordered in units of sub-groups, where each subgroup contains an IPV4-FEH for a primary-hop followed by a list of IPV4-FEH entries for its protection path. This is further explained as follows.

When encoding the IPV4-FEH List, if IPV4-FEH List[x] is an unprotected primary hop, then IPV4-FEH List[x] is encoded with Num_Protection_Hops=0, Skip_Count=0, and Flags=0 to indicate that no protection path follows after this entry and, thus, that IPV4-FEH List[x−1] is the subsequent primary hop.

When encoding the IPV4-FEH List, if IPV4-FEH List[x] is a protected primary hop, then the hops of the protection path also are encoded. Let p be the quantity of hops in the protection path. IPV4-FEH List[x] is encoded with Num_Protection_Hops=p, Skip_Count=0, and Flags=0, which means that IPV4-FEH List[x−1] to IPV4-FEH List[x−p−1] is composed of the hops in the protection path. Subsequent primary hops start at IPV4-FEH List[x−p−2]. Each of the entries in IPV4-FEH List[x−1] through IPV4-FEH List[x−p−1] is encoded with Num_Protection_Hops=0, because hops in the protection path are not protected. The P Flag is set to 1. Each of the entries in IPV4-FEH List[x−1] through IPV4-FEH List[x−p] is encoded with Skip_Count=0. The last entry in the protection path (IPV4-FEH List[x−p−1]) is encoded with Skip_Count=C, where C is the number of subsequent primary hops to be skipped (i.e., from IPV4-FEH List[x−p−2] through IPV4-FEH List[x−p−c−1]) if the source routed packet is being forwarded on a node protection path.

It is noted that this encoding rule is iterated over each sub-group of the IPV4-FEH List.

The head-end router then sends the source routed packet toward the DA indicated in the source routed packet.

The insertion of an IPV4-FEH-Shim Header between the IPv4 Header and the upper layer(s) by the head-end router may be further understood by way of reference to the following example. For example, consider the path for flow A in FIG. 9, as follows: E(A)={IP-12, [IP-24, P (A, R4), 1], IP-47, IP-79} where P (A, R4) is the protection path={IP-23, IP-35, IP-57}. In this example, the path is encoded on a packet from source S to destination D as follows (here, the upper layer is TCP and, thus, the Protocol field in IPv4 Header before encoding the path was 6):

IPv4 Header
  SA=S
  DA=IP-12
  Protocol=145
  IP-Shim Header

Type: 1, Length=64, Next Header=6, Segments Left=7, C=0
IPV4-FEH List[1]=Num_Protection_Hops=0, Skip_Count=0, R=0, P=0, D
IPV4-FEH List[2]=Num_Protection_Hops=0, Skip_Count=0, R=0, P=0, IP-79
IPV4-FEH List[3]=Num_Protection_Hops=0, Skip_Count=0, R=0, P=0, IP-47
IPV4-FEH List[4]=Num_Protection_Hops=0, Skip_Count=1, R=0, P=1, IP-57
IPV4-FEH List[5]=Num_Protection_Hops=0, Skip_Count=0, R=0, P=1, IP-35
IPV4-FEH List[6]=Num_Protection_Hops=0, Skip_Count=0, R=0, P=1, IP-23
IPV4-FEH List[7]=Num_Protection_Hops=3, Skip_Count=0, R=0, P=0, IP-24

In the example above, it is noted that the total size (Length=64) is based on a combination of the size of the common part of the IPV4-FEH-Shim-Header that includes the Type, Length, and Next-Header fields (4 bytes), the size of the fixed part of IPV4-FEH-Shim Header that includes the Segments Left, Flags, and RESERVED fields (4 bytes), and the size of the set of IPV4-FEHs (7×8 bytes per IPV4-FEH=56 bytes).

In the example above, it is noted that the IP-Shim Header is inserted between IPv4 Header and TCP Header. As a result, Protocol in the IPv4 Header becomes 145 (=IP-Shim Protocol) and the Next-Header in IPV4-FEH-Shim Header becomes 6(=TCP).

Various example embodiments for supporting flow-specific fast rerouting of source routed packets for flow-specific FRR in IPv4-based source routing are configured to support processing of the IPV4-FEH-Shim Header of the IPv4 Header by the transit router.

The transit router may be configured to perform the following operations while processing the IPV4-FEH-Shim Header of the IPv4 Header.

It is noted that, as stipulated in the IP-Shim Layer definition, the node that is supposed to inspect the IPV4-FEH-Shim Header is the node corresponding to DA of the source routed packet (or if the Router Alert Option is set in the IPv4 Header as defined in RFC 2113); however, since the IPV4-FEH-Shim Header is not sent with Router Alert Option, the node that is allowed to inspect IPV4-FEH-Shim Header will be the node corresponding to DA of the source routed packet. The other transit nodes should not inspect the IPV4-FEH-Shim Header and should forward the source routed packet toward the DA according to the IPV4 Routing Table.

The transit router corresponding to the DA, upon receiving the IPV4-FEH-Shim Header of the IPv4 Header, may process the IPV4-FEH-Shim Header of the IPv4 Header as follows.

If Segments Left=0, the next layer in the source routed packet, whose type is identified by the Next Header field in the IPV4-FEH-Shim Header, is processed.

If Segments Left≠0, then i is set equal to the index of the next IPV4-FEH to be visited in the IPV4-FEH list (=Segments Left). The Segments Left value is decremented by 1. From this point on, the Segments Left value points to IPV4-FEH[i−1]. The IPV4-FEH[i] is processed as discussed further below.

If the address of IPV4-FEH[i] is a multicast address, then the source routed packet is discarded.

If the address of IPV4-FEH[i] is a not multicast address, then IPV4-FEH[i] is further processed based on the TTL in the IPv4 Header as follows.

If the TTL in the IPv4 Header is less than or equal to 1, the following actions are performed. The IPv4 DA and the IPv4 address of IPV4-FEH[i] are swapped. The R Flag in IPV4-FEH[i] is set equal to 1 to indicate that it has been traversed by the source routed packet. If the C Flag in the IPV4-FEH-Shim Header=0, then swap the IPv4 DA and the IPv4 address of IPV4-FEH[1], restore the Protocol Field in the IPv4 Header from the Next Header field in the IPV4-FEH-Shim Header, and remove the IPV4-FEH-Shim Header. An ICMP Time Exceeded-TTL Exceeded in Transit message is sent to the SA and the source routed packet is discarded.

If the TTL in the IPv4 Header is not less than or equal to 1, then IPV4-FEH[i] is further processed by checking the reachability of the address of IPV4-FEH[i].

If the address of IPV4-FEH[i] is reachable, swap the IPv4 DA and the IPv4 address of IPV4-FEH[i] and set the R Flag in IPV4-FEH[i]=1 to indicate that this hop has been traversed by the source routed packet. The following processing is performed: (1) if Num_Protection_Hops in IPV4-FEH[i]>0, decrement Segments Left by Num_Protection_Hops in IPV4-FEH[i] (this means that the hops in protection path have been skipped, since the source routed packet is not being forwarded along the protection path) or (2) if Skip_Count in IPV4-FEH[i]>0, decrement Segments Left by Skip_Count in IPV4-FEH[i] (this means that the hops in the primary path have been skipped, i.e., bypassed by the protection path). If Segments Left=0 and the C Flag in the IPV4-FEH-Shim Header=0, restore the Protocol field in the IPv4 Header from the Next Header field in the IPV4-FEH-Shim Header and remove the IPV4-FEH-Shim Header. The source routed packet is then resubmitted to the IPv4 module for transmission to the new destination.

If the address of IPV4-FEH[i] is not reachable and if the Num_Protection_Hops in IPV4-FEH[i]=0 (this means that the hop is neither operational nor protected and, thus, that the source routed packet is to be dropped), the IPV4 DA address and the address of IPV4-FEH[i] are swapped and the R flag in IPV4-FEH[i] is set equal to 1 to indicate that this hop has been traversed by the source routed packet. If the C-Flag in the IPV4-FEH-Shim Header=0, restore the Protocol field in the IPv4 Header from the Next Header field in the IPV4-FEH-Shim Header and remove the IPV4-FEH-Shim Header. An ICMP Unreachable message is sent to the SA and the source routed packet is discarded.

If the address of IPV4-FEH[i] is not reachable and if Num_Prot_Hops in IPV4-FEH[i] !=0 (this means that the hop is unreachable, but is protected, so the source routed packet is to be fast-rerouted via the protection path), then the Segments Left value is decremented by 1 (such that it now points to IPV4-FEH[i−2]), the IPV4 DA address and the address of IPV4-FEH[i] (i.e., the first entry in the protection path) are swapped, and the R flag in IPV4-FEH[i] is set equal to 1 to indicate that this hop has been traversed by the source routed packet. If Segments Left=0 and the C-Flag in the IPV4-FEH-Shim Header=0, restore the Protocol field in the IPv4 Header from the Next Header field in the IPV4-FEH-Shim Header and remove the IPV4-FEH-Shim Header. The source routed packet is then resubmitted to the IPv4 module for transmission to the new destination.

Various example embodiments for supporting flow-specific fast rerouting of source routed packets for flow-specific FRR in IPv4-based source routing, based on use of an IP-Shim layer, may be further understood by considering an example in which source router R1 sends a packet from source S to destination D with explicit path E(A). Here, the upper layer is TCP and, thus, the Protocol field in the IPv4 Header before encoding the path was 6.

When R2→R4 is operational, the source routed packet travels along the path R1→R2, R2→R4, R4→R, R7→R9, R9→D, each of which is discussed below.

As the source routed packet travels from R1 to R2, the IPv4 Header and the IPv4-Shim Header elements may be encoded as follows:
IPv4 Header
Source Address=S
Destination Address=IP-12
Protocol=145
IPV4-FEH-Shim Header
Type: 1, Length=64, Next Header=6, Segments Left=7, C=0
IPV4-FEH List[1]=Num_Protection_Hops=0, Skip_Count=0, R=0, P=0, D
IPV4-FEH List[2]=Num_Protection_Hops=0, Skip_Count=0, R=0, P=0, IP-79
IPV4-FEH List[3]=Num_Protection_Hops=0, Skip_Count=0, R=0, P=0, IP-47
IPV4-FEH List[4]=Num_Protection_Hops=0, Skip_Count=1, R=0, P=1, IP-57
IPV4-FEH List[5]=Num_Protection_Hops=0, Skip_Count=0, R=0, P=1, IP-35
IPV4-FEH List[6]=Num_Protection_Hops=0, Skip_Count=0, R=0, P=1, IP-23
IPV4-FEH List[7]=Num_Protection_Hops=3, Skip_Count=0, R=0, P=0, IP-24

As indicated above, the source routed packet arrived in R2 with Segments Left=7. So, R2 processed IPV4-FEH List[7], which is a reachable next-hop. R2 swapped DA (IP-12) with the address in IPV4-FEH List[7] and marked it as part of the recorded-route (R=1). The IPV4-FEH List[7] has 3 protection hops, so IPV4-FEH List[6 . . . 4] need to be skipped, as the source routed packet is not traversing the protection path. So, Segments Left is set to 3 (=7-1-3).

As the source routed packet travels from R2 to R4, the IPv4 Header and the IPV4-FEH-Shim Header elements may be encoded as follows (updated fields highlighted with underlining):
IPv4 Header
Source Address=S
Destination Address=IP-24
Protocol=145
IPV4-FEH-Shim Header
Type: 1, Length=64, Next Header=6, Segments Left=3, C=0
IPV4-FEH List[1]=Num_Protection_Hops=0, Skip_Count=0, R=0, P=0, D
IPV4-FEH List[2]=Num_Protection_Hops=0, Skip_Count=0, R=0, P=0, IP-79
IPV4-FEH List[3]=Num_Protection_Hops=0, Skip_Count=0, R=0, P=0, IP-47
IPV4-FEH List[4]=Num_Protection_Hops=0, Skip_Count=1, R=0, P=1, IP-57
IPV4-FEH List[5]=Num_Protection_Hops=0, Skip_Count=0, R=0, P=1, IP-35
IPV4-FEH List[6]=Num_Protection_Hops=0, Skip_Count=0, R=0, P=1, IP-23
IPV4-FEH List[7]=Num_Protection_Hops=3, Skip_Count=0, R=1, P=0, IP-12

As the source routed packet travels from R4 to R7, the IPv4 Header and the IPV4-FEH-Shim Header elements may be encoded as follows (updated fields highlighted with underlining):
IPv4 Header
Source Address=S
Destination Address=IP-47
Protocol=145
IPV4-FEH-Shim Header
Type: 1, Length=64, Next Header=6, Segments Left=2, C=0
IPV4-FEH List[1]=Num_Protection_Hops=0, Skip_Count=0, R=0, P=0, D
IPV4-FEH List[2]=Num_Protection_Hops=0, Skip_Count=0, R=0, P=0, IP-79
IPV4-FEH List[3]=Num_Protection_Hops=0, Skip_Count=0, R=1, P=0, IP-24
IPV4-FEH List[4]=Num_Protection_Hops=0, Skip_Count=1, R=0, P=1, IP-57
IPV4-FEH List[5]=Num_Protection_Hops=0, Skip_Count=0, R=0, P=1, IP-35
IPV4-FEH List[6]=Num_Protection_Hops=0, Skip_Count=0, R=0, P=1, IP-23
IPV4-FEH List[7]=Num_Protection_Hops=3, Skip_Count=0, R=1, P=0, IP-12

As the source routed packet travels from R7 to R9, the IPv4 Header and the IPV4-FEH-Shim Header elements may be encoded as follows (updated fields highlighted with underlining):
IPv4 Header
Source Address=S
Destination Address=IP-79
Protocol=145
IPV4-FEH-Shim Header
Type: 1, Length=64, Next Header=6, Segments Left=1, C=0
IPV4-FEH List[1]=Num_Protection_Hops=0, Skip_Count=0, R=0, P=0, D
IPV4-FEH List[2]=Num_Protection_Hops=0, Skip_Count=0, R=1, P=0, IP-47
IPV4-FEH List[3]=Num_Protection_Hops=0, Skip_Count=0, R=1, P=0, IP-24
IPV4-FEH List[4]=Num_Protection_Hops=0, Skip_Count=1, R=0, P=1, IP-57
IPV4-FEH List[5]=Num_Protection_Hops=0, Skip_Count=0, R=0, P=1, IP-35
IPV4-FEH List[6]=Num_Protection_Hops=0, Skip_Count=0, R=0, P=1, IP-23
IPV4-FEH List[7]=Num_Protection_Hops=3, Skip_Count=0, R=1, P=0, IP-12

As the source routed packet travels from R9 to D, the IPv4 Header and the IPV4-FEH-Shim Header elements may be encoded as follows (updated fields highlighted with underlining):
IPv4 Header
Source Address=S
Destination Address=D
Protocol=145
IPV4-FEH-Shim Header
Type: 1, Length=64, Next Header=6, Segments Left=0, C=0
IPV4-FEH List[1]=Num_Protection_Hops=0, Skip_Count=0, R=1, P=0, IP-79
IPV4-FEH List[2]=Num_Protection_Hops=0, Skip_Count=0, R=1, P=0, IP-47
IPV4-FEH List[3]=Num_Protection_Hops=0, Skip_Count=0, R=1, P=0, IP-24
IPV4-FEH List[4]=Num_Protection_Hops=0, Skip_Count=1, R=0, P=1, IP-57
IPV4-FEH List[5]=Num_Protection_Hops=0, Skip_Count=0, R=0, P=1, IP-35

IPV4-FEH List[6]=Num_Protection_Hops=0, Skip_Count=0, R=0, P=1, IP-23
IPV4-FEH List[7]=Num_Protection_Hops=3, Skip_Count=0, R=1, P=0, IP-12

It may be seen that, when the source routed packet leaves R9 towards D, the R Flag gets set to 1 on the IPV4-FEH entries that have been traversed by the source routed packet. That subset of IPV4-FEH entries is the recorded-route list.

When the R2→R4 link has failed or the R4 node as failed, the source routed packet travels along the path R1→R2, R2→R3, R3→R5, R5→R7, R7→R9, R9→D, each of which is discussed below.

As the source routed packet travels from R1 to R2, the IPv4 Header and the IPV4-FEH-Shim Header elements may be encoded as follows:
IPv4 Header
Source Address=S
Destination Address=IP-12
Protocol=145
IPV4-FEH-Shim Header
Type: 1, Length=64, Next Header=6, Segments Left=7, C=0
IPV4-FEH List[1]=Num_Protection_Hops=0, Skip_Count=0, R=0, P=0, D
IPV4-FEH List[2]=Num_Protection_Hops=0, Skip_Count=0, R=0, P=0, IP-79
IPV4-FEH List[3]=Num_Protection_Hops=0, Skip_Count=0, R=0, P=0, IP-47
IPV4-FEH List[4]=Num_Protection_Hops=0, Skip_Count=1, R=0, P=1, IP-57
IPV4-FEH List[5]=Num_Protection_Hops=0, Skip_Count=0, R=0, P=1, IP-35
IPV4-FEH List[6]=Num_Protection_Hops=0, Skip_Count=0, R=0, P=1, IP-23
IPV4-FEH List[7]=Num_Protection_Hops=3, Skip_Count=0, R=0, P=0, IP-24

As indicated above, the source routed packet arrived in R2 with Segments Left=7. So, R2 processed IPV4-FEH List[7], but it is not reachable. Since IPV4-FEH List[7] has a protection path (i.e., the 3 subsequent hops IPV4-FEH List[4 . . . 6]), the source routed packet is forwarded along the protection path. The DA (=IP-12) is swapped with first hop in the protection path, i.e., IPV4-FEH List[6]. The DA is traversed, so recorded-route is set (R=1). Segments Left points to IPV4-FEH List[5].

As the source routed packet travels from R2 to R3, the IPv4 Header and the IPV4-FEH-Shim Header elements may be encoded as follows (updated fields highlighted with underlining):
IPv4 Header
Source Address=S
Destination Address=IP-23
Protocol=145
IPV4-FEH-Shim Header
Type: 1, Length=64, Next Header=6, Segments Left=5, C=0
IPV4-FEH List[1]=Num_Protection_Hops=0, Skip_Count=0, R=0, P=0, D
IPV4-FEH List[2]=Num_Protection_Hops=0, Skip_Count=0, R=0, P=0, IP-79
IPV4-FEH List[3]=Num_Protection_Hops=0, Skip_Count=0, R=0, P=0, IP-47
IPV4-FEH List[4]=Num_Protection_Hops=0, Skip_Count=1, R=0, P=1, IP-57
IPV4-FEH List[5]=Num_Protection_Hops=0, Skip_Count=0, R=0, P=1, IP-35
IPV4-FEH List[6]=Num_Protection_Hops=0, Skip_Count=0, R=1, P=1, IP-12
IPV4-FEH List[7]=Num_Protection_Hops=3, Skip_Count=0, R=0, P=0, IP-24

As the source routed packet travels from R3 to R5, the IPv4 Header and the IPV4-FEH-Shim Header elements may be encoded as follows (updated fields highlighted with underlining):
IPv4 Header
Source Address=S
Destination Address=IP-35
Protocol=145
IPV4-FEH-Shim Header
Type: 1, Length=64, Next Header=6, Segments Left=4, C=0
IPV4-FEH List[1]=Num_Protection_Hops=0, Skip_Count=0, R=0, P=0, D
IPV4-FEH List[2]=Num_Protection_Hops=0, Skip_Count=0, R=0, P=0, IP-79
IPV4-FEH List[3]=Num_Protection_Hops=0, Skip_Count=0, R=0, P=0, IP-47
IPV4-FEH List[4]=Num_Protection_Hops=0, Skip_Count=1, R=0, P=1, IP-57
IPV4-FEH List[5]=Num_Protection_Hops=0, Skip_Count=0, R=1, P=1, IP-23
IPV4-FEH List[6]=Num_Protection_Hops=0, Skip_Count=0, R=1, P=1, IP-12
IPV4-FEH List[7]=Num_Protection_Hops=3, Skip_Count=0, R=0, P=0, IP-24

As indicated above, the source routed packet arrived in R5 with Segments Left=4, so R5 processes IPV4-FEH List[4]. It has a Skip Count=1, so IPV4-FEH List[5] needs to be skipped. The non-zero Skip Count means that this protection path offered node protection and IPV4-FEH List[5] (which is a hop in primary path) has been bypassed.

As the source routed packet travels from R5 to R7, the IPv4 Header and the IPV4-FEH-Shim Header elements may be encoded as follows (updated fields highlighted with underlining):
IPv4 Header
Source Address=S
Destination Address=IP-57
Protocol=145
IPV4-FEH-Shim Header
Type: 1, Length=64, Next Header=6, Segments Left=2, Flags=0,
IPV4-FEH List[1]=Num_Protection_Hops=0, Skip_Count=0, R=0, P=0, D
IPV4-FEH List[2]=Num_Protection_Hops=0, Skip_Count=0, R=0, P=0, IP-79
IPV4-FEH List[3]=Num_Protection_Hops=0, Skip_Count=0, R=0, P=0, IP-47
IPV4-FEH List[4]=Num_Protection_Hops=0, Skip_Count=1, R=1, P=1, IP-35
IPV4-FEH List[5]=Num_Protection_Hops=0, Skip_Count=0, R=1, P=1, IP-23
IPV4-FEH List[6]=Num_Protection_Hops=0, Skip_Count=0, R=1, P=1, IP-12
IPV4-FEH List[7]=Num_Protection_Hops=3, Skip_Count=0, R=0, P=0, IP-24

As the source routed packet travels from R7 to R9, the IPV4 Header and the IPV4-FEH-Shim Header elements may be encoded as follows (updated fields highlighted with underlining):

IPv4 Header
Source Address=S
Destination Address=IP-79
Protocol=145
IPV4-FEH-Shim Header
Type: 1, Length=64, Next Header=6, Segments Left=1, C=0
   IPV4-FEH    List[1]=Num_Protection_Hops=0, Skip_Count=0, R=0, P=0, D
   IPV4-FEH    List[2]=Num_Protection_Hops=0, Skip_Count=0, R=1, P=0, IP-57
   IPV4-FEH    List[3]=Num_Protection_Hops=0, Skip_Count=0, R=0, P=0, IP-47
   IPV4-FEH    List[4]=Num_Protection_Hops=0, Skip_Count=1, R=1, P=1, IP-35
   IPV4-FEH    List[5]=Num_Protection_Hops=0, Skip_Count=0, R=1, P=1, IP-23
   IPV4-FEH    List[6]=Num_Protection_Hops=0, Skip_Count=0, R=1, P=1, IP-12
   IPV4-FEH    List[7]=Num_Protection_Hops=3, Skip_Count=0, R=0, P=0, IP-24

As the source routed packet travels from R9 to D, the IPv4 Header and the IPV4-FEH-Shim Header elements may be encoded as follows (updated fields highlighted with underlining):
IPv4 Header
Source Address=S
Destination Address=D
Protocol=145
IPV4-FEH-Shim Header
Type: 1, Length=64, Next Header=6, Segments Left=0, C=0
   IPV4-FEH    List[1]=Num_Protection_Hops=0, Skip_Count=0, R=0, P=0, IP-79
   IPV4-FEH    List[2]=Num_Protection_Hops=0, Skip_Count=0, R=1, P=0, IP-57
   IPV4-FEH    List[3]=Num_Protection_Hops=0, Skip_Count=0, R=0, P=0, IP-47
   IPV4-FEH    List[4]=Num_Protection_Hops=0, Skip_Count=1, R=1, P=1, IP-35
   IPV4-FEH    List[5]=Num_Protection_Hops=0, Skip_Count=0, R=1, P=1, IP-23
   IPV4-FEH    List[6]=Num_Protection_Hops=0, Skip_Count=0, R=1, P=1, IP-12
   IPV4-FEH    List[7]=Num_Protection_Hops=3, Skip_Count=0, R=0, P=0, IP-24

As indicated above, when the source routed packet leaves R9 towards D, the R flag gets set to 1 on the IPV4-FEH entries that have been traversed by the source routed packet (not on the IPV4-FEH entries that have not been traversed by the source routed packet).

It is noted that, since R1 sets the C flag to 0 while inserting the IPV4-FEH-Shim Header, the egress router of the source routing domain (namely, R9) is to remove the IPV4-FEH-Shim Header before forwarding the source routed packet to D. Additionally, before removing the IPV4-FEH-Shim Header, R9 restores the Protocol field in IPv4 Header from the Next Header field in IPV4-FEH-Shim Header.

Various example embodiments for supporting flow-specific fast rerouting of source routed packets for IPv4-based source routing, as indicated above, may be configured to support encoding of the IPV4-FEH using an IP-Shim Layer in various other ways.

Various example embodiments for supporting flow-specific fast rerouting of source routed packets for IPv4-based source routing may be configured to support distribution of the IPV4-FEH forwarding capability of routers. As discussed further below, this may be performed using IS-IS, OSPF, BGP-LS, or any other suitable protocol.

In an IPv4 Source Routing domain, it is possible that some of the routers do not support (or have not implemented) IPV4-FEH based explicit path routing procedures defined herein. When the PCE computes an IPV4-FEH based explicit path, it needs to exclude the non-supporting routers from the path. When CSPF is used for computation of an explicit path, the IPV4-FEH capability can be imposed as an additional constraint into CSPF. Thus, IPV4-FEH processing capability of the routers needs to be available in the TEDB for use by the CSPF when computing explicit paths. When the TEDB is dynamically learned by participating in a routing protocol that floods TE/topology information from routers, then IPv4-FEH capabilities need to be also distributed by that protocol. A description of mechanisms for supporting exchange of IPV4-FEH capability information in various routing protocols (e.g., IS-IS, OSPF, and BGP-LS) follows.

Various example embodiments for supporting flow-specific fast rerouting of source routed packets for IPv4-based source routing may be configured to support distribution of the IPV4-FEH forwarding capability of routers using IS-IS.

A generic Router Capability TLV in IS-IS is defined in RFC 7981. The generic Router Capability TLV can carry any number of router specific capabilities, as optional sub-TLVs. The format of the Router Capability TLV follows:

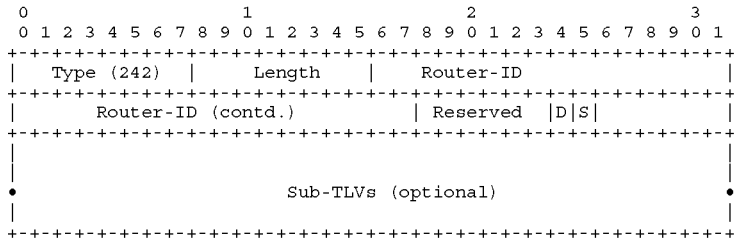

The Router Capability TLV, as indicated above, includes a Type field, a Length field, and a Value field, followed by one or more Sub-TLVs. The Type field is a 1-octet field indicative of the type of the Router Capability TLV (a value of 242 is indicated, however, it will be appreciated that any suitable value may be used). The Length field is a 1-octet field that specifies the number of bytes in the Value field. The Value field, as indicated above, is a variable length field that starts with 4 octets of Router ID, indicating the source of the Router Capability TLV, followed by 1 octet of flags. The flags, which include a D-Flag and an S-Flag, control the scope of advertisement of the Router Capability TLV. The S-Bit (0x01) may control the scope of advertisement of the Router Capability TLV as follows: (1) if the S bit is set (e.g., equal to "1"), the Router Capability TLV is flooded across the entire routing domain and (2) if the S bit is not set (e.g., equal to 0), the Router Capability TLV is leaked between levels (although it is noted that this bit should not be altered during the TLV leaking). The D-Bit (0x02) may control the scope of advertisement of the Router Capability TLV as follows: (1) when the Router Capability TLV is leaked from Level 2 (L2) to Level 1 (L1), the D bit is to be set (e.g., equal to "1"), otherwise the bit is cleared and (2) Router Capability TLVs with the D bit are not to be leaked from Level 1 to Level 2 (to prevent TLV looping). The sub-TLVs, as indicated above, may follow the Flag field.

Various example embodiments for supporting flow-specific fast rerouting for IPv4-based source routing may be configured to support distribution of the IPV4-FEH forwarding capability of routers using an IP-SR-Capabilities Sub-TLV to be carried within the Router Capability TLV. The IP-SR-Capabilities Sub-TLV is generic and is defined to carry any capability related to IP-SR. The IP-SR Capabilities Sub-TLV is propagated throughout the level and is not advertised across level boundaries and, thus, the Router Capability TLV distribution flags should be set accordingly (i.e., the S flag in the Router Capability TLV is unset). It is noted that, if the IP-SR-Capability Sub-TLV is not advertised by the node, such node is considered as not being capable of IPV4-FEH based source routing. The IP-SR Capabilities Sub-TLV has following format:

As noted above, various example embodiments for supporting flow-specific fast rerouting of source routed packets are configured to support distribution of the IPV4-FEH forwarding capability of routers. The IPV4-FEH forwarding capability of routers may be advertised using flags of the IP-SR Capabilities Sub-TLV. The IPV4-FEH forwarding capability of routers may be advertised using flags of the IP-SR Capabilities Sub-TLV as follows.

In the case of use of IPv4 Header Options for transporting the IPV4-FEH, IPV4-FEH forwarding capability may be advertised using the I Flag. The I Flag is the "IPV4-FEH as IPv4 Header Options" flag, which is configured such that, if set (e.g., equal to "1"), then the router is capable of processing IPV4-FEH encoded source routed packets on all interfaces, where IPV4-FEH is encoded as IPv4 Header Options.

In the case of use of IP-Shim Headers for transporting the IPV4-FEH, IPV4-FEH forwarding capability may be advertised using the V-Flag. The V-Flag is the "IPV4-FEH as IP-Shim Protocol" flag, which is configured such that, if set (e.g., equal to "1"), then the router is capable of processing IPV4-FEH encoded source routed packets on all interfaces, where IPV4-FEH is encoded as IP-Shim Protocol.

It is noted that the IP-SR-Capabilities Sub-TLV may be advertised in a Link State Packet (LSP) (in IS-IS terminology, the LSA is called LSP) of any number, but a router should not advertise more than one IP-SR-Capabilities Sub-TLV. A router receiving multiple IP-SR-Capabilities Sub-

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |     Flags     |
+-+-+-+-+-+-+-+-+-+-+-+-+-+-+-+-+-+-+-+-+-+-+-+-+
```

The IP-SR Capabilities Sub-TLV, as indicated above, includes a Type field, a Length field, and a Flags field. The value of the Type field has yet to be determined (e.g., a value of 3, which may be allocated from the IANA registry, is suggested; however, it will be appreciated that other suitable value may be used). The value of the Length field is set equal to 1. The 1-octet Flags field includes a set of one-bit flags configured to indicate various capabilities. The Flags field of the IP-SR Capabilities Sb-TLV has the following format:

```
 0 1 2 3 4 5 6 7
+-+-+-+-+-+-+-+-+
|I|V|           |
+-+-+-+-+-+-+-+-+
```

TLVs, from the same originator, is expected to select the first advertisement in the lowest numbered LSP.

Various example embodiments for supporting flow-specific fast rerouting of source routed packets for IPv4-based source routing may be configured to support distribution of the IPV4-FEH forwarding capability of routers using IS-IS in various other ways.

Various example embodiments for supporting flow-specific fast rerouting of source routed packets for IPv4-based source routing may be configured to support distribution of the IPV4-FEH forwarding capability of routers using OSPF.

The data plane capabilities of an OSPF router are advertised using the OSPF Router Informational Capabilities TLV defined in Section 2.3 of RFC 4970. The format of the OSPF Router Informational Capabilities TLV follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |             Length            |
+-+-+-+-+-+-+-+-+-+-+-+-+-+-+-+-+-+-+-+-+-+-+-+-+-+-+-+-+-+-+-+-+
|                     Informational Capabilities                |
+-+-+-+-+-+-+-+-+-+-+-+-+-+-+-+-+-+-+-+-+-+-+-+-+-+-+-+-+-+-+-+-+
```

The IP-SR Capabilities Sub-TLV, as noted above, includes a 1-octet Flags field. The 1-octet Flags field, as noted above, includes a set of one-bit flags configured to indicate various capabilities.

As noted above, various example embodiments for supporting flow-specific fast rerouting of source routed packets are configured to support distribution of the IPV4-FEH forwarding capability of routers using OSPF. The IPV4-FEH forwarding capability of routers may be advertised using new bits in the OSPF Router Informational Capability TLV as follows.

In the case of use of IPv4 Header Options for transporting the IPV4-FEH, IPV4-FEH forwarding capability may be advertised using Bit-10 (it will be appreciated that other values may be used) in the OSPF Router Informational Capability TLV. Bit-10 is the "IPV4-FEH as IPv4 Header Options" flag, which is configured such that, if set (e.g., using a value of "1"), this indicates that the router is capable of processing IPV4-FEH encoded source routed packets on all interfaces, where IPV4-FEH is encoded as IPv4 Header Options.

In the case of use of IP-Shim Headers for transporting the IPV4-FEH, IPV4-FEH forwarding capability may be advertised using Bit-11 (it will be appreciated that other values may be used) in the OSPF Router Informational Capability TLV. Bit-11 is the "IPV4-FEH as IP-Shim Protocol" flag, which is configured such that, if set (e.g., using a value of "1"), this indicates that the router is capable of processing IPV4-FEH encoded source routed packets on all interfaces, where IPV4-FEH is encoded as IP-Shim Protocol.

It is noted that, for the IPV4-FEH forwarding capabilities propagation, area scope flooding is required.

Various example embodiments for supporting flow-specific fast rerouting of source routed packets for IPv4-based source routing may be configured to support distribution of the IPV4-FEH forwarding capability of routers using OSPF in various other ways.

Various example embodiments for supporting flow-specific fast rerouting of source routed packets for IPv4-based source routing may be configured to support distribution of the IPV4-FEH forwarding capability of routers using BGP-LS.

The flooding scope for IGP-based methods of SR is IGP area-wide. As a result, the contents of an LSDB or a TEDB have the scope of an IGP area and, therefore, by using the IGP alone, it may not be enough to construct segments across multiple IGP areas or AS boundaries.

In order to address the need for applications that require topological visibility across IGP areas, or even across ASs, the BGP-LS address-family/sub-address-family have been defined to allow BGP to carry link state information. The BGP Network Layer Reachability Information (NLRI) encoding format for BGP-LS, and a new BGP Path Attribute called the BGP-LS attribute, are defined in RFC 7752. The BGP-LS specifications for SR are described in the "BGP Link-State extensions for Segment Routing" draft (also denoted as SR-BGP-LS-DRAFT).

Various example embodiments for supporting flow-specific fast rerouting of source routed packets are configured to support use of a new IP-SR-Capabilities TLV to distribute the IPV4-FEH forwarding capability of routers. The IP-SR-Capabilities TLV may be used to distribute IPV4-FEH forwarding capability of routers received via IS-IS (e.g., in the IP-SR-Capabilities TLV discussed above with respect to use of IS-IS to distribute the IPV4-FEH forwarding capability of routers) and to distribute IPV4-FEH forwarding capability of routers received via OSPF (e.g., in the OSPF Router Informational Capabilities TLV discussed above with respect to use of OSPF to distribute the IPV4-FEH forwarding capability of routers). The IP-SR Capabilities TLV for BGP-LS has following format:

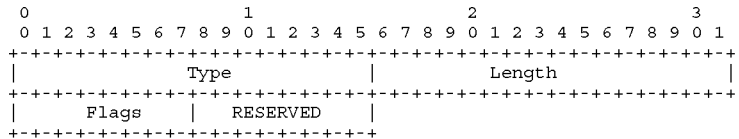

The IP-SR Capabilities TLV, as indicated above, includes a Type field, a Length field, a Flags field, and a RESERVED field. The value of the Type field has yet to be determined (e.g., a value of 1073, which may be allocated from the IANA registry, is suggested; however, it will be appreciated that other suitable value may be used). The value of the Length field is fixed to 2, which indicates total length of the Flags field and RESERVED field. The 1-octet Flags field includes a set of one-bit flags configured to indicate various capabilities. The flags of the Flags field have the following format and are defined as follows:

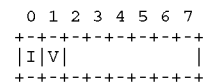

The IP-SR Capabilities TLV, as noted above, includes a 1-octet Flags field. The 1-octet Flags field, as noted above, includes a set of one-bit flags configured to indicate various capabilities.

As noted above, various example embodiments for supporting flow-specific fast rerouting of source routed packets are configured to support distribution of the IPV4-FEH forwarding capability of routers. The IPV4-FEH forwarding capability of routers may be advertised using flags of the IP-SR Capabilities TLV as follows.

In the case of use of IPv4 Header Options for transporting the IPV4-FEH, IPV4-FEH forwarding capability may be advertised using the I-Flag. The I-Flag is the "IPV4-FEH as IPv4 Header Options" flag, which is configured such that, if set (e.g., equal to "1"), then the router is capable of processing IPV4-FEH encoded source routed packets on all interfaces, where IPV4-FEH is encoded as IPv4 Header Options.

In the case of use of IP-Shim Headers for transporting the IPV4-FEH, IPV4-FEH forwarding capability may be advertised using the V-Flag. The V-Flag is the "IPV4-FEH as IP-Shim Protocol" flag, which is configured such that, if set (e.g., equal to "1"), then the router is capable of processing IPV4-FEH encoded source routed packets on all interfaces, where IPV4-FEH is encoded as IP-Shim Protocol.

Various example embodiments for supporting flow-specific fast rerouting of source routed packets may be configured to support flow-specific FRR of source routed packets in IPv6 source routing.

Various example embodiments for supporting flow-specific fast rerouting of source routed packets for flow-specific FRR in IPv6-based source routing are configured to enable the PLR to perform fast reroute along flow-specific protection paths (i.e., one-to-one protection) while maintaining a flow-agnostic approach at the PLR, obviate the need for a PLR to preprogram protection paths into the data plane (thereby reducing data plane complexity and states in the PLR and transit nodes), support both link and node protection for source routed packets, provide extensions to IPv6 source routing capabilities, or the like, as well as various combinations thereof.

Various example embodiments for supporting flow-specific fast rerouting of source routed packets for flow-specific FRR in IPv6-based source routing may be further understood by considering use of the flow-specific fast rerouting of source routed packets to provide node protection in IPv6 source routing (although it will be appreciated that the principles also may be applied for providing link protection in IPv4 source routing). This may be further understood by way of reference to the example network of FIG. 9, which illustrates the routers 111 of the communication network 110 of FIG. 1.

The PCE computes the explicit path that meets the QoS requirement or SLA of a flow. This path is denoted as E(<flow-id>). Once the path is allocated, PCE updates the dynamic TE state (e.g., residual bandwidth) of the network elements along that path into the TEDB, to reflect that TE resources have been reserved for the path. In FIG. 9, the paths for flow A and flow B are computed as follows:

For flow A: E(A)={R1→R2, R2→R4, R4→R7, R7→R9}.

For flow B: E(B)={R1→R2, R2→R4, R4→R6, R6→R8, R8→R9}.

For flow C: E(C)={R1→R2, R2→R4, R4→R7, R7→R8, R8→R9}.

The PCE also computes a protection path for each hop listed in E, such that a protection path also meets the QoS requirement or SLA of the flow. The protection path is denoted as P(<flow-id>, <protected-hop>). The PCE updates the dynamic TE state (e.g., residual bandwidth) of the network elements along the protection path into the TEDB. For example, to protect against failure of node R4, P is computed as follows:

For flow A: P (A, R4)={R2→R3, R3→R5, R5→R7}.
For flow B: P (B, R4)={R2→R5, R5→R6}.
For flow C: P (C, R4)={R2→R3, R3→R5, R5→R7}.

It is noted that, for simplicity, R4 is shown as the protected hop in E; however, it will be appreciated that the PCE may try to compute protection paths for other hops listed in E or even for every hop listed in E.

It is noted that protection paths for P (A, R4)=P (C, R4), because the protection path satisfies QoS constraints of both of the flows. For example, assume that flow B was set-up before flow C. So, TE resources along the protection path P (A, R4) had been reserved as per the requirements of flow B. Later, when flow C has been set-up, the residual TE resources along the same protection path satisfy the QoS of flow C.

It will be appreciated that E or P may be computed using any suitable path computation mechanisms, such as local path computation at the source router by running CSPF on TEDB or by other computational techniques, local configuration at the source, global path computation at a central controller by running CSPF on TEDB or other computational techniques, or the like.

Various example embodiments for supporting flow-specific fast rerouting of source routed packets for flow-specific FRR in IPv6-based source routing may support a new hop type to be sent in the explicit path (in the header of the source routed packet). This new hop type for flow-specific FRR in IPv6 source routing is referred to herein as an "IPv6 Fast-Reroutable Explicit Hop" (IPV6-FEH). The IPV6-FEH includes the following tuple:

IPV6-FEH=[<protected-hop>, <protection-path>, <skip-count>]

The <protected-hop> parameter identifies the protected hop. It may indicate a node identifier or link identifier, in the primary path, for which protection is provided. For example, R2→R4 is the protected hop in both E(A) and E(B).

The <protection-path> parameter describes the protection path that protects the protected hop (i.e., that protects <protected hop>). The protection path may be described by specifying the list of hops of the protection path. For example, if R2→R4 is the protected-hop then respective protection paths for flow A and flow B are P(A,R4) and P(B,R4), respectively.

The <skip-count> parameter indicates the quantity of hops subsequent to the <protected-hop> that are bypassed by the <protection-path>. For example, P(A) would skip R4→R7 after the protected hop R2→R4 and P(B) would skip R4→R6 after the protected hop R2→R4 and, thus, skip-count is 1 for both.

In FIG. 9, the encoding of the explicit paths sent by R1 for flow A and flow B would be as follows:

E(A)={R1→R2, [R2→R4, P (A, R4), 1], R4→R7, R7→R9}

E(B)={R1→R2, [R2→R4, P (B, R4), 1], R4→R6, R6→R8, R8→R9}

It is noted that, for clarity, R1→R2 is shown as the first hop in E(A) and E(B); however, since it is the immediate next hop of R1, R1 would strip it before sending the source routed packet to R2.

The operation of R2 upon receiving the source routed packet from R1 depends on whether the R2→R4 link is forwarding.

R2, upon receiving a packet from R1 when the R2→R4 link is forwarding (the R2→R4 link is active and R4 is active), takes the following actions.

If a packet arrives with E(A) when the R2→R4 link is forwarding, then R2 pops the first hop, which is IPV6-FEH= [R2→R4, P(A, R4), 1], and sends the source routed packet on the R2→R4 link with E(A)={R4→R7, R7→R9}.

If a packet arrives with E(B) when the R2→R4 link is forwarding, then R2 pops the first hop, which is IPV6-FEH= [R2→R4, P (B, R4), 1], and sends the source routed packet on R2→R4 with E(B)={R4→R6, R6→R8, R8→R9}.

R2, upon receiving a packet from R1 when the R2→R4 link is not forwarding (the R2→R4 link has failed or R4 has failed), takes the following actions.

If a packet arrives with E(A) when the R2→R4 link is not forwarding, then R2 takes the following actions: (1) R2 pops the first hop, which is IPV6-FEH=[R2→R4, P(A, R4), 1], (2) R2, since the R2→R4 link has failed, decides to fast-reroute the source routed packet along protection path P (A, R4), (3) R2, since the skip-count is "1", also pops R4→R7 from the explicit path, (4) R2 pops the first hop in P (A, R4), which is R2→R3, and, thus, decides to forward the source routed packet on the R2→R3 link, (5) R2 pushes the remaining hops in P (A, R4) into the explicit path such that the explicit path becomes E(A)={R3→R5, R5→R7, R7→R9}, and (6) sends the source routed packet out to R3.

If a packet arrives with E(B) when the R2→R4 link is not forwarding, then R2 takes the following actions: (1) R2 pops the first hop, which is IPV4-FEH=[R2→R4, P(B, R4), 1], (2) R2, since the R2→R4 link has failed, decides to fast-reroute the source routed packet along protection path P (B, R4), (3) R2, since the skip-count is "1", also pops R4→R6 from the explicit path, (4) R2 pops the first hop in P (B, R4), which is R2→R5, and, thus, decides to forward the source routed packet on the R2→R5 link, (5) R2 pushes the remaining hops in P (B, R4) into the explicit path such that the explicit path becomes E(B)={R5→R6, R6→R8, R7→R9}, and (6) sends the source routed packet out to R5.

It is noted that, from these examples, it may be seen that flow A and flow B are fast-rerouted along flow-specific protection paths upon failure of the common link R2→R4 or node R4. The PLR does not compute and program any protection-path against any of its next-hops; rather, the protection path is encoded in the source routed packet itself by the source node for use by the PLR.

Various example embodiments for supporting flow-specific fast rerouting of source routed packets for IPv6-based source routing may be configured to support one or more of a generic concept of one-to-one (flow specific) FRR for source routed IPv6 packets using IPV6-FEH, capabilities for implementation of IPV6-FEH encoded explicit path and flow specific FRR in IPv6 source routed packets, capabilities for signaling IPV6-FEH processing capabilities by routers (e.g., in IS-IS, OSPFv3, BGP-LS, or the like, as well as various combinations thereof), or the like, as well as various combinations thereof.

Various example embodiments for supporting flow-specific fast rerouting of source routed packets for IPv6-based source routing may be configured to support implementation of IPV6-FEH and flow-specific FRR in IPv6 source routed packets.

Various example embodiments for supporting flow-specific fast rerouting of source routed packets for IPv6-based source routing may be described within the context of FIG. 9. In describing these embodiments, the following terminology is used: "IP6-X" is used as the loopback IP address in router "X", "IP6-XY" is used as the IPv6 address at the Y end of link X→Y, and "IP6-YX" is used as the IPv6 address at the X end of link Y→X. For example, the loopback address for R1 is IP6-1, the address at the R2 end of R1→R2 is IP6-12, and the address at the R1 end of R1→R2 is IP6-21. It is noted that, in IPv4 source routing, a hop identifier for encoding a hop of a source routed path (primary or protection) may be an IPv4 address, a node identifier, or the like. In describing these embodiments, the explicit paths and protection paths introduced above for FIG. 9 are retained. Thus, the explicit path sent by router R1 on a packet is a list of IPv6 addresses, which is as follows for flow A and flow B:

E(A)={IP6-12, [IP6-24, P (A, R4), 1], IP6-47, IP6-79} where P (A, R4) is the protection path={IP6-23, IP6-35, IP6-57}

E(B)={IP6-12, [IP6-24, P (B, R4), 1], IP6-46, IP6-68, IP6-89} where P (B, R4) is the protection path={IP6-25, IP6-56}

It is noted that, for clarity, IP6-12 was shown as the first hop in E(A) and E(B), but R1 would strip this hop before sending the source routed packet to R2. Thus, R2 will receive the following explicit path on respective flows A and B:

E(A)={[IP6-24, P (A, R4), 1], IP6-47, IP6-79}

E(B)={[IP6-24, P (B, R4), 1], IP6-46, IP6-68, IP6-89}

Various example embodiments for supporting flow-specific fast rerouting of source routed packets for IPv6-based source routing may be configured to support encoding of the IPV6-FEH for use in supporting flow-specific FRR for source routed IPv6 packets. In at least some embodiments, as discussed further below, encoding of the IPV6-FEH may be performed using a new Routing Type in a Routing Header, as an IP-Shim Layer Protocol, or the like, as well as various combinations thereof. It will be appreciated that such embodiments may be further understood by first considering various aspects of IPv6 source routing. The use of such mechanisms to support encoding of the IPV6-FEH for use in supporting flow-specific FRR for source routed IPv6 packets may be further understood by first considering various aspects of IPv6 source routing.

In general, IPv6 source routing is defined in RFC 2460. Section 4 in RFC 2460 describes several IPv6 Extension Headers (EHs) that can be appended to an IPv6 Header (and which may be chained within IPv6 packets). The main IPv6 header remains fixed in size (40 bytes) to which customized EHs are added as needed. The EHs provide for control functions needed or useful in some situations, but which typically are unnecessary for the most common communications. The EHs include provisions for timestamps, security, and special routing. Section 4.4 in RFC 2460 defines an EH type 0 (referred to as a "Routing Header") which is used for source routing in IPV6. The format of the Routing Header is as follows:

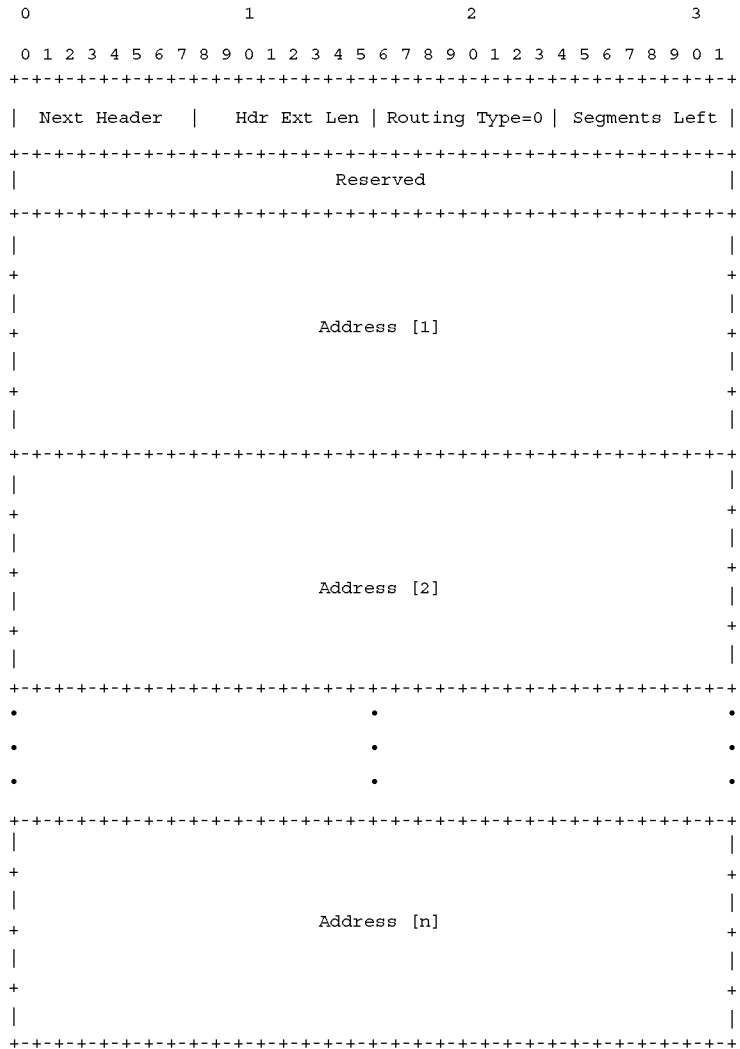

The Routing Header, as indicated above, includes a Next Header field, a Header Extension Length field, a Routing Type field, a Segments Left field, a Reserved field, and a set of n Address fields (Address[1] through Address[n]).

The Next Header field is a 8-bit selector that identified the type of header immediately following the Routing Header. It uses the same values as the IPv4 Protocol field (e.g., as defined in RFC 1700).

The Header Extension Length (Hdr Ext Len) field is an 8-bit unsigned integer that specifies the length of the Routing Header in 8-octet units (excluding the first 8 octets). For the Type 0 Routing Header, Header Extension Length is equal to two times the number of addresses in the header.

The Routing Type field is a 1-octet field that specifies the type of the header. In this case, the Type is 0, which indicates that the header is a Routing Header.

The Segments Left field is an 8-bit unsigned integer that specifies the number of route segments remaining (i.e., the number of explicitly listed intermediate nodes that still need to be visited before reaching the final destination).

The Reserved field is a 32-bit field that is initialized to zero for transmission and that is ignored on reception.

The set of n Address fields is a vector of n 128-bit addresses, numbered 1 (Address[1]) to n (Address[n]).

If Segments Left is 0, the source route is considered as empty (and the recorded route is full) and the routing is to be based on the DA field in the IPv6 Header.

If the address in DA field has been reached and the Segments Left is not 0, the next address in the source route (=Address [n−Segments_Left+1]) replaces the address in the DA field, and the replaced DA is recorded in Address [n−Segments_Left+1], and Segments_Left is decremented by 1. Thus, the source routed packet gets forwarded along each hop specified in the Address[ ] vector.

The use of the Routing Header may be further understood by way of an example. In FIG. 9, assume that R1 wants to send a packet with SA=S and DA=D along the path {IP6-12, IP6-24, IP6-47, IP6-79}. In this case, R1 sends the source routed packet on R1→R2 as: SA=S, DA=IP6-12, EH Type=Routing Header, Hdr_Ext_Len=8, Routing Type=0, Segments_Left=4, Address [ ]={IP6-24, IP6-47, IP6-79, D}. When R2 receives the source routed packet, it finds that DA=IP6-12 is local (and, thus, reached). Since the source routed packet carries the Routing Header and Segments Left>0, R2 swaps DA with the next address IP6-24 in Address[1]. The Segments Left is decremented by 1 to point to the next address (IP6-47) in the Address[2]. R2 sends the source routed packet on R2→R4 as: SA=S, DA=IP6-24, EH Type=Routing Header, Hdr_Ext_Len=8, Routing Type=0, Segments_Left=3, Address [ ]={IP6-12, IP6-47, IP6-79, D}. Similarly, R4 forwards the source routed packet on R4→R7 as: SA=S, DA=IP6-47, EH Type=Routing Header, Hdr_Ext_Len=8, Routing Type=0, Segments_Left=2, Address [ ]={IP6-12, IP6-24, IP6-79, D}. Similarly, R7 forwards the source routed packet to R7→R9 as: SA=S, DA=IP6-79, EH Type=Routing Header, Hdr_Ext_Len=8, Routing Type=0, Segments_Left=1, Address [ ]={IP6-12, IP6-24, IP6-47, D}. Similarly, R9 forwards the source routed packet to D as: SA=S, DA=D, EH Type=Routing Header, Hdr_Ext_Len=8, Routing Type=0, Segments_Left=0, Address [ ]={IP6-12, IP6-24, IP6-47, IP6-79}. When the source routed packet leaves R9, it may be seen that Address[ ] contains the explicit path traversed by the source routed packet (Recorded-Route). The subsequent nodes would find that Segments Left=0, so packet forwarding would continue based on DA=D alone.

It is noted that ongoing work in the IETF on IPV6 Segment Routing defines another Routing Type (Routing Type 4) which makes minor enhancement to the encoding of Routing Type 0. The functionalities of IPV6 Source Routing with Routing Type 4 is the same as defined for Routing Type 0.

It is noted the Routing Types in Routing Header are not sufficient to encode an IPV6-FEH as described here and, thus, as indicated above, encoding of the IPV6-FEH may be performed using a new Routing Type in a Routing Header, as an IP-Shim Layer Protocol, or the like, as well as various combinations thereof.

Various example embodiments for supporting flow-specific fast rerouting of source routed packets for flow-specific FRR in IPv6-based source routing are configured to support encoding of the IPV6-FEH using a new Routing Type in a Routing Header.

Various example embodiments for supporting flow-specific fast rerouting of source routed packets for flow-specific FRR in IPv6-based source routing are configured to support encoding of the IPV6-FEH using a new IPV6-FEH-Routing Header. The IPV6-FEH-Routing Header may have a new Routing Type assigned thereto, which can be assigned from unallocated values in the IANA registry (e.g., Routing Type 5, which may be allocated from the IANA registry, is suggested; however, it will be appreciated that any other suitable value may be used). The format of the IPV6-FEH-Routing Header follows:

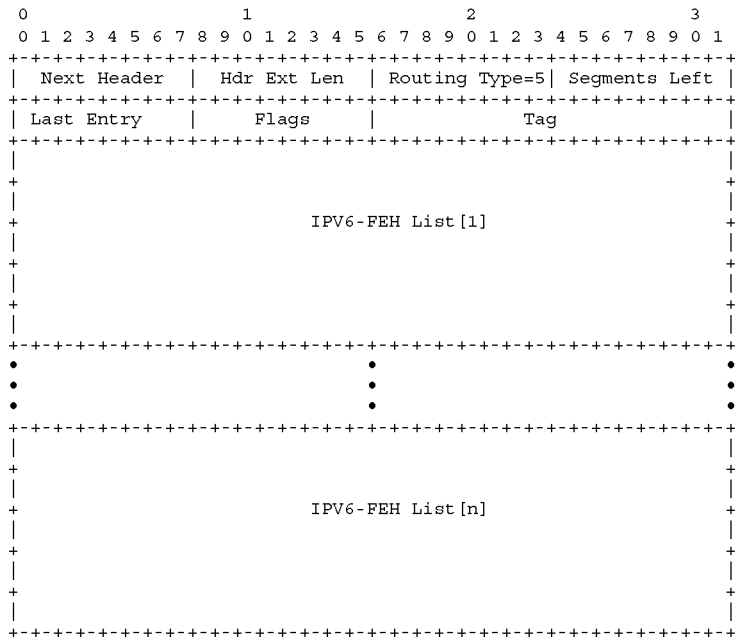

The IPV6-FEH-Routing Header, as indicated above, includes a Next Header field, a Header Extension Length field, a Routing Type field, a Segments Left field, a Last Entry field, a Flags field, a Tag field, and an IPV6-FEH List (from IPV6-FEH List[1] to IPV6-FEH List[n]).

The Next Header field of the IPV6-FEH-Routing Header is a 8-bit selector that identified the type of header immediately following the IPV6-FEH-Routing Header.

The Header Extension Length (Hdr Ext Len) field of the IPV6-FEH-Routing Header is an 8-bit unsigned integer that specifies the length of the IPV6-FEH-Routing Header in 10-octet units (excluding the first 8 octets). For the Type 0 Routing Header, Header Extension Length is equal to two times the number of IPV6-FEHs in the IPV6-FEH-Routing Header.

The Routing Type field of the IPV6-FEH-Routing Header is a 1-octet field that specifies the type of the IPV6-FEH-Routing Header. In this case, the Routing Type field indicates that the header is an IPV6-FEH-Routing Header (e.g., Type=5).

The Segments Left field of the IPV6-FEH-Routing Header is 1-octet field that includes the index, in the IPV6-FEH List, of the next IPV6-FEH to inspect. The Segments Left is decremented at each IPV6-FEH visited by the source routed packet.

The Last Entry field of the IPV6-FEH-Routing Header includes the index, in the IPV6-FEH List, of the first IPV6-FEH of the path (which is, in fact, the last element of the IPV6-FEH List).

The Flags field of the IPV6-FEH-Routing Header is a 1-octet field that includes a set of one-bit flags configured to indicate various capabilities. The Flags field of the IPV6-FEH-Routing Header has the following format:

```
 0 1 2 3 4 5 6 7
+-+-+-+-+-+-+-+-+
|O|      U      |
+-+-+-+-+-+-+-+-+
```

The Flags field of the IPV6-FEH-Routing Header, as indicated above, includes an O Flag and a U Flag. The O Flag is the operations and management (OAM) flag which is configured such that, if set (e.g., equal to "1"), then it indicates that this packet is an OAM packet. The U Flag is unused and for future use and, thus, should be unset on transmission and ignored on receipt.

The Tag field of the IPV6-FEH-Routing Header is a 2-octet field configured for use in tagging a packet as being part of a class or group of packets (e.g., packets sharing the same set of properties).

The IPV6-FEH List of the IPV6-FEH-Routing Header is a list of n IPV6-FEHs (denoted as IPV6-FEH List[1] to IPV6-FEH List[n]). In the list, IPV6-FEH List[n] is the IPV6-FEH that represents the n-th element in the IPV6-FEH list. The IPV6-FEH list is encoded starting from the last hop of the path (i.e., the first element of the IPV6-FEH List (IPV6-FEH List[1]) includes the last hop of the path while the last element of the IPV6-FEH List (IPV6-FEH List[n]) includes the first hop of the path). The index in the "Segments Left" field identifies the current hop. An IPV6-FEH is 20-octets in size and is defined as follows:

The Flags field of the IPV6-FEH is a 1-octet field that includes a set of one-bit flags configured to indicate various capabilities. The Flags field of the IPV6-FEH has the following format:

```
 0 1 2 3 4 5 6 7
+-+-+-+-+-+-+-+-+
|R|P|    U      |
+-+-+-+-+-+-+-+-+
```

The Flags field of the IPV6-FEH, as indicated above, includes an R Flag, a P Flag, and a U Flag. The R Flag is a Recorded Route bit that indicates that this IPV6-FEH has been traversed by the source routed packet (and is set to 0 by the originator of this IPV6-FEH). The P Flag is a protected flag that indicates that this hop is part of a protection path. The U Flag is unused and for future use and, thus, unset on transmission and ignored on receipt.

The RESERVED field of the IPV6-FEH is unused and is reserved for future use. This should be unset on transmission and ignored on receipt.

The IPv6 Address field of the IPV6-FEH includes the 128-bit IPv6 Address representing a hop to be traversed by the source routed packet.

It is noted that it is expected that the IPV6-FEH-Routing Header will appear once in the source routed packet and, thus, that there will not be two IPV6-FEH-Routing Headers in the same packet.

It is noted that the router whose address is in the DA field of the IPv6 Header needs to inspect the IPV6-FEH-Routing Header, which implies that the IPv6 address of the next IPV6-FEH is to be moved into DA of the IPv6 Header of the

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Num Prot Hops |  Skip Count   |     Flags     |   RESERVED    |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                         IPv6 Address                          +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

The IPV6-FEH, as indicated above, includes a Number of Protection Hops field, a Skip Count field, a Flags field, a RESERVED field, and an IPv6 Address field.

The Number of Protection Hops field of the IPV6-FEH is a 1-octet field that indicates the number of subsequent IPV6-FEHs that are protecting this IPV6-FEH. If the value of the Number of Protection Hops field is set to a value P, then it means that the P subsequent IPV6-FEHs immediately following that IPV6-FEH constitute the protection path of that IPV6-FEH. If the value of the Number of Protection Hops field is set to 0, then it means that there is no protection path for that IPV6-FEH. Additionally, if the IPV6-FEH belongs to a protection path then the value of the Number of Protection Hops field will be set to 0 (since the protection path itself is not protected).

The Skip Count field of the IPV6-FEH is an 8-bit field that indicates the number of subsequent IPV6-FEHs to be skipped after processing this IPV6-FEH. This is set to 0 for all IPV6-FEHs, except for the IPV6-FEH which is the last IPV6-FEH in a protection path.

source routed packet. The DA of the source routed packet changes at each IPV6-FEH termination/completion and, therefore, the final DA will be encoded as the last IPV6-FEH in the source routed packet.

It is noted that, if the Segments Left field is 0, the source route is considered as empty (and the recorded route is full) and the routing is to be based on the DA field in IPv6 Header.

It is noted that, if the address in DA field has been reached and the Segments Left is not zero, the next IPV6-FEH indexed by the Segments Left is processed and the forwarding decision is made based on that IPV6-FEH.

Various example embodiments for supporting flow-specific fast rerouting of source routed packets for flow-specific FRR in IPv6-based source routing are configured to support chaining of the IPV6-FEH-Routing Header to the IPv6 Header by the head-end router.

The head-end router may be configured to perform the following operations while supporting chaining of the IPV6-FEH-Routing Header to the IPv6 Header.

The DA in IPv6 Header is set with the IPv6 Address of the first primary hop in the explicit path. The original DA in IPv6 Header is preserved in IPV6-FEH[1] (as discussed further below).

The Header Extension Length field in the IPV6-FEH-Routing Header is set to the total number of 10-octet units in the Type, Length, Segments Left, Flags, and IPV6-FEH-List fields of the IPV6-FEH-Routing Header.

The Segments Left field is set to n, where n is the number of elements in the IPV6-FEH List.

The IPV6-FEH List is encoded in the reverse order of the path. Let n be the number of IPV6-FEH entries. The IPV6-FEH[1] is the last hop in primary path (the final DA of the source routed packet) and the IPV6-FEH[n] is the first hop. The entries in the list are ordered in units of sub-groups, where each subgroup contains an IPV6-FEH for a primary-hop followed by a list of IPV6-FEH entries for its protection path. This is further explained as follows.

When encoding the IPV6-FEH List, if IPV6-FEH List[x] is an unprotected primary hop, then IPV6-FEH List[x] is encoded with Num_Protection_Hops=0, Skip_Count=0, and Flags=0 to indicate that no protection path follows after this entry and, thus, that IPV6-FEH List[x−1] is the subsequent primary hop.

When encoding the IPV6-FEH List, if IPV6-FEH List[x] is a protected primary hop, then the hops of the protection path also are encoded. Let p be the quantity of hops in the protection path. IPV6-FEH List[x] is encoded with Num_Protection_Hops=p, Skip_Count=0, and Flags=0, which means that IPV6-FEH List[x−1] to IPV4-FEH List [x−p−1] is composed of the hops in the protection path. Subsequent primary hops start at IPV6-FEH List[x−p−2]. Each of the entries in IPV6-FEH List[x−1] through IPV6-FEH List[x−p−1] is encoded with Num_Protection_Hops=0, because hops in the protection path are not protected. The P flag is set to 1. Each of the entries in IPV6-FEH List[x−1] through IPV6-FEH List[x−p] is encoded with Skip_Count=0. The last entry in the protection path (i.e., IPV6-FEH List[x−p−1]) is encoded with Skip_Count=C, where C is the number of subsequent primary hops to be skipped (i.e., from IPV6-FEH List[x−p−2] through IPV6-FEH List[x−p−c−1]) if the source routed packet is being forwarded on a protection path.

It is noted that this encoding rule is iterated over each sub-group of the IPV6-FEH List.

The head-end router then sends the source routed packet toward the DA indicated in the source routed packet.

The chaining of the IPV6-FEH-Routing Header to the IPv6 Header by the head-end router may be further understood by way of reference to the following example.

For example, consider the path for flow A in FIG. 9, as follows: E(A)={IP6-12, [IP6-24, P (A, R4), 1], IP6-47, IP6-79} where P (A, R4) is the protection path={IP6-23, IP6-35, IP6-57}. In this example, the path is encoded on a packet from source S to destination D as follows:

IPv6 Header
DA=IP6-12
IPV6-FEH-Routing Header
Routing Type: 5, Hdr_Ext_Len=14, Segments Left=7, Last_Entry=7, Flags=0
IPV6-FEH List[1]=NumProtection_Hops=0, Skip_Count=0, R=0, P=0, D
IPV6-FEH List[2]=NumProtection_Hops=0, Skip_Count=0, R=0, P=0, IP6-79
IPV6-FEH List[3]=NumProtection_Hops=0, Skip_Count=0, R=0, P=0, IP6-47
IPV6-FEH List[4]=NumProtection_Hops=0, Skip_Count=1, R=0, P=1, IP6-57
IPV6-FEH List[5]=NumProtection_Hops=0, Skip_Count=0, R=0, P=1, IP6-35
IPV6-FEH List[6]=NumProtection_Hops=0, Skip_Count=0, R=0, P=1, IP6-23
IPV6-FEH List[7]=NumProtection_Hops=3, Skip_Count=0, R=0, P=0, IP6-24

Various example embodiments for supporting flow-specific fast rerouting of source routed packets for flow-specific FRR in IPv6-based source routing are configured to support processing of the IPV6-FEH-Routing Header of the IPv6 Header by the transit router.

The transit router may be configured to perform the following operations while processing the FEH-Routing Header of the IPv6 Header.

It is noted that the node that is supposed to inspect the IPV6-FEH-Routing Header is the node corresponding to DA of the source routed packet. The other transit nodes should not inspect these options and should forward the source routed packet toward the DA according to the IPv6 Routing Table.

The transit router corresponding to the DA, upon receiving the IPV6-FEH-Routing Header of the IPv6 Header, may process the IPV6-FEH-Routing Header of the IPv6 Header as follows.

If Segments Left=0, the next layer in the source routed packet, whose type is identified by the Next Header Field in the IPV6-FEH-Routing Header, is processed.

If Segments Left≠0, then i is set equal to the index of the next IPV6-FEH to be visited in the IPV6-FEH list (=Segments Left). The Segments Left value is decremented by 1. From this point on, the Segments Left value points to IPV6-FEH[i−1]. The IPV6-FEH[i] is processed as discussed further below.

If the address of IPV6-FEH[i] is a multicast address, then the source routed packet is discarded.

If the address of IPV6-FEH[i] is a not multicast address, then IPV6-FEH[i] is further processed as follows: (1) if the Hop Limit in the IPv6 Header is less than or equal to 1, swap the IPv6 DA and the IPV6 address of IPV6-FEH[i], set the R Flag in IPV6-FEH[i]=1 to indicate that it has been traversed by the source routed packet, send an ICMP Time Exceeded-TTL Exceeded in Transit message to the SA, and discard the source routed packet or (2) if the Hop Limit in the IPv6 Header is not less than or equal to 1, then IPV6-FEH[i] is further processed by checking the reachability of the address of IPV6-FEH[i].

If the address of IPV6-FEH[i] is reachable, swap the IPv6 DA and the IPv6 address of IPV6-FEH[i] and set the R Flag in IPV4-FEH[i]=1 to indicate that this hop has been traversed by the source routed packet. The following processing is performed: (1) if Num_Protection_Hops in IPV6-FEH[i]>0, decrement Segments Left by Num_Protection_Hops in IPV6-FEH[i] (this means that the hops in protection path have been skipped since the source routed packet is not being forwarded along the protection path) or (2) if Skip_Count in IPV6-FEH[i]>0, decrement Segments Left by Skip Count in IPV6-FEH[i] (this means that the hops in the primary path have been skipped, i.e., bypassed by the protection path). The source routed packet is then resubmitted to the IPv6 module for transmission to the new destination.

If the address of IPV6-FEH[i] is not reachable and if the Num_Protection_Hops in IPV6-FEH[i]=0 (this means the next-hop is neither operational nor protected and, thus, that the source routed packet is to be dropped), then the IPv6 DA address and the IPv6 address of IPV6-FEH[i] are swapped, the R Flag in IPV6-FEH[i] is set equal to 1 to indicate that this hop has been traversed by the source routed packet, an ICMP Unreachable message is sent to the SA, and the source routed packet is discarded.

If the address of IPV6-FEH[i] is not reachable and if the Num_Protection_Hops in IPV6-FEH[i] !=0 (this means that the hop is unreachable, but is protected, so the source routed packet is to be fast-rerouted via the protection path), then the Segments Left value is decremented by 1 (such that it now points to IPV6-FEH[i−2]), the IPv6 DA address and the IPv6 address of IPV6-FEH[i] (i.e., the first entry in the protection path) are swapped, the R Flag in IPV6-FEH[i] is set equal to 1 to indicate that this hop has been traversed by the source routed packet, and the source routed packet is then resubmitted to the IPv6 module for transmission to the new destination.

Various example embodiments for supporting flow-specific fast rerouting of source routed packets for flow-specific FRR in IPv6-based source routing, based on use of an IPV6-FEH-Routing Header, may be further understood by considering an example in which source router R1 sends a packet from source S to destination D with explicit path E(A).

When R2→R4 is operational, the source routed packet travels along the path R1→R2, R2→R4, R4→R, R7→R9, R9→D, each of which is discussed below.

As the source routed packet travels from R1 to R2, the IPv6 Header and the IPV6-FEH Routing Header elements may be encoded as follows:
IPv6 Header
Source Address=S
Destination Address=IP6-12
IPV6-FEH-Routing Header
Routing Type: 5, Hdr_Ext_Len=14, Segments Left=7, Last_Entry=7, Flags=0,
IPV6-FEH List[1]=NumProtection_Hops=0, Skip_Count=0, R=0, P=0, D
IPV6-FEH List[2]=NumProtection_Hops=0, Skip_Count=0, R=0, P=0, IP6-79
IPV6-FEH List[3]=NumProtection_Hops=0, Skip_Count=0, R=0, P=0, IP6-47
IPV6-FEH List[4]=NumProtection_Hops=0, Skip_Count=1, R=0, P=1, IP6-57
IPV6-FEH List[5]=NumProtection_Hops=0, Skip_Count=0, R=0, P=1, IP6-35
IPV6-FEH List[6]=NumProtection_Hops=0, Skip_Count=0, R=0, P=1, IP6-23
IPV6-FEH List[7]=Num_Protection_Hops=3, Skip_Count=0, R=0, P=0, IP6-24

As indicated above, the source routed packet arrived in R2 with Segments Left=7. So, R2 processed IPV6-FEH List[7], which is a reachable next-hop. R2 swapped DA (IP6-12) with the address in IPV6-FEH List[7] and marked it as part of the recorded-route (R=1). The IPV6-FEH List[7] has 3 protection hops, so IPV6-FEH List[6 . . . 4] need to be skipped, as the source routed packet is not traversing the protection path. So, Segments Left is set to 3 (=7-1-3).

As the source routed packet travels from R2 to R4, the IPv6 Header and the IPV6-FEH Routing Header elements may be encoded as follows (updated fields highlighted with underlining):
IPv6 Header
Source Address=S
Destination Address=IP6-24
IPV6-FEH-Routing Header
Routing Type: 5, Hdr_Ext_Len=14, Segments Left=3, Last_Entry=7, Flags=0,
IPV6-FEH List[1]=NumProtection_Hops=0, Skip_Count=0, R=0, P=0, D
IPV6-FEH List[2]=NumProtection_Hops=0, Skip_Count=0, R=0, P=0, IP6-79
IPV6-FEH List[3]=NumProtection_Hops=0, Skip_Count=0, R=0, P=0, IP6-47
IPV6-FEH List[4]=NumProtection_Hops=0, Skip_Count=1, R=0, P=1, IP6-57
IPV6-FEH List[5]=NumProtection_Hops=0, Skip_Count=0, R=0, P=1, IP6-35
IPV6-FEH List[6]=NumProtection_Hops=0, Skip_Count=0, R=0, P=1, IP6-23
IPV6-FEH List[7]=Num_Protection_Hops=3, Skip_Count=0, R=1, P=0, IP6-12

As the source routed packet travels from R4 to R7, the IPv6 Header and the IPV6-FEH Routing Header elements may be encoded as follows (updated fields highlighted with underlining):
IPv6 Header
Source Address=S
Destination Address=IP6-47
IPV6-FEH-Routing Header
Routing Type: 5, Hdr_Ext_Len=14, Segments Left=2, Last_Entry=7, Flags=0,
IPV6-FEH List[1]=Num_Protection_Hops=0, Skip_Count=0, R=0, P=0, D
IPV6-FEH List[2]=Num_Protection_Hops=0, Skip_Count=0, R=0, P=0, IP6-79
IPV6-FEH List[3]=Num_Protection_Hops=0, Skip_Count=0, R=1, P=0, IP6-24
IPV6-FEH List[4]=Num_Protection_Hops=0, Skip_Count=1, R=0, P=1, IP6-57
IPV6-FEH List[5]=Num_Protection_Hops=0, Skip_Count=0, R=0, P=1, IP6-35
IPV6-FEH List[6]=Num_Protection_Hops=0, Skip_Count=0, R=0, P=1, IP6-23
IPV6-FEH List[7]=Num_Protection_Hops=3, Skip_Count=0, R=1, P=0, IP6-12

As the source routed packet travels from R7 to R9, the IPv6 Header and the IPV6-FEH Routing Header elements may be encoded as follows (updated fields highlighted with underlining):
IPv6 Header
Source Address=S
Destination Address=IP6-79
IPV6-FEH-Routing Header
Routing Type: 5, Hdr_Ext_Len=14, Segments Left=1, Last_Entry=7, Flags=0,
IPV6-FEH List[1]=Num_Protection_Hops=0, Skip_Count=0, R=0, P=0, D
IPV6-FEH List[2]=Num_Protection_Hops=0, Skip_Count=0, R=1, P=0, IP6-47
IPV6-FEH List[3]=Num_Protection_Hops=0, Skip_Count=0, R=1, P=0, IP6-24
IPV6-FEH List[4]=Num_Protection_Hops=0, Skip_Count=1, R=0, P=1, IP6-57
IPV6-FEH List[5]=Num_Protection_Hops=0, Skip_Count=0, R=0, P=1, IP6-35
IPV6-FEH List[6]=Num_Protection_Hops=0, Skip_Count=0, R=0, P=1, IP6-23
IPV6-FEH List[7]=Num_Protection_Hops=3, Skip_Count=0, R=1, P=0, IP6-12

As the source routed packet travels from R9 to D, the IPv6 Header and the IPV6-FEH Routing Header elements may be encoded as follows (updated fields highlighted with underlining):

IPv6 Header
Source Address=S
Destination Address=D
IPV6-FEH-Routing Header
Routing Type: 5, Hdr_Ext_Len=14, Segments Left=0, Last_Entry=7, Flags=0,
IPV6-FEH List[1]=Num_Protection_Hops=0, Skip_Count=0, R=1, P=0, IP6-79
IPV6-FEH List[2]=Num_Protection_Hops=0, Skip_Count=0, R=1, P=0, IP6-47
IPV6-FEH List[3]=Num_Protection_Hops=0, Skip_Count=0, R=1, P=0, IP6-24
IPV6-FEH List[4]=Num_Protection_Hops=0, Skip_Count=1, R=0, P=1, IP6-57
IPV6-FEH List[5]=Num_Protection_Hops=0, Skip_Count=0, R=0, P=1, IP6-35
IPV6-FEH List[6]=Num_Protection_Hops=0, Skip_Count=0, R=0, P=1, IP6-23
IPV6-FEH List[7]=Num_Protection_Hops=3, Skip_Count=0, R=1, P=0, IP6-12

It may be seen that, when the source routed packet leaves R9 towards D, the R Flag gets set to 1 on the IPV6-FEH entries that have been traversed by the source routed packet. That subset of IPV6-FEH entries is the recorded-route list.

When the R2→R4 link has failed or the R4 node as failed, the source routed packet travels along the path R1→R2, R2→R3, R3→R5, R5→R7, R7→R9, R9→D, each of which is discussed below.

As the source routed packet travels from R1 to R2, the IPv6 Header and the IPV6-FEH-Routing Header elements may be encoded as follows:

IPv6 Header
Source Address=S
Destination Address=IP6-12
IPV6-FEH-Routing Header
Routing Type: 5, Hdr_Ext_Len=14, Segments Left=7, Last_Entry=7, Flags=0
IPV6-FEH List[1]=Num_Protection_Hops=0, Skip_Count=0, R=0, P=0, D
IPV6-FEH List[2]=Num_Protection_Hops=0, Skip_Count=0, R=0, P=0, IP6-79
IPV6-FEH List[3]=Num_Protection_Hops=0, Skip_Count=0, R=0, P=0, IP6-47
IPV6-FEH List[4]=Num_Protection_Hops=0, Skip_Count=1, R=0, P=1, IP6-57
IPV6-FEH List[5]=Num_Protection_Hops=0, Skip_Count=0, R=0, P=1, IP6-35
IPV6-FEH List[6]=Num_Protection_Hops=0, Skip_Count=0, R=0, P=1, IP6-23
IPV6-FEH List[7]=Num_Protection_Hops=3, Skip_Count=0, R=0, P=0, IP6-24

As indicated above, the source routed packet arrived in R2 with Segments Left=7. So, R2 processed IPV6-FEH List[7], but it is not reachable. Since IPV6-FEH List[7] has a protection path (i.e., the 3 subsequent hops IPV6-FEH List[4 . . . 6]), the source routed packet is forwarded along the protection path. The DA (=IP6-12) is swapped with first hop in the protection path, i.e., IPV6-FEH List[6]. The DA is traversed, so recorded-route is set (R=1). Segments Left points to IPV6-FEH List[5].

As the source routed packet travels from R2 to R3, the IPv6 Header and the IPV6-FEH Routing Header elements may be encoded as follows (updated fields highlighted with underlining):

IPv6 Header
Source Address=S
Destination Address=IP6-23
IPV6-FEH-Routing Header
Routing Type: 5, Hdr_Ext_Len=14, Segments Left=5, Last_Entry=7, Flags=0,
IPV6-FEH List[1]=NumProtection_Hops=0, Skip_Count=0, R=0, P=0, D
IPV6-FEH List[2]=Num_Protection_Hops=0, Skip_Count=0, R=0, P=0, IP6-79
IPV6-FEH List[3]=Num_Protection_Hops=0, Skip_Count=0, R=0, P=0, IP6-47
IPV6-FEH List[4]=Num_Protection_Hops=0, Skip_Count=1, R=0, P=1, IP6-57
IPV6-FEH List[5]=Num_Protection_Hops=0, Skip_Count=0, R=0, P=1, IP6-35
IPV6-FEH List[6]=Num_Protection_Hops=0, Skip_Count=0, R=1, P=1, IP6-12
IPV6-FEH List[7]=Num_Protection_Hops=3, Skip_Count=0, R=0, P=0, IP6-24

As the source routed packet travels from R3 to R5, the IPv6 Header and the IPV6-FEH Routing Header elements may be encoded as follows (updated fields highlighted with underlining):

IPv6 Header
Source Address=S
Destination Address=IP6-35
IPV6-FEH-Routing Header
Routing Type: 5, Hdr_Ext_Len=14, Segments Left=4, Last_Entry=7, Flags=0,
IPV6-FEH List[1]=Num_Protection_Hops=0, Skip_Count=0, R=0, P=0, D
IPV6-FEH List[2]=Num_Protection_Hops=0, Skip_Count=0, R=0, P=0, IP6-79
IPV6-FEH List[3]=Num_Protection_Hops=0, Skip_Count=0, R=0, P=0, IP6-47
IPV6-FEH List[4]=Num_Protection_Hops=0, Skip_Count=1, R=0, P=1, IP6-57
IPV6-FEH List[5]=Num_Protection_Hops=0, Skip_Count=0, R=1, P=1, IP6-23
IPV6-FEH List[6]=Num_Protection_Hops=0, Skip_Count=0, R=1, P=1, IP6-12
IPV6-FEH List[7]=Num_Protection_Hops=3, Skip_Count=0, R=0, P=0, IP6-24

As indicated above, the source routed packet arrived in R5 with Segments Left=4, so R5 processes IPV6-FEH List[4]. It has a Skip Count=1, so IPV6-FEH List[5] needs to be skipped. The non-zero Skip Count means that this protection path offered node protection and IPV6-FEH List[5] (which is a hop in primary path) has been bypassed.

As the source routed packet travels from R5 to R7, the IPv6 Header and the IPV6-FEH Routing Header elements may be encoded as follows (updated fields highlighted with underlining):

IPv6 Header
Source Address=S
Destination Address=IP6-57
IPV6-FEH-Routing Header
Routing Type: 5, Hdr_Ext_Len=14, Segments Left=2, Last_Entry=7, Flags=0,
IPV6-FEH List[1]=Num_Protection_Hops=0, Skip_Count=0, R=0, P=0, D IPV6-FEH List[2]=Num_Protection_Hops=0, Skip_Count=0, R=0, P=0, IP6-79
IPV6-FEH List[3]=Num_Protection_Hops=0, Skip_Count=0, R=0, P=0, IP6-47
IPV6-FEH List[4]=Num_Protection_Hops=0, Skip_Count=1, R=1, P=1, IP6-35
IPV6-FEH List[5]=Num_Protection_Hops=0, Skip_Count=0, R=1, P=1, IP6-23
IPV6-FEH List[6]=Num_Protection_Hops=0, Skip_Count=0, R=1, P=1, IP6-12
IPV6-FEH List[7]=Num_Protection_Hops=3, Skip_Count=0, R=0, P=0, IP6-24

As the source routed packet travels from R7 to R9, the IPv6 Header and the IPV6-FEH Routing Header elements may be encoded as follows (updated fields highlighted with underlining):

IPv6 Header
Source Address=S
Destination Address=IP6-79
IPV6-FEH-Routing Header:
Routing Type: 5, Hdr_Ext_Len=14, Segments Left=1, Last_Entry=7, Flags=0,
IPV6-FEH List[1]=Num_Protection_Hops=0, Skip_Count=0, R=0, P=0, D
IPV6-FEH List[2]=Num_Protection_Hops=0, Skip_Count=0, R=1, P=0, IP6-57
IPV6-FEH List[3]=Num_Protection_Hops=0, Skip_Count=0, R=0, P=0, IP6-47
IPV6-FEH List[4]=Num_Protection_Hops=0, Skip_Count=1, R=1, P=1, IP6-35
IPV6-FEH List[5]=Num_Protection_Hops=0, Skip_Count=0, R=1, P=1, IP6-23
IPV6-FEH List[6]=Num_Protection_Hops=0, Skip_Count=0, R=1, P=1, IP6-12
IPV6-FEH List[7]=Num_Protection_Hops=3, Skip_Count=0, R=0, P=0, IP6-24

As the source routed packet travels from R9 to D, the IPv6 Header and the IPV6-FEH Routing Header elements may be encoded as follows (updated fields highlighted with underlining):

IPV6-FEH List[6]=Num_Protection_Hops=0, Skip_Count=0, R=1, P=1, IP6-12
IPV6-FEH List[7]=Num_Protection_Hops=3, Skip_Count=0, R=0, P=0, IP6-24

As indicated above, when the source routed packet leaves R9 towards D, the R flag gets set to 1 on the IPV6-FEH entries that have been traversed by the source routed packet (not on the IPV6-FEH entries that have not been traversed by the source routed packet).

Various example embodiments for supporting flow-specific fast rerouting of source routed packets for IPv6-based source routing, as indicated above, may be configured to support encoding of the IPV6-FEH using the IPV6-FEH-Routing Header in various other ways.

Various example embodiments for supporting flow-specific fast rerouting of source routed packets for IPv6-based source routing may be configured to support encoding of the IPV6-FEH using an IP-Shim Layer Protocol.

Various example embodiments for supporting flow-specific fast rerouting of source routed packets for IPv6-based source routing may be configured to support encoding of the IPV6-FEH using a generic IP-Shim Layer which may be configured to support encoding of IPV6-FEHs in support of flow-specific fast rerouting of source routed packets for IPv6-based source routing. The generic IP-Shim Layer may be inserted between the IPv6 Header and the transport/upper layer protocol header (e.g., TCP, UDP, ICMP, or the like). The IP-Shim Layer may be carried using a new IP Protocol number in the IPv6 Header, which can be reserved from the registry maintained by IANA (e.g., a value of 145, which may be allocated from the IANA registry, is suggested; however, it will be appreciated that any other suitable value may be used). The IP-Shim Layer may be indicated in the IPv6 Header. The IP-Shim Layer is defined as generic in that it can carry any "enhancement" related to the IP layer. It is expected that the node that is allowed to inspect the IP-Shim Header is the node corresponding to the DA of the source routed packet. The IP-Shim Layer may use the following IPV6-FEH-Shim Header:

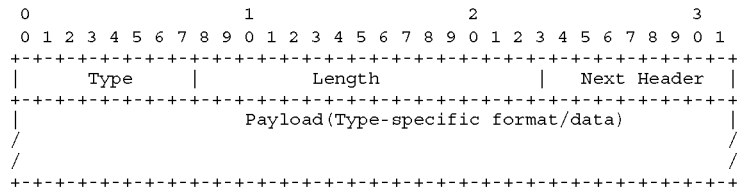

IPv6 Header
Source Address=S
Destination Address=D
IPV6-FEH-Routing Header
Routing Type: 5, Hdr_Ext_Len=14, Segments Left=0, Last_Entry=7, Flags=0,
IPV6-FEH List[1]=Num_Protection_Hops=0, Skip_Count=0, R=0, P=0, IP6-79
IPV6-FEH List[2]=Num_Protection_Hops=0, Skip_Count=0, R=1, P=0, IP6-57
IPV6-FEH List[3]=Num_Protection_Hops=0, Skip_Count=0, R=0, P=0, IP6-47
IPV6-FEH List[4]=Num_Protection_Hops=0, Skip_Count=1, R=1, P=1, IP6-35
IPV6-FEH List[5]=Num_Protection_Hops=0, Skip_Count=0, R=1, P=1, IP6-23

The IPV6-FEH-Shim Header for use at the IP-Shim Layer, as indicated above, includes a Type field, a Length field, a Next Header field, and a Payload field.

The Type field of the IPV6-FEH-Shim Header is an 8-bit field that indicates the type of the IPV6-FEH-Shim header. As indicated above, the IP-Shim Layer is defined as generic and, thus, may support multiple types. For transport of IPV6-FEHs, a IPV6-FEH type is defined (e.g., Type=2, or using any other suitable value). Herein, references to the IPV6-FEH-Shim Header will be understood to mean the IP-Shim Header having a type indicative that the IP-Shim Header is for IPV6-FEH (e.g., Type=2, or using any other suitable value).

The Length field of the IPV6-FEH-Shim Header is a 16-bit field that indicates the length of the Payload field of the IPV6-FEH-Shim Header in octets. It is noted that the octets of the Type field, the Length field, and the Next Header field of the IPV6-FEH-Shim Header are excluded.

The Next Header field of the IPV6-FEH-Shim Header is an 8-bit field that indicates the IP protocol type of the header next to the IPV6-FEH-Shim Header (e.g., TCP, UDP, ICMP, or the like).

The Payload field of the IP-Shim Header is a variable-length field that includes the payload in a type-specific format. The Payload field of the IPV6-FEH-Shim Header is as follows:

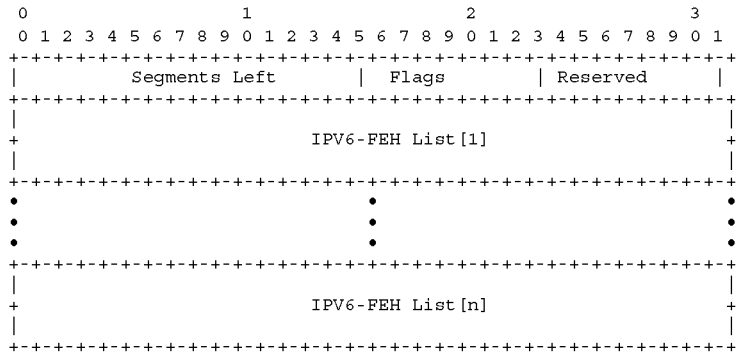

The Payload field of the IPV6-FEH-Shim Header, as indicated above, includes a Segments Left field, a Flags field, a RESERVED field, and an IPV6-FEH List (from IPV6-FEH List[1] to IPV6-FEH List[n]).

The Segments Left field of the Payload field of the IPV6-FEH-Shim Header is a 16-bit field that includes the index, in the IPV6-FEH List, of the next hop to inspect. The Segments Left value is decremented at each IPV6-FEH.

The Flags field of the Payload field of the IPV6-FEH-Shim Header is a 1-octet field that includes a set of one-bit flags configured to indicate various capabilities. The Flags field of the Payload field of the IPV6-FEH-Shim Header has the following format:

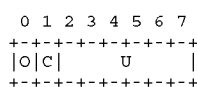

The Flags field of the Payload field for the IPV6-FEH-Shim Header, as indicated above, includes an O Flag, a C Flag, and a U Flag. The O Flag is the operations and management (OAM) flag, which is configured such that, if set (e.g., equal to "1"), then it indicates that this packet is an OAM packet. The C Flag is the Carry flag, which is configured such that: (1) when not set (e.g., equal to "0"), this means that the IP-Shim Header is removed when Segments Left becomes 0 and (2) when set (e.g., equal to "1"), this means that IP-Shim Header is carried forward in the source routed packet. The U Flag is unused and for future use and, thus, should be unset on transmission and ignored on receipt.

The IPV6-FEH List of the Payload field of the IPV6-FEH-Shim Header is a list of n IPV6-FEHs (denoted as IPV6-FEH List[1] to IPV6-FEH List[n]). In the list, IPV6-FEH List[n] is the IPV6-FEH that represents n-th element in the IPV6-FEH list. The IPV6-FEH list is encoded starting from the last hop of the path (i.e., the first element of the IPV6-FEH List (IPV6-FEH List[1]) includes the last hop of the path while the last element of the IPV6-FEH List (IPV6-FEH List[n]) includes the first hop of the path). The index in the Segments Left field of the Payload field of the IPV6-FEH-Shim Header identifies the current hop. An IPV6-FEH is 20-octets in size and is defined as follows:

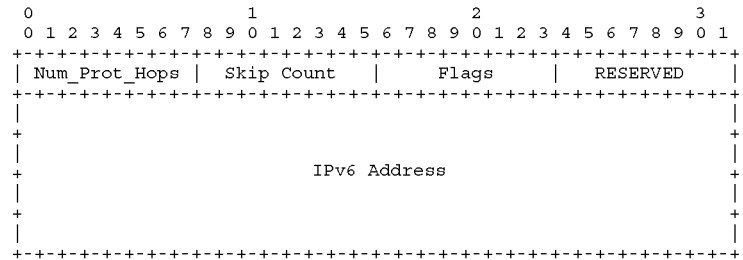

The IPV6-FEH, as indicated above, includes a Number of Protection Hops (Num_Prot_Hops) field, a Skip Count field, a Flags field, a RESERVED field, and an IPv6 Address field.

The Number of Protection Hops field of the IPV6-FEH is a 1-octet field that indicates the number of subsequent IPV6-FEHs that are protecting this IPV6-FEH. If the value of the Number of Protection Hops field is set to a value P, then it means that the P subsequent IPV6-FEHs immediately following that IPV6-FEH constitute the protection path of that IPV6-FEH. If the value of the Number of Protection Hops field is set to 0, then it means that there is no protection path for that IPV6-FEH. Additionally, if the IPV6-FEH belongs to a protection path then the value of the Number of Protection Hops field will be set to 0 (since the protection path itself is not protected).

The Skip Count field of the IPV6-FEH is a 1-octet field that indicates the number of subsequent IPV6-FEHs to be skipped after processing this IPV6-FEH. This is set to 0 for all IPV6-FEHs, except for the IPV6-FEH which is the last IPV6-FEH in a protection path.

The Flags field of the IPV6-FEH is a 1-octet field that includes a set of one-bit flags configured to indicate various capabilities. The Flags field of the IPV6-FEH has the following format:

```
 0 1 2 3 4 5 6 7
+-+-+-+-+-+-+-+-+
|R|P|    U      |
+-+-+-+-+-+-+-+-+
```

The Flags field of an IPV6-FEH, as indicated above, includes an R Flag, a P Flag, and a U Flag. The R Flag is a Recorded Route bit that indicates that this IPV6-FEH has been traversed by the source routed packet (and is set to 0 by the originator of this IPV6-FEH). The P Flag is a protected flag that indicates that this hop is part of a protection path. The U Flag is unused and for future use and, thus, unset on transmission and ignored on receipt.

The RESERVED field of the IPV6-FEH is unused and is reserved for future use. This should be unset on transmission and ignored on receipt.

The IPv6 Address field of the IPV6-FEH includes the 128-bit IPv6 address representing a hop in the primary path or the protection path and should not be a multicast address.

Various example embodiments for supporting flow-specific fast rerouting of source routed packets for flow-specific FRR in IPv6-based source routing are configured to support insertion of an IPV6-FEH-Shim Header between the IPv6 Header and the upper layer(s) by the head-end router.

The head-end router may be configured to perform the following operations while inserting an IPV6-FEH-Shim Header between the IPv6 Header and the upper layer(s).

The DA in the IPv6 Header is set with the IPv6 Address of the first hop in the primary path. The original DA in IPv6 Header is preserved in IPV6-FEH[1] (as discussed further below).

The Type field in the IPV6-FEH-Shim Header is set to 2.

The Length field in the IPV6-FEH-Shim Header is set to the total number of octets in the Segments Left field, the Flags field, the RESERVED field, and IPV6-FEH-List of the Payload field of the IPV6-FEH-Shim Header.

The Next Header field in the IPV6-FEH-Shim Header is set to the value in Protocol field in the IPv6 Header. The Protocol field in the IPv6 Header is set to a value (e.g., 145, or another suitable value) that indicates that the IP-Shim Protocol as the upper layer protocol (from the perspective of the IP layer).

The Segments Left field in the Payload field of the IPV6-FEH-Shim Header is set to n, where n is the number of elements in the IPV6-FEH List.

The C Flag in Flags field in the Payload field for the IPV6-FEH-Shim Header is set to a value (e.g., 0) that indicates that the last hop in the explicit hop needs to remove the IPV6-FEH-Shim Header prior to further forwarding of the source routed packet.

The IPV6-FEH List in the Payload field for the IPV6-FEH-Shim Header is encoded in the reverse order of the path. Let n be the number of IPV6-FEH entries. The IPV6-FEH[1] is the last hop in primary path (the final DA of the source routed packet) and the IPV6-FEH[n] is the first hop in the primary path. The entries in the list are ordered in units of sub-groups, where each sub-group includes an IPV6-FEH for a primary hop followed by a list of IPV6-FEH entries for its protection path. This is further explained as follows.

When encoding the IPV6-FEH List, if IPV6-FEH List[x] is an unprotected primary hop, then IPV6-FEH List[x] is encoded with Num_Protection_Hops=0, Skip_Count=0, and Flags=0 to indicate that no protection path follows this entry and, thus, that IPV6-FEH List[x−1] is the subsequent primary hop.

When encoding the IPV6-FEH List, if IPV6-FEH List[x] is a protected primary hop, then the hops of the protection path also are encoded. Let p be the quantity of hops in the protection path. IPV6-FEH List[x] is encoded with Num_Protection_Hops=p, Skip_Count=0, and Flags=0, which means that IPV6-FEH List[x−1] to IPV6-FEH List[x−p−1] is composed of the hops in the protection path and that the subsequent primary hops starts at IPV6-FEH List[x−p−2]. Each of the entries in IPV6-FEH List[x−1] through IPV6-FEH List[x−p−1] is encoded with Num_Prot_Hops=0, because hops in the protection path are not protected. The P flag is set to 1. Each of the entries in IPV6-FEH List[x−1] through IPV6-FEH List[x−p] is encoded with Skip_Count=0. The last entry in the protection path, i.e., IPV6-FEH List[x−p−1], is encoded with Skip_Count=C, where C is the number of subsequent primary hops to be skipped (i.e., from IPV6-FEH List[x−p−2] through IPV64-FEH List[x−p−c−1]) if the source routed packet is being forwarded on a protection path.

It is noted that this encoding rule is iterated over each sub-group of the IPV6-FEH List.

The head-end router then sends the source routed packet toward the DA indicated in the source routed packet.

The insertion of an IPV6-FEH-Shim Header between the IPv6 Header and the upper layer(s) by the head-end router may be further understood by way of reference to the following example. For example, consider the path for flow A in FIG. 9, as follows: E(A)={IP6-12, [IP6-24, P (A, R4), 1], IP6-47, IP6-79} where P (A, R4) is the protection path={IP6-23, IP6-35, IP6-57}. In this example, the path is encoded on a packet from source S to destination D (where upper layer was TCP before encoding of the path) as follows:

IPv6 Header
SA=IP6-79
DA=IP6-12
Next Header=146
IPV6-FEH-Shim Header
Type: 2, Length=144 Next Header=6, Segments Left=7, C=0
IPV6-FEH List[1]=Num_Protection_Hops=0, Skip_Count=0, R=0, P=0, D
IPV6-FEH List[2]=Num_Protection_Hops=0, Skip_Count=0, R=0, P=0, IP6-79
IPV6-FEH List[3]=Num_Protection_Hops=0, Skip_Count=0, R=0, P=0, IP6-47
IPV6-FEH List[4]=Num_Protection_Hops=0, Skip_Count=1, R=0, P=1, IP6-57
IPV6-FEH List[5]=Num_Protection_Hops=0, Skip_Count=0, R=0, P=1, IP6-35
IPV6-FEH List[6]=Num_Protection_Hops=0, Skip_Count=0, R=0, P=1, IP6-23

IPV6-FEH List[7]=Num_Protection_Hops=3, Skip_Count=0, R=0, P=0, IP6-24

In the example above, it is noted that the total size (Length=148) is based on a combination of the size of the common part of IPV6-FEH-Shim-Header that includes the Type, Length, and Next-Header fields (4 bytes), the size of the fixed part of IPV6-FEH-Shim Header that includes the Segments Left, Flags, and RESERVED fields (4 bytes), and the size of the set of IPV6-FEHs (7×20 bytes per IPV6-FEH=140 bytes).

In the example above, it is noted that the IPV6-FEH-Shim Header is inserted between IPv6 Header and TCP Header. As a result, Protocol in the IPv6 Header becomes 146(=IP-Shim Protocol) and the Next-Header in the IPV6-FEH-Shim Header becomes 6(=TCP).

Various example embodiments for supporting flow-specific fast rerouting of source routed packets for flow-specific FRR in IPv6-based source routing are configured to support processing of the IPV6-FEH-Shim Header of the IPv6 Header by the transit router.

The transit router may be configured to perform the following operations while processing the IPV6-FEH-Shim Header of the IPv6 Header.

It is noted that, as stipulated in the IP-Shim Layer definition, the node that is supposed to inspect the IPV6-FEH-Shim Header is the node corresponding to the DA of the source routed packet. The other transit nodes should not inspect the IPV6-FEH-Shim Header and should forward the source routed packet toward the DA according to the IPv6 Routing Table.

The transit router corresponding to the DA, upon receiving the IPV6-FEH-Shim Header of the IPv6 Header, may process the IPV6-FEH-Shim Header of the IPv6 Header as follows.

If Segments Left=0, the next layer in the source routed packet, whose type is identified by the Next Header field in the IPV6-FEH-Shim Header, is processed.

If Segments Left≠0, then i is set equal to the index of the next IPV6-FEH to be visited in the IPV6-FEH list (=Segments Left). The Segments Left value is decremented by 1. From this point on, the Segments Left value points to IPV6-FEH[i−1]. The IPV6-FEH[i] is processed as discussed further below.

If the address of IPV6-FEH[i] is a multicast address, then the source routed packet is discarded.

If the address of IPV6-FEH[i] is a not multicast address, then IPV6-FEH[i] is further processed based on the TTL in the IPv6 Header as follows.

If the TTL in the IPv6 Header is less than or equal to 1, the following actions are performed. The IPv6 DA and the IPv6 address of IPV6-FEH[i] are swapped. The R Flag in IPV6-FEH[i] is set equal to 1 to indicate that it has been traversed by the source routed packet. If the C Flag in the IPV6-FEH-Shim Header=0, then swap the IPv6 DA and the IPv6 address of IPV6-FEH[1], restore the Protocol Field in the IPv6 Header from the Next Header field in the IPV6-FEH-Shim Header, and remove the IPV6-FEH-Shim Header. An ICMP Time Exceeded-TTL Exceeded in Transit message is sent to the SA and the source routed packet is discarded.

If the TTL in the IPv6 Header is not less than or equal to 1, then IPV6-FEH[i] is further processed by checking the reachability of the address of IPV6-FEH[i].

If the address of IPV6-FEH[i] is reachable, swap the IPv6 DA and the IPv6 address of IPV6-FEH[i] and set the R Flag in IPV6-FEH[i]=1 to indicate that this hop has been traversed by the source routed packet. The following processing is performed: (1) if Num_Protection_Hops in IPV6-FEH[i]>0, decrement Segments Left by Num_Protection_Hops in IPV6-FEH[i] (this means that the hops in protection path have been skipped since the source routed packet is not being forwarded along the protection path) or (2) if Skip_Count in IPV6-FEH[i]>0, decrement Segments Left by Skip Count in IPV6-FEH[i] (this means that the hops in the primary path have been skipped, i.e., bypassed by the protection path). If Segments Left=0 and the C-Flag in the IPV6-FEH-Shim Header=0, restore the Protocol field in the IPv6 Header from the Next Header field in the IPV6-FEH-Shim Header and remove the IPV6-FEH-Shim Header. The source routed packet is then resubmitted to the IPv6 module for transmission to the new destination.

If the address of IPV6-FEH[i] is not reachable and if the Num_Protection_Hops in IPV6-FEH[i]=0 (this means the next-hop is neither operational nor protected, and, thus, that the source routed packet is to be dropped), then the IPv6 DA address and the IPv6 address of IPV6-FEH[i] are swapped and the R Flag in IPV6-FEH[i] is set equal to 1 to indicate that this hop has been traversed by the source routed packet. If the C Flag in the IPV6-FEH-Shim Header=0, restore the Protocol field in the IPv6 Header from the Next Header field in the IPV6-FEH-Shim Header and remove the IPV6-FEH-Shim Header. An ICMP Unreachable message is sent to the SA and the source routed packet is discarded.

If the address of IPV6-FEH[i] is not reachable and if Num_Protection_Hops in IPV6-FEH[i] !=0 (this means that the hop is unreachable, but is protected, so the source routed packet is to be fast-rerouted via the protection path), then the Segments Left value is decremented by 1 (such that it now points to IPV6-FEH[i−2]), the IPv6 DA address and the IPv6 address of IPV6-FEH[i] (i.e., the first entry in the protection path) are swapped, and the R Flag in IPV6-FEH[i] is set equal to 1 to indicate that this hop has been traversed by the source routed packet. If Segments Left=0 and the C-Flag in the IPV6-FEH-Shim Header=0, restore the Protocol field in the IPv6 Header from the Next Header field in the IPV6-FEH-Shim Header and remove the IPV6-FEH-Shim Header. The source routed packet is then resubmitted to the IPv6 module for transmission to the new destination.

Various example embodiments for supporting flow-specific fast rerouting of source routed packets for flow-specific FRR in IPv6-based source routing, based on use of an IP-Shim Layer, may be further understood by considering an example in which source router R1 sends a packet from source S to destination D with explicit path E(A).

When R2→R4 is operational, the source routed packet travels along the path R1→R2, R2→R4, R4→R, R7→R9, R9→D, each of which is discussed below.

As the source routed packet travels from R1 to R2, the IPv6 Header and the IPV6-FEH-Shim Header may be encoded as follows:

IPv6 Header
Source Address=S
Destination Address=IP6-12
IPV6-FEH-Shim Header
Routing Type: 5, Hdr_Ext_Len=14, Segments Left=7, Last_Entry=7, Flags=0
IPV6-FEH List[1]=Num_Protection_Hops=0, Skip_Count=0, R=0, P=0, D
IPV6-FEH List[2]=Num_Protection_Hops=0, Skip_Count=0, R=0, P=0, IP6-79
IPV6-FEH List[3]=Num_Protection_Hops=0, Skip_Count=0, R=0, P=0, IP6-47
IPV6-FEH List[4]=Num_Protection_Hops=0, Skip_Count=1, R=0, P=1, IP6-57

IPV6-FEH List[5]=Num_Protection_Hops=0, Skip_Count=0, R=0, P=1, IP6-35
IPV6-FEH List[6]=Num_Protection_Hops=0, Skip_Count=0, R=0, P=1, IP6-23
IPV6-FEH List[7]=Num_Protection_Hops=3, Skip_Count=0, R=0, P=0, IP6-24

As indicated above, the source routed packet arrived in R2 with Segments Left=7. So, R2 processed IPV6-FEH List[7], which is a reachable next-hop. R2 swapped DA (IP6-12) with the address in IPV6-FEH List[7] and marked it as part of the recorded-route (R=1). The IPV6-FEH List[7] has 3 protection hops, so IPV6-FEH List[6 . . . 4] need to be skipped, as the source routed packet is not traversing the protection path. So, Segments Left is set to 3 (=7-1-3).

As the source routed packet travels from R2 to R4, the IPv6 Header and the IPV6-FEH-Shim Header elements may be encoded as follows (updated fields highlighted with underlining):

IPv6 Header
Source Address=S
Destination Address=IP6-24
IPV6-FEH-Shim Header
Routing Type: 5, Hdr_Ext_Len=14, Segments Left=3, Last_Entry=7, Flags=0,
IPV6-FEH List[1]=Num_Protection_Hops=0, Skip_Count=0, R=0, P=0, D
IPV6-FEH List[2]=Num_Protection_Hops=0, Skip_Count=0, R=0, P=0, IP6-79
IPV6-FEH List[3]=Num_Protection_Hops=0, Skip_Count=0, R=0, P=0, IP6-47
IPV6-FEH List[4]=Num_Protection_Hops=0, Skip_Count=1, R=0, P=1, IP6-57
IPV6-FEH List[5]=Num_Protection_Hops=0, Skip_Count=0, R=0, P=1, IP6-35
IPV6-FEH List[6]=Num_Protection_Hops=0, Skip_Count=0, R=0, P=1, IP6-23
IPV6-FEH List[7]=Num_Protection_Hops=3, Skip_Count=0, R=1, P=0, IP6-12

As the source routed packet travels from R4 to R7, the IPv6 Header and the IPV6-FEH-Shim Header may be encoded as follows (updated fields highlighted with underlining):

IPv6 Header
Source Address=S
Destination Address=IP6-47
IPV6-FEH-Shim Header
Routing Type: 5, Hdr_Ext_Len=14, Segments Left=2, Last_Entry=7, Flags=0,
IPV6-FEH List[1]=Num_Protection_Hops=0, Skip_Count=0, R=0, P=0, D
IPV6-FEH List[2]=Num_Protection_Hops=0, Skip_Count=0, R=0, P=0, IP6-79
IPV6-FEH List[3]=Num_Protection_Hops=0, Skip_Count=0, R=1, P=0, IP6-24
IPV6-FEH List[4]=Num_Protection_Hops=0, Skip_Count=1, R=0, P=1, IP6-57
IPV6-FEH List[5]=Num_Protection_Hops=0, Skip_Count=0, R=0, P=1, IP6-35
IPV6-FEH List[6]=Num_Protection_Hops=0, Skip_Count=0, R=0, P=1, IP6-23
IPV6-FEH List[7]=Num_Protection_Hops=3, Skip_Count=0, R=1, P=0, IP6-12

As the source routed packet travels from R7 to R9, the IPv6 Header and the IPV6-FEH-Shim Header may be encoded as follows (updated fields highlighted with underlining):

IPv6 Header
Source Address=S
Destination Address=IP6-79
IPV6-FEH-Shim Header
Routing Type: 5, Hdr_Ext_Len=14, Segments Left=1, Last_Entry=7, Flags=0,
IPV6-FEH List[1]=Num_Protection_Hops=0, Skip_Count=0, R=0, P=0, D
IPV6-FEH List[2]=Num_Protection_Hops=0, Skip_Count=0, R=1, P=0, IP6-47
IPV6-FEH List[3]=Num_Protection_Hops=0, Skip_Count=0, R=1, P=0, IP6-24
IPV6-FEH List[4]=Num_Protection_Hops=0, Skip_Count=1, R=0, P=1, IP6-57
IPV6-FEH List[5]=Num_Protection_Hops=0, Skip_Count=0, R=0, P=1, IP6-35
IPV6-FEH List[6]=Num_Protection_Hops=0, Skip_Count=0, R=0, P=1, IP6-23
IPV6-FEH List[7]=Num_Protection_Hops=3, Skip_Count=0, R=1, P=0, IP6-12

As the source routed packet travels from R9 to D, the IPv6 Header and the IPV6-FEH-Shim Header may be encoded as follows (updated fields highlighted with underlining):

IPv6 Header
Source Address=S
Destination Address=D
IPV6-FEH-Shim Header
Routing Type: 5, Hdr_Ext_Len=14, Segments Left=0, Last_Entry=7, Flags=0,
IPV6-FEH List[1]=Num_Protection_Hops=0, Skip_Count=0, R=1, P=0, IP6-79
IPV6-FEH List[2]=Num_Protection_Hops=0, Skip_Count=0, R=1, P=0, IP6-47
IPV6-FEH List[3]=Num_Protection_Hops=0, Skip_Count=0, R=1, P=0, IP6-24
IPV6-FEH List[4]=Num_Protection_Hops=0, Skip_Count=1, R=0, P=1, IP6-57
IPV6-FEH List[5]=Num_Protection_Hops=0, Skip_Count=0, R=0, P=1, IP6-35
IPV6-FEH List[6]=Num_Protection_Hops=0, Skip_Count=0, R=0, P=1, IP6-23
IPV6-FEH List[7]=Num_Protection_Hops=3, Skip_Count=0, R=1, P=0, IP6-12

It may be seen that, when the source routed packet leaves R9 towards D, the R Flag gets set to 1 on the IPV6-FEH entries that have been traversed by the source routed packet. That subset of IPV6-FEH entries is the recorded-route list.

When the R2→R4 link has failed or the R4 node as failed, the packet travels along the path R1→R2, R2→R3, R3→R5, R5→R7, R7→R9, R9→D, each of which is discussed below.

As the source routed packet travels from R1 to R2, the IPv6 Header and the IPV6-FEH-Shim Header may be encoded as follows:

IPv6 Header
Source Address=S
Destination Address=IP6-12
IPV6-FEH-Shim Header
Routing Type: 5, Hdr_Ext_Len=14, Segments Left=7, Last_Entry=7, Flags=0
IPV6-FEH List[1]=Num_Protection_Hops=0, Skip_Count=0, R=0, P=0, D
IPV6-FEH List[2]=Num_Protection_Hops=0, Skip_Count=0, R=0, P=0, IP6-79
IPV6-FEH List[3]=Num_Protection_Hops=0, Skip_Count=0, R=0, P=0, IP6-47
IPV6-FEH List[4]=Num_Protection_Hops=0, Skip_Count=1, R=0, P=1, IP6-57

IPV6-FEH List[5]=Num_Protection_Hops=0, Skip_Count=0, R=0, P=1, IP6-35
IPV6-FEH List[6]=Num_Protection_Hops=0, Skip_Count=0, R=0, P=1, IP6-23
IPV6-FEH List[7]=Num_Protection_Hops=3, Skip_Count=0, R=0, P=0, IP6-24

As indicated above, the source routed packet arrived in R2 with Segments Left=7. So, R2 processed IPV6-FEH List[7], but it is not reachable. Since IPV6-FEH List[7] has a protection path (i.e., the 3 subsequent hops IPV6-FEH List[4 . . . 6]), the source routed packet is forwarded along the protection path. The DA (=IP6-12) is swapped with first hop in the protection path (i.e., IPV6-FEH List[6]). The DA is traversed, so recorded-route is set (R=1). Segments Left points to IPV6-FEH List[5].

As the source routed packet travels from R2 to R3, the IPv6 Header and the IPV6-FEH-Shim Header may be encoded as follows (updated fields highlighted with underlining):
 IPv6 Header
 Source Address=S
 Destination Address=IP6-23
 IPV6-FEH-Shim Header
 Routing Type: 5, Hdr_Ext_Len=14, Segments Left=5, Last_Entry=7, Flags=0,
 IPV6-FEH List[1]=Num_Protection_Hops=0, Skip_Count=0, R=0, P=0, D
 IPV6-FEH List[2]=Num_Protection_Hops=0, Skip_Count=0, R=0, P=0, IP6-79
 IPV6-FEH List[3]=Num_Protection_Hops=0, Skip_Count=0, R=0, P=0, IP6-47
 IPV6-FEH List[4]=Num_Protection_Hops=0, Skip_Count=1, R=0, P=1, IP6-57
 IPV6-FEH List[5]=Num_Protection_Hops=0, Skip_Count=0, R=0, P=1, IP6-35
 IPV6-FEH List[6]=Num_Protection_Hops=0, Skip_Count=0, R=1, P=1, IP6-12
 IPV6-FEH List[7]=Num_Protection_Hops=3, Skip_Count=0, R=0, P=0, IP6-24

As the source routed packet travels from R3 to R5, the IPv6 Header and the IPV6-FEH-Shim Header may be encoded as follows (updated fields highlighted with underlining):
 IPv6 Header
 Source Address=S
 Destination Address=IP6-35
 IPV6-FEH-Shim Header
 Routing Type: 5, Hdr_Ext_Len=14, Segments Left=4, Last_Entry=7, Flags=0,
 IPV6-FEH List[1]=Num_Protection_Hops=0, Skip_Count=0, R=0, P=0, D
 IPV6-FEH List[2]=Num_Protection_Hops=0, Skip_Count=0, R=0, P=0, IP6-79
 IPV6-FEH List[3]=Num_Protection_Hops=0, Skip_Count=0, R=0, P=0, IP6-47
 IPV6-FEH List[4]=Num_Protection_Hops=0, Skip_Count=1, R=0, P=1, IP6-57
 IPV6-FEH List[5]=Num_Protection_Hops=0, Skip_Count=0, R=1, P=1, IP6-23
 IPV6-FEH List[6]=Num_Protection_Hops=0, Skip_Count=0, R=1, P=1, IP6-12
 IPV6-FEH List[7]=Num_Protection_Hops=3, Skip_Count=0, R=0, P=0, IP6-24

As indicated above, the source routed packet arrived in R5 with Segments Left=4, so R5 processes IPV6-FEH List[4]. IPV6-FEH List[4] has a Skip Count=1, so IPV6-FEH List[5] needs to be skipped. The non-zero Skip Count means that this protection path offered node protection and IPV6-FEH List[5] (which is a hop in primary path) has been bypassed.

As the source routed packet travels from R5 to R7, the IPv6 Header and the IPV6-FEH-Shim Header may be encoded as follows (updated fields highlighted with underlining):
 IPv6 Header
 Source Address=S
 Destination Address=IP6-57
 IPV6-FEH-Shim Header
 Routing Type: 5, Hdr_Ext_Len=14, Segments Left=2, Last_Entry=7, Flags=0,
 IPV6-FEH List[1]=Num_Protection_Hops=0, Skip_Count=0, R=0, P=0, D
 IPV6-FEH List[2]=Num_Protection_Hops=0, Skip_Count=0, R=0, P=0, IP6-79
 IPV6-FEH List[3]=Num_Protection_Hops=0, Skip_Count=0, R=0, P=0, IP6-47
 IPV6-FEH List[4]=Num_Protection_Hops=0, Skip_Count=1, R=1, P=1, IP6-35
 IPV6-FEH List[5]=Num_Protection_Hops=0, Skip_Count=0, R=1, P=1, IP6-23
 IPV6-FEH List[6]=Num_Protection_Hops=0, Skip_Count=0, R=1, P=1, IP6-12
 IPV6-FEH List[7]=Num_Protection_Hops=3, Skip_Count=0, R=0, P=0, IP6-24

As the source routed packet travels from R7 to R9, the IPv6 Header and the IPV6-FEH-Shim Header may be encoded as follows (updated fields highlighted with underlining):
 IPv6 Header
 Source Address=S
 Destination Address=IP6-79
 IPV6-FEH-Shim Header
 Routing Type: 5, Hdr_Ext_Len=14, Segments Left=1, Last_Entry=7, Flags=0,
 IPV6-FEH List[1]=Num_Protection_Hops=0, Skip_Count=0, R=0, P=0, D
 IPV6-FEH List[2]=Num_Protection_Hops=0, Skip_Count=0, R=1, P=0, IP6-57
 IPV6-FEH List[3]=Num_Protection_Hops=0, Skip_Count=0, R=0, P=0, IP6-47
 IPV6-FEH List[4]=Num_Protection_Hops=0, Skip_Count=1, R=1, P=1, IP6-35
 IPV6-FEH List[5]=Num_Protection_Hops=0, Skip_Count=0, R=1, P=1, IP6-23
 IPV6-FEH List[6]=Num_Protection_Hops=0, Skip_Count=0, R=1, P=1, IP6-12
 IPV6-FEH List[7]=Num_Protection_Hops=3, Skip_Count=0, R=0, P=0, IP6-24

As the source routed packet travels from R9 to D, the IPv6 Header and the IPV6-FEH-Shim Header may be encoded as follows (updated fields highlighted with underlining):
 IPv6 Header
 Source Address=S
 Destination Address=D
 IPV6-FEH-Shim m Header
 Routing Type: 5, Hdr_Ext_Len=14, Segments Left=0, Last_Entry=7, Flags=0,
 IPV6-FEH List[1]=Num_Protection_Hops=0, Skip_Count=0, R=0, P=0, IP6-79
 IPV6-FEH List[2]=Num_Protection_Hops=0, Skip_Count=0, R=1, P=0, IP6-57
 IPV6-FEH List[3]=Num_Protection_Hops=0, Skip_Count=0, R=0, P=0, IP6-47
 IPV6-FEH List[4]=Num_Protection_Hops=0, Skip_Count=1, R=1, P=1, IP6-35

IPV6-FEH    List[5]=Num_Protection_Hops=0, Skip_Count=0, R=1, P=1, IP6-23
IPV6-FEH    List[6]=Num_Protection_Hops=0, Skip_Count=0, R=1, P=1, IP6-12
IPV6-FEH    List[7]=Num_Protection_Hops=3, Skip_Count=0, R=0, P=0, IP6-24

As indicated above, when the source routed packet leaves R9 towards D, the R Flag gets set to 1 on the IPV6-FEH entries that have been traversed by the source routed packet (not on the IPV6-FEH entries that have not been traversed by the source routed packet).

It is noted that, since R1 sets the C flag to 0 while inserting the IPV6-FEH-Shim Header, the egress router of the source routing domain (namely, R9) is to remove the IPV6-FEH-Shim Header before forwarding the packet to D. Additionally, before removing the IPV6-FEH-Shim Header, R9 restores the Protocol field in IPv6 Header from the Next Header field in IPV6-FEH-Shim Header.

Various example embodiments for supporting flow-specific fast rerouting of source routed packets for IPv6-based source routing, as indicated above, may be configured to support encoding of the IPV6-FEH using the IP-Shim Header in various other ways.

Various example embodiments for supporting flow-specific fast rerouting of source routed packets for IPv6-based source routing may be configured to support distribution of the IPV6-FEH forwarding capability of routers. As discussed further below, this may be performed using IS-IS, OSPFv3, BGP-LS, or any other suitable protocol.

In an IPv6 source routing domain, it is possible that some of the routers do not support (or have not implemented) IPV6-FEH based explicit path routing procedures defined herein. When the PCE computes an IPV6-FEH based explicit path, it needs to exclude the non-supporting routers from the path. When CSPF is used for computation of an explicit path, the IPV6-FEH capability can be imposed as an additional constraint into CSPF. Thus, IPV6-FEH processing capability of the routers will be available in the TEDB for use by the CSPF when computing explicit paths. When the TEDB is dynamically learned by participating in a routing protocol that floods TE/topology information from routers, then IPv6-FEH capabilities need to be also distributed by that protocol. A description of mechanisms for supporting exchange of IPV6-FEH capability information in various routing protocols (e.g., IS-IS, OSPFv3, and BGP-LS) follows.

Various example embodiments for supporting flow-specific fast rerouting of source routed packets for IPv6-based source routing may be configured to support distribution of the IPV6-FEH forwarding capability of routers using IS-IS.

A generic Router Capability TLV in IS-IS is defined in RFC 7981. The generic Router Capability TLV can carry any number of router specific capabilities within it, as optional sub-TLVs. The format of the Router Capability TLV follows:

The Router Capability TLV, as indicated above, includes a Type field, a Length field, and a Value field, followed by one or more sub-TLVs. The Type field is a 1-octet field that specifies the type of the Router Capability TLV. The Length field is a 1-octet field that specifies the number of bytes in the Value field. The Value field, as indicated above, is a variable length field that starts with 4 octets of Router ID, indicating the source of the Router Capability TLV, followed by 1 octet of flags. The flags, which include a D Flag and an S Flag, control the scope of advertisement of the Router Capability TLV. The S Flag (0x01) may control the scope of advertisement of the Router Capability TLV as follows: (1) if the S Flag is set (e.g., equal to "1"), the Router Capability TLV is flooded across the entire routing domain and (2) if the S Flag is not set (e.g., equal to 0), the Router Capability TLV is leaked between levels (although it is noted that this bit should not be altered during the TLV leaking). The D Flag (0x02) may control the scope of advertisement of the Router Capability TLV as follows: (1) when the Router Capability TLV is leaked from Level 2 (L2) to Level 1 (L1), the D Flag is to be set (e.g., equal to "1"), otherwise the D Flag is cleared and (2) Router Capability TLVs with the D Flag are not to be leaked from Level 1 to Level 2 (to prevent TLV looping). The sub-TLVs, as indicated above, may follow the Flags field.

Various example embodiments for supporting flow-specific fast rerouting of source routed packets for IPv6-based source routing may be configured to support distribution of the IPV6-FEH forwarding capability of routers using a new IP-SR-Capabilities sub-TLV to be carried within the Router Capability TLV. This new IP-SR-Capabilities sub-TLV is generic and is defined to carry any capability related to IP-SR. The IP-SR Capabilities sub-TLV is propagated throughout the level and is not advertised across level boundaries and, thus, the Router Capability TLV distribution flags should be set accordingly (i.e., the S flag in the IS-IS Router Capability TLV is unset). It is noted that, if the IP-SR-Capability sub-TLV is not advertised by the node, such node is considered as not being capable of IPV6-FEH based source routing. The IP-SR Capabilities sub-TLV has following format:

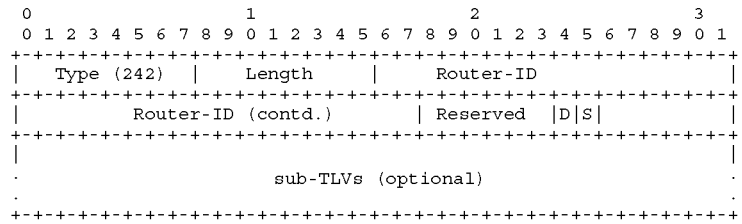

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+
| Num Prot Hops |  Skip Count   |     Flags     |
+-+-+-+-+-+-+-+-+-+-+-+-+-+-+-+-+-+-+-+-+-+-+-+-+
```

The IP-SR Capabilities sub-TLV includes a Type field, a Length field, and a Flags field. The value of the Type field has yet to be determined (e.g., a value of 3, which may be allocated from the IANA registry, is suggested; however, it will be appreciated that other suitable values may be used). The value of the Length field is set equal to 1. The 1-octet Flags field includes a set of one-bit flags configured to indicate various capabilities. The flags of the Flags field have the following format and are defined as follows:

```
 0 1 2 3 4 5 6 7
+-+-+-+-+-+-+-+-+
|I|V|P|Q|       |
+-+-+-+-+-+-+-+-+
```

The IP-SR Capabilities sub-TLV, as noted above, includes a 1-octet Flags field. The 1-octet Flags field, as noted above, includes a set of one-bit flags configured to indicate various capabilities.

As noted above, various example embodiments for supporting flow-specific fast rerouting of source routed packets are configured to support distribution of the IPV6-FEH forwarding capability of routers. The IPV6-FEH forwarding capability of routers may be advertised using flags of the IP-SR Capabilities sub-TLV as follows.

In the case of use of an IPV6 Routing Header for transporting the IPV6-FEH, IPV6-FEH forwarding capability may be advertised using the P-Flag. The P-Flag is the "IPV6-FEH as IPv6 Header Options" flag, which is configured such that, if set (e.g., equal to "1"), then the router is capable of processing IPV6-FEH encoded source routed packets on all interfaces, where IPV6-FEH is encoded as IPv6 Header Options.

In the case of use of IP-Shim Headers for transporting the IPV6-FEH, IPV6-FEH forwarding capability may be advertised using the Q-Flag. The Q-Flag is the "IPV6-FEH as IP-Shim Protocol" flag, which is configured such that, if set (e.g., equal to "1"), then the router is capable of processing IPV6-FEH encoded source routed packets on all interfaces, where IPV6-FEH is encoded as IP-Shim Protocol.

It is noted that the IP-SR-Capabilities sub-TLV MAY be advertised in a Link State Packet (LSP) (in IS-IS terminology, the LSA is called LSP) of any number, but a router should not advertise more than one IP-SR-Capabilities sub-TLV. A router receiving multiple IP-SR-Capabilities sub-TLVs, from the same originator, is expected to select the first advertisement in the lowest numbered LSP.

Various example embodiments for supporting flow-specific fast rerouting of source routed packets for IPv6-based source routing may be configured to support distribution of the IPV6-FEH forwarding capability of routers using OSPF.

The data plane capabilities of an OSPFv3 Router are advertised in the OSPFv3 Router Information Opaque LSA defined in section 2.2 in RFC 4970. The OSPFv3 Router Information Opaque LSA further carries within it the OSPF Router Informational Capabilities TLV defined in Section 2.2 of the RFC 4970. The format of the OSPF Router Informational Capabilities TLV follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|                   Informational Capabilities                  |
+-+-+-+-+-+-+-+-+-+-+-+-+-+-+-+-+-+-+-+-+-+-+-+-+-+-+-+-+-+-+-+-+
```

As noted above, various example embodiments for supporting flow-specific fast rerouting of source routed packets are configured to support distribution of the IPV6-FEH forwarding capability of routers. The payload is 32-bit Informational Capabilities, where each bit represents a specific capability of the router. The IPV6-FEH forwarding capability of routers may be advertised using new bits in the OSPF Router Informational Capability TLV as follows.

In the case of use of IPV6 Routing Header for transporting the IPV6-FEH, IPV6-FEH forwarding capability may be advertised using Bit-12 (it will be appreciated that other values may be used) in the OSPF Router Informational Capability TLV. Bit-12 is the "IPV6-FEH as IPv6 Header Options" flag, which is configured such that, if set (e.g., using a value of "1"), this indicates that the router is capable of processing IPV6-FEH encoded source routed packets on all interfaces, where IPV6-FEH is encoded as IPv6 Header Options.

In the case of use of IP-Shim Headers for transporting the IPV6-FEH, IPV6-FEH forwarding capability may be advertised using Bit-13 (it will be appreciated that other values may be used) in the OSPF Router Informational Capability TLV. Bit-13 is the "IPV6-FEH as IP-Shim Protocol" flag, which is configured such that, if set (e.g., using a value of "1"), this indicates that the router is capable of processing IPV4-FEH encoded source routed packets on all interfaces, where IPV6-FEH is encoded as IP-Shim Protocol.

It is noted that, for the IPV6-FEH forwarding capabilities propagation, area scope flooding is required.

Various example embodiments for supporting flow-specific fast rerouting of source routed packets for IPv6-based source routing may be configured to support distribution of the IPV6-FEH forwarding capability of routers using BGP-LS.

The flooding scope for IGP-based methods of SR is IGP area-wide. As a result, the contents of an LSDB or a TEDB have the scope of an IGP area and, therefore, by using the IGP alone, it may not be enough to construct segments across multiple IGP areas or AS boundaries.

In order to address the need for applications that require topological visibility across IGP areas, or even across ASs, the BGP-LS address-family/sub-address-family have been defined to allow BGP to carry Link-State information. The BGP Network Layer Reachability Information (NLRI) encoding format for BGP-LS, and a new BGP Path Attribute called the BGP-LS attribute, are defined in RFC 7752. The BGP-LS specifications for SR are described in the "BGP Link-State extensions for Segment Routing" draft (also denoted as SR-BGP-LS-DRAFT).

Various example embodiments for supporting flow-specific fast rerouting of source routed packets are configured to support use of a new IP-SR-Capabilities TLV to distribute the IPV6-FEH forwarding capability of routers. The IP-SR-Capabilities TLV may be used to distribute IPV6-FEH forwarding capability of routers received via IS-IS (e.g., in the IP-SR-Capabilities TLV discussed above with respect to use of IS-IS to distribute the IPV6-FEH forwarding capability of routers) and to distribute IPV6-FEH forwarding capability of routers received via OSPF (e.g., in the OSPF Router Informational Capabilities TLV discussed above with respect to use of OSPFv3 to distribute the IPV6-FEH forwarding capability of routers). The IP-SR Capabilities TLV for BGP-LS has following format:

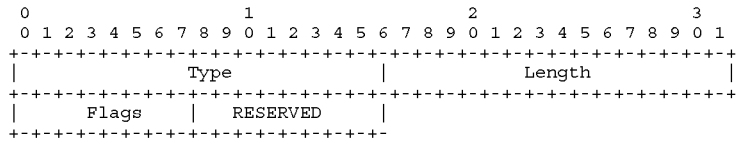

The IP-SR Capabilities TLV includes a Type field, a Length field, a Flags field, and a Reserved field. The value of the Type field has yet to be determined (e.g., a value of 1073, which may be allocated from the IANA registry, is suggested; however, it will be appreciated that other suitable values may be used). The value of the Length field is variable. The 1-octet Flags field includes a set of one-bit flags configured to indicate various capabilities. The flags of the Flags field have the following format and are defined as follows:

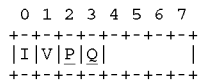

The IP-SR Capabilities TLV, as noted above, includes a 1-octet Flags field. The 1-octet Flags field, as noted above, includes a set of one-bit flags configured to indicate various capabilities.

As noted above, various example embodiments for supporting flow-specific fast rerouting of source routed packets are configured to support distribution of the IPV6-FEH forwarding capability of routers. The IPV6-FEH forwarding capability of routers may be advertised using flags of the IP-SR Capabilities TLV as follows:

In the case of use of IPV6 Routing Header for transporting the IPV6-FEH, IPV6-FEH forwarding capability may be advertised using the P-Flag. The P-Flag is the "IPV6-FEH as IPV6 Routing Header" flag, which is configured such that, if set (e.g., equal to "1"), then the router is capable of processing IPV6-FEH encoded source routed packets on all interfaces, where IPV6-FEH is encoded as IPV6 Routing Header.

In the case of use of IP-Shim Headers for transporting the IPV6-FEH, IPV6-FEH forwarding capability may be advertised using the Q-Flag. The Q-Flag is the "IPV6-FEH as IP-Shim Protocol" flag, which is configured such that, if set (e.g., equal to "1"), then the router is capable of processing IPV6-FEH encoded source routed packets on all interfaces, where IPV6-FEH is encoded as IP-Shim Protocol.

Various example embodiments for supporting flow-specific fast rerouting of source routed packets, as indicated above, are configured to support distribution and use of control plane information for supporting flow-specific fast rerouting of source routed packets. The control plane information includes various information types, various information, or the like, as well as various combinations thereof. The control plane information may be advertised in various ways (e.g., based on various protocols, fields, TLVs, or the like, as well as various combinations thereof).

Figure 10:
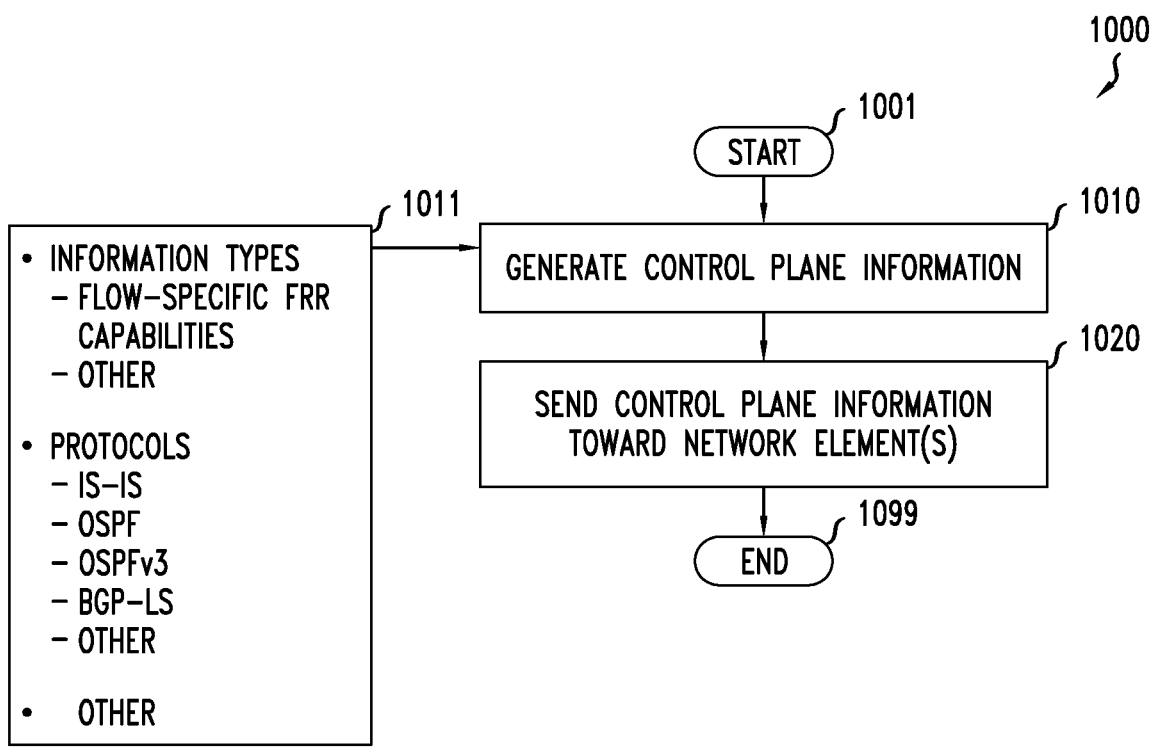
FIG. 10 depicts an example embodiment of a method for use by a network element to generate and send control plane information for supporting flow-specific fast rerouting of source routed packets.

FIG. 10 depicts an example embodiment of a method for use by a network element to generate and distribute control plane information for supporting flow-specific fast rerouting of source routed packets. It will be appreciated that, although primarily presented as being performed serially, at least a portion of the functions of method 1000 may be performed contemporaneously or in a different order than as presented in FIG. 10. At block 1001, method 1000 begins. At block 1010, control plane information is generated. As indicated at block 1011, the control plane information may include various information types (e.g., flow-specific FRR capabilities or other information types), may be based on various protocols (e.g., IS-IS, OSPF, OSPFv3, BGP-LS, or the like, as well as various combinations thereof), or the like, as well as various combinations thereof. At block 1020, the control plane information is sent toward one or more network elements. The control plane information may be sent using various protocols, messages, or the like, as well as various combinations thereof. At block 1099, method 1000 ends.

Figure 11:
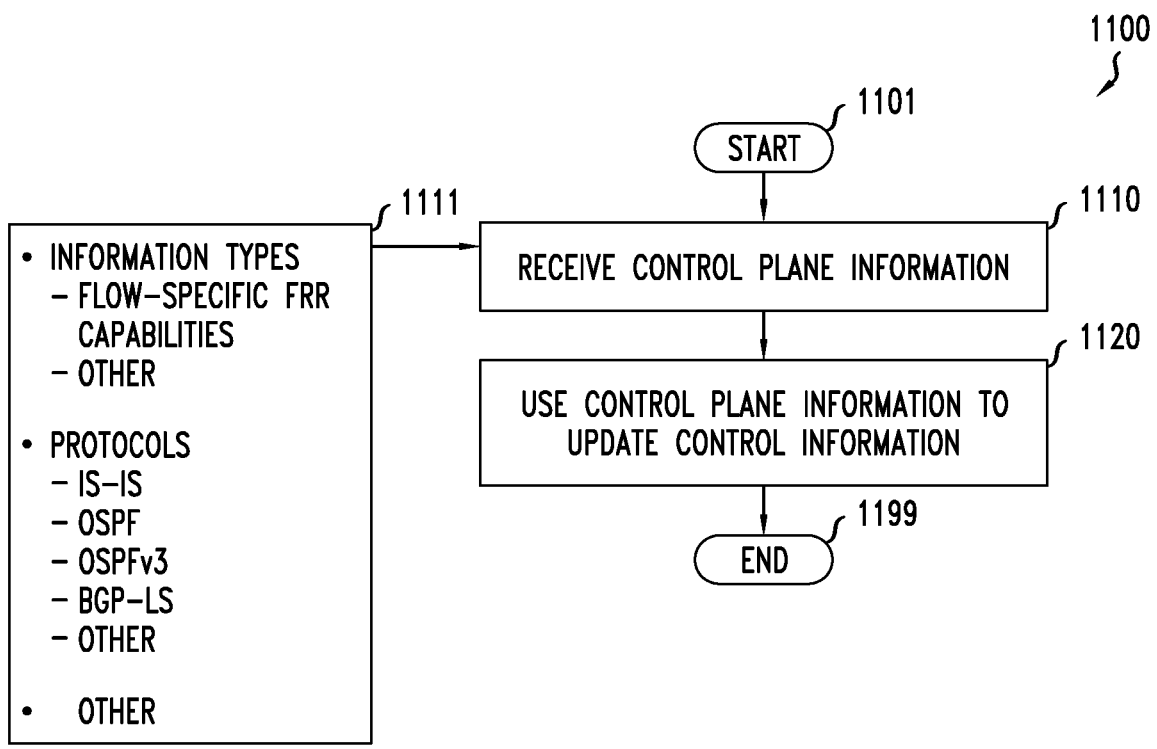
FIG. 11 depicts an example embodiment of a method for use by a network element to receive and use control plane information for supporting flow-specific fast rerouting of source routed packets.

FIG. 11 depicts an example embodiment of a method for use by a network element to receive and use control plane information for supporting flow-specific fast rerouting of source routed packets. It will be appreciated that, although primarily presented as being performed serially, at least a portion of the functions of method 1100 may be performed contemporaneously or in a different order than as presented in FIG. 11. At block 1101, method 1100 begins. At block 1110, control plane information is received. As indicated at block 1111, the control plane information may include various information types (e.g., flow-specific FRR capabilities or other information types), may be based on various protocols (e.g., IS-IS, OSPF, OSPFv3, BGP-LS, or the like, as well as various combinations thereof), or the like, as well as various combinations thereof. At block 1120, the control plane information is used to update control information (e.g., control information in the data plane of the network element, control information in the control plane of the network element, or the like, as well as various combinations thereof) at the network element. The updating of the control information enables use of flow-specific fast rerouting of source routed packets by the network element. At block 1199, method 1100 ends.

Various example embodiments for supporting flow-specific fast rerouting of source routed packets may provide various capabilities or advantages. In at least some embodiments, for example, various example embodiments for supporting flow-specific fast rerouting of source routed packets may be configured to provide improved FRR within the context of source routing by supporting flow-specific fast rerouting of source routed packets (e.g., where the fast rerouting of source routed packets may be considered to be flow-specific since the protection path is specific to the source routed packets of the flow and is encoded within the source routed packets of the flow, as opposed to a protection path determined by the PLR and used across all flows fast rerouted from the PLR irrespective of flow-specific aspects of the flows (e.g., SLA or QoS requirements or the like)). It is noted that various example embodiments for supporting flow-specific fast rerouting of source routed packets may provide various other capabilities or advantages.

Figure 12:
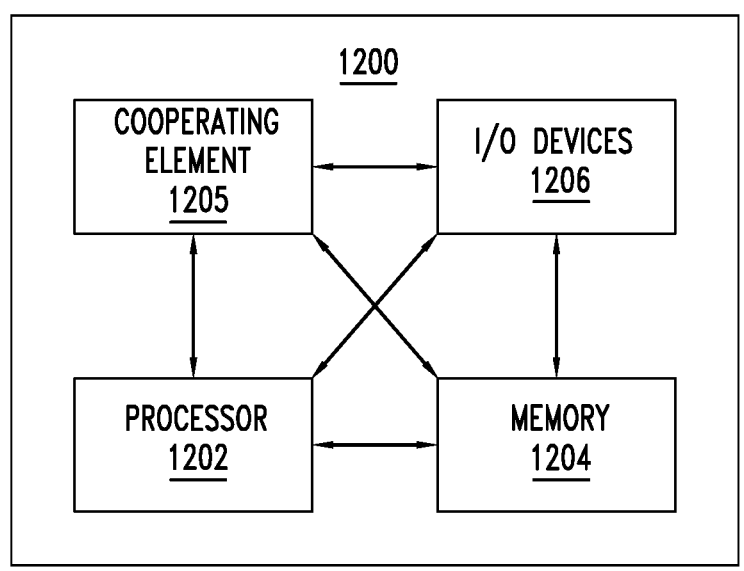
FIG. 12 depicts a high-level block diagram of a computer suitable for use in performing various functions presented herein.

FIG. 12 depicts a high-level block diagram of a computer suitable for use in performing various functions described herein.

The computer 1200 includes a processor 1202 (e.g., a central processing unit (CPU), a processor having a set of processor cores, a processor core of a processor, or the like) and a memory 1204 (e.g., a random access memory (RAM), a read only memory (ROM), or the like). The processor 1202 and the memory 1204 are communicatively connected.

The computer 1200 also may include a cooperating element 1205. The cooperating element 1205 may be a hardware device. The cooperating element 1205 may be a process that can be loaded into the memory 1204 and executed by the processor 1202 to implement functions as discussed herein (in which case, for example, the cooperating element 1205 (including associated data structures) can be stored on a non-transitory computer-readable storage medium, such as a storage device or other storage element (e.g., a magnetic drive, an optical drive, or the like)).

The computer 1200 also may include one or more input/output devices 1206. The input/output devices 1206 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1200 of FIG. 12 may represent a general architecture and functionality suitable for implementing functional elements described herein, portions of functional elements described herein, or the like, as well as various combinations thereof. For example, computer 1200 may provide a general architecture and functionality that is suitable for implementing one or more elements presented herein.

It will be appreciated that various functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that various functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus to at least:
      handle a source routed packet including a header and a payload, wherein the header includes an encoding of a set of hops of a primary path, wherein the header includes an encoding of a set of hops of a protection path configured to protect one of the hops of the primary path, wherein the encoding of the set of hops of the primary path includes, for the one of the hops of the primary path, an identifier of the one of the hops of the primary path and an indication that the source routed packet includes the encoding of the set of hops of the protection path.

2. The apparatus of claim 1, wherein the encoding of the set of hops of the primary path includes a set of hop identifiers identifying the respective hops of the primary path.

3. The apparatus of claim 1, wherein the encoding of the set of hops of the protection path includes a set of hop identifiers identifying the respective hops of the protection path.

4. The apparatus of claim 1, wherein the indication that the source routed packet includes the encoding of the set of hops of the protection path includes a label configured to indicate a start of a label stack for the one of the hops of the primary path.

5. The apparatus of claim 4, wherein the label stack for the one of the hops of the primary path includes:
   a label including the identifier of the one of the hops of the primary path;
   a label including descriptor information for the protection path; and a set of labels including respective identifiers of the respective hops of the protection path.

6. The apparatus of claim 5, wherein the label including descriptor information for the protection path includes a first field including an indication of a quantity of hops in the set of hops of the protection path and a second field including an indication of a quantity of hops of the primary path to be skipped when the protection path is used for the source routed packet.

7. The apparatus of claim 1, wherein the indication that the source routed packet includes the encoding of the set of hops of the protection path includes a value in a type field of an Internet Protocol (IP) header.

8. The apparatus of claim 7, wherein the type field includes a Type field in an IPv4 Header Option or a Routing Type field in an IPv6 Routing Header.

9. The apparatus of claim 1, wherein the encoding of the set of hops of the primary path includes, for the one of the hops of the primary path, a first field including an indication of a quantity of hops in the set of hops of the protection path and a second field including the identifier of the one of the hops of the primary path.

10. The apparatus of claim 1, wherein the encoding of the set of hops of the protection path configured to protect the one of the hops of the primary path includes, for each of the hops of the protection path, a first field including an indication that the hop of the protection path is a protection hop and a second field including a respective identifier of the hop of the protection path.

11. The apparatus of claim 1, wherein the encoding of the set of hops of the protection path configured to protect the one of the hops of the primary path includes, for a final one of the hops of the protection path, a field including an indication of a quantity of hops in the set of hops of the primary path to be skipped when the protection path is used for the source routed packet.

12. The apparatus of claim 1, wherein the encoding of the set of hops of the primary path includes, for the one of the hops of the primary path, a field including an indication of a quantity of hops in the set of hops of the primary path to be skipped when the protection path is used for the source routed packet.

13. The apparatus of claim 1, wherein the source routed packet is based on a Multiprotocol Label Switching (MPLS) source routing protocol.

14. The apparatus of claim 13, wherein each of the hops of the primary path is encoded using a respective MPLS label and the set of hops of the protection path is encoded using a set of MPLS labels.

15. The apparatus of claim 1, wherein the source routed packet is based on an Internet Protocol (IP) source routing protocol.

16. The apparatus of claim 15, wherein the IP source routing protocol includes an IP version 4 (IPv4) source routing protocol, wherein the hops of the primary path and the hops of the protection path are encoded using a set of fields of an IPv4 Options Header or a set of fields of an IPv4 Shim Header.

17. The apparatus of claim 15, wherein the IP source routing protocol includes an IP version 6 (IPv6) source routing protocol, wherein the hops of the primary path and the hops of the protection path are encoded using a set of fields of an IPv6 Routing Header or a set of fields of an IPv6 Shim Header.

18. The apparatus of claim 15, wherein the hops of the primary path and the hops of the protection path are encoded using a set of fields an IP Shim Header, wherein the IP Shim Header is arranged between an IP Header and a header associated with a transport layer protocol.

19. The apparatus of claim 1, wherein the hops of the primary path and the hops of the protection path are encoded using a set of explicit hop elements.

20. The apparatus of claim 1, wherein, to handle the source routed packet, the at least one memory and the computer program code are configured to, with the at least one processor, cause the apparatus to at least:
generate the header for the source routed packet;
associate the header for the source routed packet with a payload for the source routed packet to form the source routed packet; and
send the source routed packet toward a network element.

21. The apparatus of claim 1, wherein, to handle the source routed packet, the at least one memory and the computer program code are configured to, with the at least one processor, cause the apparatus to at least:
receive the source routed packet; and
send the source routed packet toward the one of the hops of the primary path based on a determination that the one of the hops of the primary path is reachable.

22. The apparatus of claim 1, wherein, to handle the source routed packet, the at least one memory and the computer program code are configured to, with the at least one processor, cause the apparatus to at least:
receive the source routed packet; and
send the source routed packet toward a first hop of the protection path, using a fast reroute operation based on the encoding of the set of hops of the protection path, based on a determination that the one of the hops of the primary path is not reachable.

23. The apparatus of claim 1, wherein the at least one memory and the computer program code are configured to, with the at least one processor, cause the apparatus to at least:
support advertisement of control plane information configured to support use of the encoding of the set of hops of the protection path.

24. A non-transitory computer-readable storage medium storing computer program code configured to cause an apparatus to at least:
handle a source routed packet including a header and a payload, wherein the header includes an encoding of a set of hops of a primary path, wherein the header includes an encoding of a set of hops of a protection path configured to protect one of the hops of the primary path, wherein the encoding of the set of hops of the primary path includes, for the one of the hops of the primary path, an identifier of the one of the hops of the primary path and an indication that the source routed packet includes the encoding of the set of hops of the protection path.

25. A method, comprising:
handling a source routed packet including a header and a payload, wherein the header includes an encoding of a set of hops of a primary path, wherein the header includes an encoding of a set of hops of a protection path configured to protect one of the hops of the primary path, wherein the encoding of the set of hops of the primary path includes, for the one of the hops of the primary path, an identifier of the one of the hops of the primary path and an indication that the source routed packet includes the encoding of the set of hops of the protection path.

* * * * *